United States Patent
Singh et al.

(10) Patent No.: US 12,352,224 B2
(45) Date of Patent: Jul. 8, 2025

(54) SERIAL ROTATING DETONATION COMBUSTOR SYSTEMS

(71) Applicant: General Electric Company, Schenectady, NY (US)

(72) Inventors: Kapil Singh, Rexford, NY (US); Daniel Depperschmidt, Saratoga Springs, NY (US); Arin Elspeth Lastufka Cross, Waterford, NY (US); Sarah M. Monahan, Latham, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/377,151

(22) Filed: Oct. 5, 2023

(65) Prior Publication Data

US 2025/0116244 A1 Apr. 10, 2025

(51) Int. Cl.
*F02K 9/60* (2006.01)
*F02C 5/00* (2006.01)
(Continued)

(52) U.S. Cl.
CPC ............... *F02K 9/66* (2013.01); *F02C 5/00* (2013.01); *F02C 5/02* (2013.01); *F02K 9/52* (2013.01); *F02K 9/605* (2013.01); *F23R 7/00* (2013.01)

(58) Field of Classification Search
CPC ...... F23R 7/00; F02C 5/00; F02C 5/02; F02K 9/52; F02K 9/605; F02K 9/66
See application file for complete search history.

(56) References Cited

U.S. PATENT DOCUMENTS

| 2,670,597 A | 3/1954 | Villemejane |
| 2,750,733 A | 6/1956 | Paris |

(Continued)

FOREIGN PATENT DOCUMENTS

WO 2012092285 7/2012

OTHER PUBLICATIONS

USPTO; U.S. Appl. No. 18/078,889; Final Office Action mailed Jan. 9, 2024; (pp. 12).

(Continued)

*Primary Examiner* — Kyle Robert Thomas
(74) *Attorney, Agent, or Firm* — Fitch, Even, Tabin & Flannery LLP

(57) ABSTRACT

Combustor systems are provided that include rotating detonation combustors (RDCs) arranged in series. In some embodiments, a combustor system includes a volume that receives a core oxidizer-fuel mixture. The combustor system includes a first RDC having a first detonation chamber. The first detonation chamber receives a first pilot oxidizer-fuel mixture and is bounded by a first channel formed in a peripheral wall. The combustor system further includes at least one additional RDC having a second detonation chamber. The second detonation chamber receives a second pilot oxidizer-fuel mixture and is bounded by a second channel formed in the peripheral wall. The first pilot oxidizer-fuel mixture reacts in the first detonation chamber and the second pilot oxidizer-fuel mixture reacts in the second detonation chamber to generate rotating detonation combustion waves that are guided by the first channel and the second channel to support a reaction that consumes the core oxidizer-fuel mixture.

20 Claims, 26 Drawing Sheets

(51) Int. Cl.
*F02C 5/02* (2006.01)
*F02K 9/52* (2006.01)
*F02K 9/66* (2006.01)
*F23R 7/00* (2006.01)

(56) References Cited

U.S. PATENT DOCUMENTS

| | | | |
|---|---|---|---|
| 2,942,412 A | 6/1960 | Bollay | |
| 6,442,930 B1 | 9/2002 | Johnson | |
| 6,460,342 B1 | 10/2002 | Nalim | |
| 6,666,018 B2 | 12/2003 | Butler | |
| 6,877,310 B2 | 4/2005 | Leyva | |
| 6,883,304 B2 | 4/2005 | Ouellette | |
| 7,621,118 B2 | 11/2009 | Snyder | |
| 8,117,828 B2 | 2/2012 | Snyder | |
| 8,205,433 B2 * | 6/2012 | Boespflug | F23R 7/00 60/39.38 |
| 10,151,271 B2 | 12/2018 | Hill | |
| 11,473,780 B2 * | 10/2022 | Pal | F02K 7/02 |
| 12,078,357 B2 | 9/2024 | Ruggiero | |
| 2007/0044476 A1 | 3/2007 | Koshoffer | |
| 2009/0056340 A1 | 3/2009 | Woltmann | |
| 2018/0038589 A1 | 2/2018 | Karkow | |
| 2018/0180289 A1 | 6/2018 | Lavertu, Jr. | |
| 2018/0274787 A1 | 9/2018 | Greene | |
| 2018/0355822 A1 | 12/2018 | Vise | |
| 2019/0093880 A1 | 3/2019 | Juan | |
| 2019/0212009 A1 | 7/2019 | Boardman | |
| 2019/0264920 A1 * | 8/2019 | Pal | F02K 7/02 |
| 2020/0063968 A1 | 2/2020 | Gutmark | |
| 2020/0149496 A1 | 5/2020 | Singh | |
| 2024/0191876 A1 | 6/2024 | Ruggiero | |
| 2024/0401813 A1 | 12/2024 | Ruggiero | |

OTHER PUBLICATIONS

USPTO; U.S. Appl. No. 18/078,889; Non-Final Office Action mailed Oct. 3, 2023; (pp. 10).
USPTO; U.S. Appl. No. 18/078,889; Notice of Allowance mailed Apr. 29, 2024; (pp. 10).
USPTO; U.S. Appl. No. 18/078,889; Application filed Dec. 9, 2022, entitled "Rotating Detonation-Enabled Augmentor Systems".
USPTO; U.S. Appl. No. 18/799,373; Application filed Aug. 9, 2024, entitled "Rotating Detonation-Enabled Augmentor Systems".
Non-Patent Literature Document Disclosing YouTube Video entitled "What is a Rotating Detonation Engine—And Why Are They Better Than Regular Engines"; https://www.youtube.com/watch?v=rG_Eh0J_4_s; believed to be publicly available as early as May 11, 2020, 12 pages.
USPTO; U.S. Appl. No. 18/799,373; Non-Final Rejection mailed Mar. 21, 2025; (pp. 1-9).

* cited by examiner

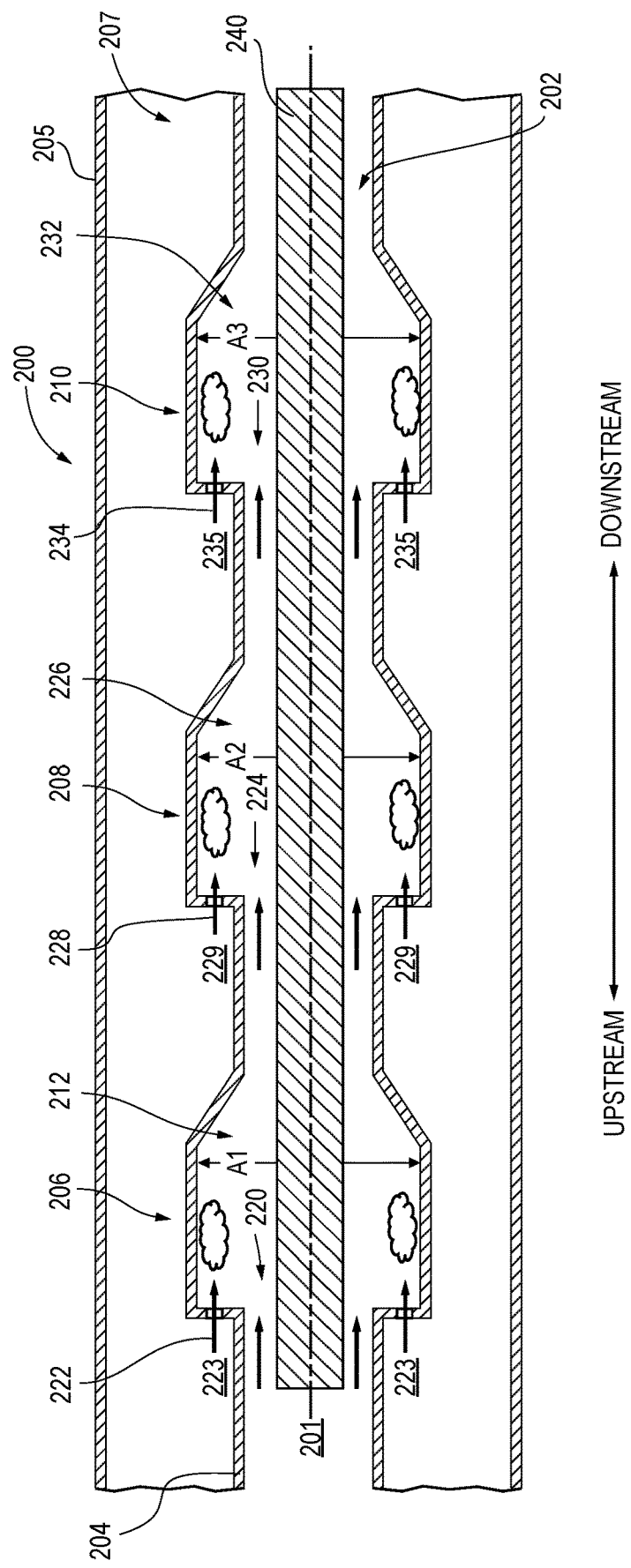

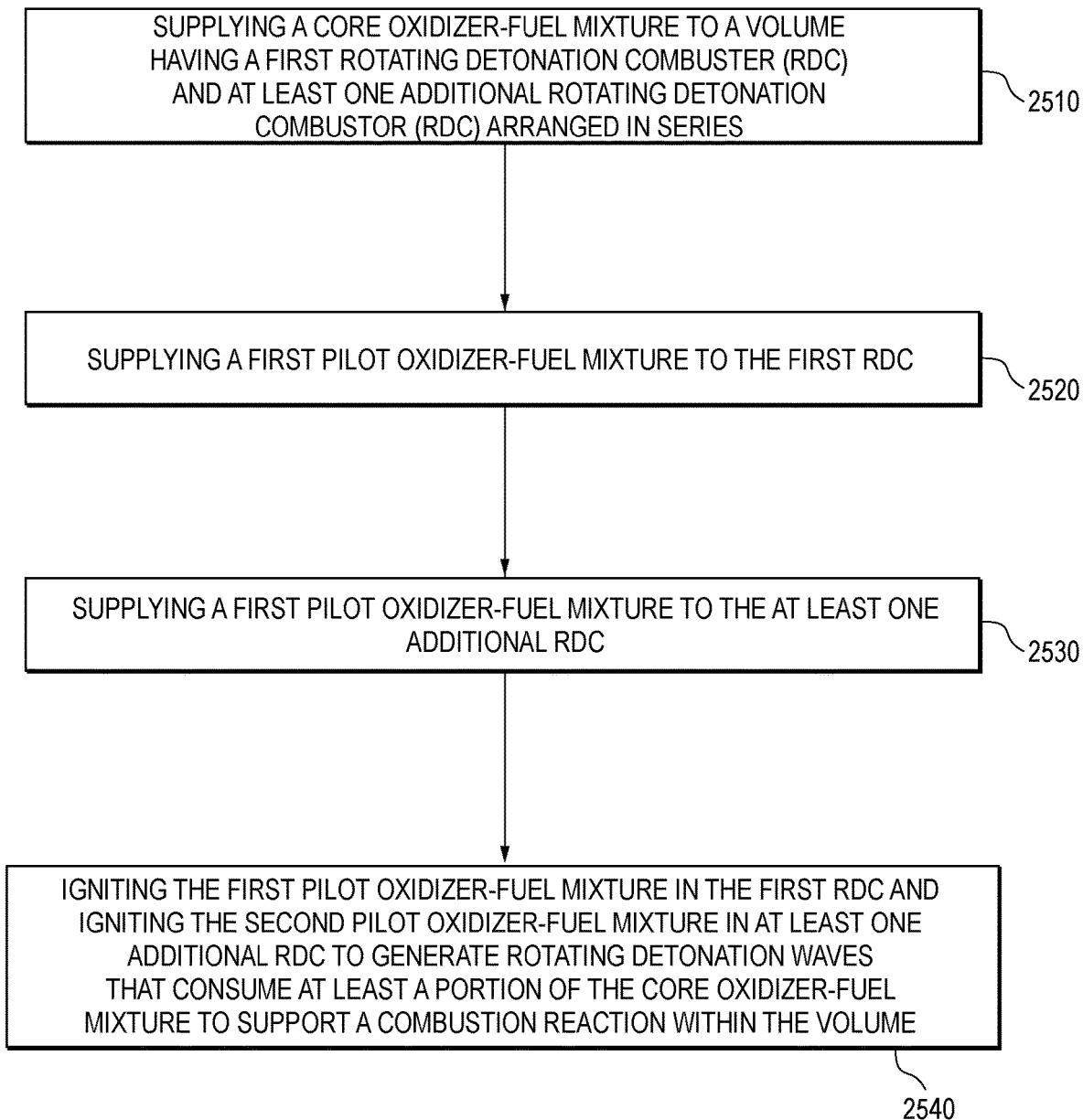

SERIAL ROTATING DETONATION COMBUSTOR SYSTEMS

GOVERNMENT INTERESTS

This invention was made with United States Government support under FA8650-19-D-2507 awarded by Department of Defense. The Government has certain rights to this invention.

TECHNICAL FIELD

These teachings relate generally to combustors and more particularly to rotating detonation combustors.

BACKGROUND

Typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. Improvements in engine efficiency have been sought by modifying the engine architecture such that the combustion occurs as a detonation.

BRIEF DESCRIPTION OF DRAWINGS

Various needs are at least partially met through provision of the serial rotating detonation combustor (RDC) systems described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 2 comprises a schematic cross-sectional side view of a second embodiment of a combustor system with serial RDCs;

FIG. 25 comprises a flow diagram of a method of supporting a combustion reaction using at least two RDCs arranged in series.

Figure 1A:
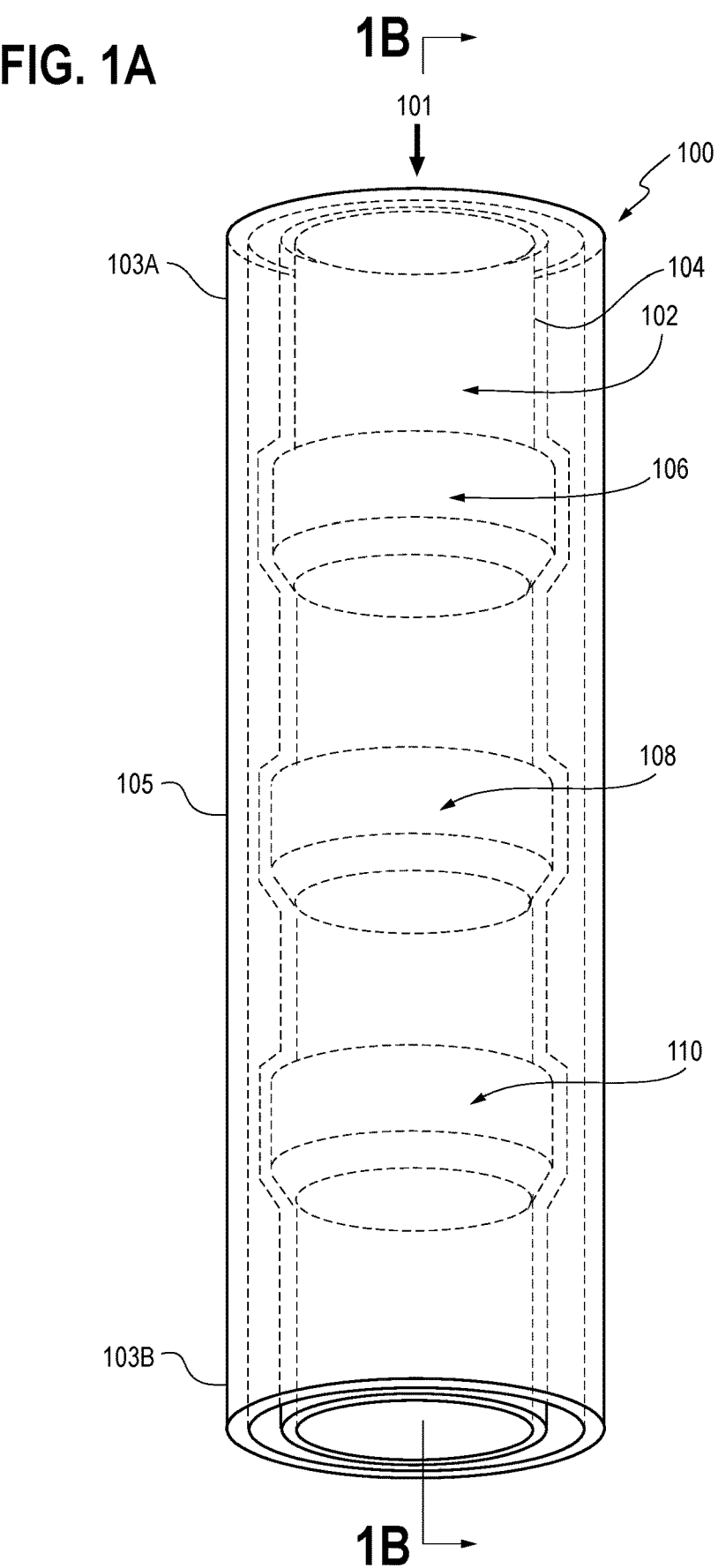
FIG. 1A comprises a schematic perspective view of a first embodiment of a combustor system with serial RDCs.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Detonation-based pressure gain combustion processes may have the potential to deliver combustion systems with higher fuel efficiency and even reduced weight, size, or both as compared to constant-pressure combustion processes. Rotating detonation combustion is one type of detonation-based pressure gain combustion process. Detonation may be initiated in a detonation chamber by igniting a mixture of fuel and oxidizer. Detonation products expand out of the chamber and are pushed out by incoming fuel and oxidizer. Rotating detonation combustion may include one or more detonation waves that travel azimuthally around the detonation chamber. The performance of rotating detonation combustion, however, may depend on the percentage of heat release that occurs in detonation mode. Generally speaking, rotating detonation combustor (RDC) systems incorporate at least two RDCs arranged in series to increase, maximize, optimize, etc. the heat release that occurs in detonation mode. A detonation combustor may lead to a shorter combustor compared to traditional deflagration-based combustors. Pressure gain from detonation combustors may also increase overall cycle efficiency. The performance of RDCs is proportional to the amount of heat released to achieve detonation mode compared to the deflagration mode. Incorporating at least two RDCs in series as described herein may maximize or otherwise increase the heat release in detonation mode to achieve improved performance by increasing the highest pressure and temperature in the cycle and thus enhancing available useful work or thrust.

Incorporating serial RDCs, including RDCs of different sizes (e.g., having different diameters, volumes, etc.) may also increase the operational range and scalability of a combustor. For example, a smaller amount of oxidizer and fuel may be consumed by using a smaller RDC. Also, a smaller amount of oxidizer and fuel may be consumed by using fewer RDCs simultaneously (e.g., producing a smaller amount of thrust). By contrast, a larger amount of oxidizer and fuel may be consumed by using more RDCs simultaneously. Also, a larger amount of oxidizer and fuel may be consumed by using a larger RDC (e.g., producing a larger amount of thrust). Thus, including at least two RDCs in series enables more precise control with fine-tuning of thrust and outlet temperatures as compared to a single RDC. Also, including RDCs of different diameters in series may produce different operating frequencies which may interact beneficially with respect to engine noise or possibly mechanical wear on downstream machinery.

Further, challenges may arise with traditional detonation combustors in maintaining combustion efficiency over an entire cycle or mission. Certain applications may necessitate spreading heat released from the detonation combustion reaction. Including multiple RDCs arranged in series, which may be operated separately or together may address such challenges to improve the operability and flexibility of RDCs.

The serial RDCs described herein may be incorporated into gas turbine engines. A gas turbine engine generally includes a core engine system and an exhaust system. The core engine system includes the engine turbomachinery while the exhaust system includes an exit nozzle that produces thrust. In certain high-performance gas turbine engines, the exhaust system may incorporate an augmentor, also known as an afterburner. The augmentor is typically located at the end of the engine turbomachinery in a duct upstream of the exit nozzle. In operation, the augmentor may provide additional heat to the exhaust oxidizer flow exiting the core engine system to increase engine thrust. Incorporating an augmentor into a gas turbine engine may add additional axial length and volume, in particular, to an exhaust system of the gas turbine engine. The increase in axial length and volume also increases the weight of the gas turbine engine which further results in increased fuel consumption. By incorporating serial RDCs into an augmentor, it may be possible to achieve increased heat release and, accordingly, increase thrust without increasing or decreasing the length or volume of the exhaust system.

The serial RDCs described herein may also be incorporated into ramjet engines, scramjet engines, or rocket engines to provide additional heat to the exhaust oxidizer flow and enhance thrust.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings and, in particular, to FIGS. 1-11, various embodiments of combustor systems are shown that include a plurality of RDCs in series. In the embodiments of FIGS. 1-11, the RDCs include outer channels with pilot oxidizer fuel supplies coupled thereto that act as pilots to initiate rotating detonation reactions in the combustor system. The outer channels are formed in a first wall of the combustor system and, accordingly, rotating detonation waves initiated in the outer channels may travel radially inward toward a core of the combustor system. In this manner, rotating detonation reactions that are initiated by the outer pilots may support combustion reactions occurring within the core.

Figure 1B:
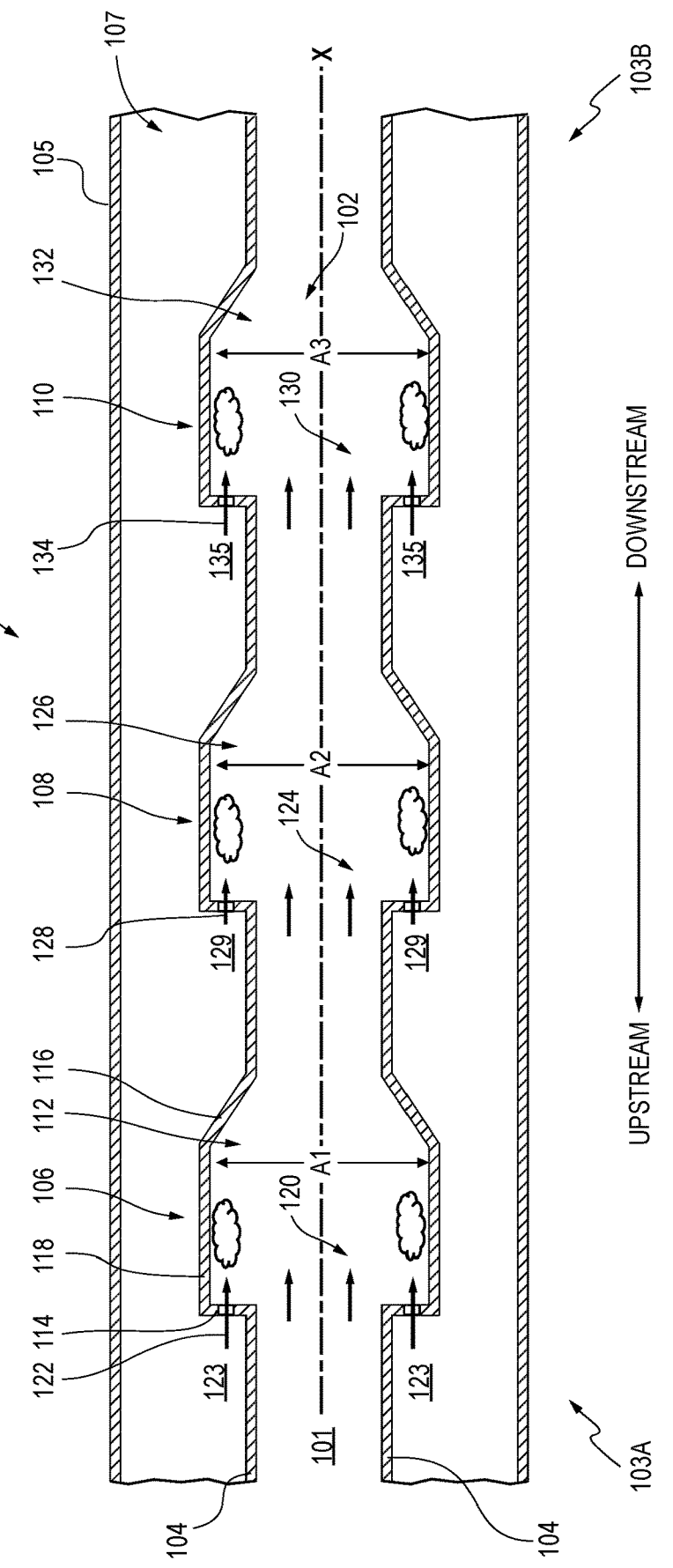
FIG. 1B comprises a schematic cross-sectional view of the combustor system of FIG. 1A taken along line 1B.

Turning to FIGS. 1A and 1B, a first embodiment of a combustor system 100 including a plurality of RDCs arranged in series is shown. The combustor system 100 includes serial RDCs that have a centerbody-less configuration and the same or similar cross-sectional areas. The combustor system 100 includes a first wall 104 separated from a second wall 105 by a space 107. The first wall 104 defines a core 102. The first wall 104 is an inner wall of the combustor system 100. The second wall 105 is an outer wall and may extend around the periphery of the combustor system 100.

The first wall 104 defines the core 102. The core 102 receives a core oxidizer fuel mixture 201. The core 102 includes a first detonation chamber 120, a second detonation chamber 124, and a third detonation chamber 130 arranged in series. The core 102 is an open space and is void of a centerbody. For reference, a midline X extends axially through the core 102. The combustor system 100 includes a first portion 103A and a second portion 103B. The first portion 103A is disposed upstream of the second portion 103B. The first portion 103A of the combustor system 100 receives reactants for reactions occurring therein. Reactants may be for combustion reactions, detonation reactions, or combinations thereof occurring within the combustor system 100. Reactants may include a core oxidizer-fuel mixture and/or one or more pilot oxidizer-fuel mixtures. Oxidizer may include any gaseous, liquid, or solid oxidizers or combinations thereof. Fuel may include any gaseous, liquid, or solid fuel. For fluids, the fuel injection scheme may vary. The second portion 103B of the combustor system 100 releases reaction products. Reaction products may include combustion products, detonation products, or combinations thereof.

Though the combustor system 100 is depicted as cylindrical and the second wall 105 is straight, the combustor systems described herein need not be cylindrical. For example, the second wall 105 may have any suitable shape or configuration, for example, depending on the structure or engine in which the combustor system 100 is implemented. It is to be understood that the combustor systems described herein may take any suitable shape, as dictated by the application.

As shown in FIG. 1A, the combustor system 100 includes a first RDC 106, a second RDC 108, and a third RDC 110. In particular, the first RDC 106, the second RDC 108, and the third RDC 110 are arranged in series. Though the combustor system 100 is illustrated as including three RDCs, it is contemplated that any number of serial RDCs may be incorporated in the combustor systems described herein. In some aspects, the combustor systems include at least two RDCs arranged in series.

Turning to FIG. 1B, the first wall 104 of the combustor system 100 includes a first outer channel 112, a second outer channel 126, and a third outer channel 132. The first outer channel 112 of the first wall 104 is coupled to a first pilot oxidizer-fuel supply 123 by a first pilot fuel supply system 122. The first pilot oxidizer-fuel supply 123 may be coupled to the first outer channel 112 in any suitable manner, for example, by one or more openings in the first wall 104. The second outer channel 126 of the first wall 104 is coupled to a second pilot oxidizer-fuel supply 129 by a second pilot fuel supply system 128. The second pilot oxidizer-fuel supply 129 may be coupled to the second outer channel 126 in any suitable manner, for example, by one or more openings defined in the first wall 104. The third outer channel 132 in the first wall 104 is coupled to a third pilot oxidizer-fuel supply 135 by a third pilot fuel supply system 134. The third pilot oxidizer-fuel supply 135 may be coupled to the third outer channel 132 in any suitable manner, for example, by one or more openings in the first wall 104.

In some approaches, the first pilot oxidizer-fuel supply 123, the second pilot oxidizer-fuel supply 129, and the third pilot oxidizer-fuel supply 135 may be the same supply and, for example, may be a mixture of fuel and oxidizer that is present in the space 107.

The first RDC 106 of the combustor system 100 includes the first detonation chamber 120, the first outer channel 112, and the first pilot fuel supply system 122. The first outer channel 112 and the first pilot fuel supply system 122 act as a pilot for the first RDC 106. The first RDC 106 has a first cross-sectional area A1. The first detonation chamber 120 is bounded, at least in part, by the first outer channel 112. The first outer channel 112 extends circumferentially about a midline X of the combustor system 100. The first detonation chamber 120 is generally cylindrical in shape, though, in some approaches first detonation chamber 120 may take other non-circular shapes (e.g., non-circular cross-sectional areas from an end view) such as oblong or elliptical shapes. Because the core 102 is void of a centerbody, the first detonation chamber 120 is open and not annular in shape. The dimension of the outer diameter of the first RDC 106 may vary based on the application. In some applications, such as missiles, aircraft, power generation, and engine applications, the outer diameter of the first RDC 106 may be between about 3 inches and about 36 inches.

The first outer channel 112 is formed in the first wall 104. The first outer channel 112 is a stabilization structure that may help to stabilize or otherwise direct a rotating detonation wave that is produced in the first RDC 106. The first outer channel 112 is defined by a backward-facing step 114 and a forward-facing step 116 that are recessed relative to adjacent portions of the first wall 104 and joined together by a recessed surface 118. The recessed surface 118 is recessed, for example, relative to adjacent portions of the first wall 104. The backward-facing step 114 faces opposite the flow direction in the core 102 (e.g., flow through the core 102 would flow over the backward-facing step 114). By contrast, the forward-facing step 116 faces the flow direction (e.g., flow through the core 102 would hit the forward-facing step 116). One or more of the backward-facing step 114 and the forward-facing step 116 may be sloped or disposed at an angle relative to the radial direction. For example, one or both of the backward-facing step 114 and the forward-facing step 116 may not be perpendicular to the first wall 104 and, instead, may be at an incline relative to the first wall 104. Sloping one or more of the backward-facing step 114 and the forward-facing step 116 may help to focus energy from a rotating detonation wave radially through the first detonation chamber 120 and to anchor the rotating detonation wave circumferentially to limit axial travel. It is also contemplated that one or more of the backward-facing step 114 and the forward-facing step 116 may be curved or rounded. The first outer channel 112 may also lack the backward-facing step 114 or the forward-facing step 116. Further, the length of the first outer channel 112 (e.g., a length of the first outer channel 112 taken from the backward-facing step 114 to the forward-facing step 116) may vary depending on the application.

The first pilot fuel supply system 122. The first pilot fuel supply system 122 is configured to supply a liquid, gaseous, or solid fuel to the first outer channel 112. In this manner, the first pilot fuel supply system 122 supplies a first pilot oxidizer-fuel mixture to the first outer channel 112. Exemplary fuels include but are not limited to Jet-A fuel, methane, ethylene, or H2 to the first RDC 106. The first pilot fuel supply system 122 delivers fuel or a pilot fuel-oxidizer mixture to the first outer channel 112. The first pilot fuel supply system 122 may include any suitable fuel injection scheme such as showerheads, impinging doublets, triplets or quadruplets, co-swirl injectors, counter-swirl injectors, or similar. The first pilot fuel supply system 122 may introduce oxidizer with the fuel or it may bias more oxidizer towards the midline X of the first detonation chamber 120 to increase oxidizer availability for subsequent RDCs. In one non-limiting example, the first pilot fuel supply system 122 includes one or more vanes that extend into the first outer channel 112. The vanes may include slots or other openings such that fuel is injected into the vanes and passes from the vanes through the slots or openings and into the first outer channel 112. In yet another example, the first pilot fuel supply system 122 includes one or more orifices through which fuel is injected from a fuel supply into the first outer channel 112. The first RDC 106 may also include an igniter (not shown in FIG. 1B). The igniter may be disposed, for example, in the first outer channel 112 and be configured to ignite the pilot oxidizer-fuel mixture. Any suitable igniter may be used, such as a spark, kernel, pulse detonation wave, plasma field, or the like.

The second RDC 108 includes the second detonation chamber 124, a second outer channel 126, and a second pilot fuel supply system 128. The second RDC 108 has a second cross-sectional area A2. The second detonation chamber 124 is bounded, at least in part, by a second outer channel 126. The second RDC 108 further includes a second pilot fuel supply system 128. The second detonation chamber 124, the second outer channel 126, and the second pilot fuel supply system 128 are formed similarly to the first detonation chamber 120, the first outer channel 112, and the first pilot fuel supply system 122, respectively.

The third RDC 110 includes the third detonation chamber 130, the third outer channel 132, and the third pilot fuel supply system 134. The third RDC 110 has a third cross-sectional area A3. The third detonation chamber 130 is bounded, at least in part, by a third outer channel 132. The third RDC 110 further includes a third pilot fuel supply system 134. The third detonation chamber 130, the third outer channel 132, and the third pilot fuel supply system 134 are formed similarly to the first detonation chamber 120, the first outer channel 112, and the first pilot fuel supply system 122.

In the illustrated, non-limiting example, the cross-sectional areas of the first RDC 106, the second RDC 108, and the third RDC 110 are approximately the same and do not vary from an first portion 103A of the combustor system 100 to a second portion 103B of the combustor system 100. That is, the first cross-sectional area A1, the second cross-sectional area A2, and the third cross-sectional area A3 are the same or approximately the same.

In operation, a rotating detonation reaction is initiated in one or more of the first RDC 106, the second RDC 108, and the third RDC 110. In the first RDC, the first pilot fuel supply system 122 supplies a pilot fuel or a pilot fuel-oxidizer mixture to the first outer channel 112. The pilot fuel-oxidizer mixture reacts in the first detonation chamber 120 of the first RDC 106. The igniter (not shown) ignites the pilot fuel-oxidizer mixture in the first outer channel 112 to initiate the rotating detonation reaction. The rotating detonation reaction produces a rotating detonation wave. The first outer channel 112 may anchor the rotating detonation wave such that the wave propagates circumferentially around the first detonation chamber 120. In addition, the first outer channel 112 may help to guide or direct the rotating detonation waves toward the midline X of the volume so that the reaction can consume a core oxidizer-fuel mixture (i.e., core flow) present at or adjacent the midline X of the core 102. A rotating detonation wave may include both a combustion front (i.e., a chemical reaction happening as a fuel-oxidizer mixture is burned) and a shockwave. A detonation reaction results in a combustion front that is coupled to a shockwave whereas a combustion reaction includes a combustion front. Similar reactions occur in sequence in one or more of the second RDC 108 and the third RDC 110. The second RDC 108 burns core flow in one or more of a combustion reaction and a detonation reaction that consumes a remainder of unburnt fuel and oxygen exiting the first RDC 106. Similarly, the third RDC 110 burns core flow in one or more of a combustion reaction and a detonation reaction that consumes unburnt fuel and oxygen exiting the second RDC 108. The serial RDCs in the combustor system 100 may facilitate a more efficient and compact combustion reaction. The compact nature of the combustion reaction confines the reaction to a smaller volume, allowing for a reduction in the size of the combustor system 100. Including the second RDC 108 and the third RDC 110 in series with the first RDC 106 may provide operational flexibility for the combustor system 100. For example, any combination of the first RDC 106, the second RDC 108, and the third RDC 110 may be used in operation.

Turning to FIG. 2, a second embodiment of a combustor system 200 including serial RDCs is shown. The combustor system 200 includes serial RDCs having approximately the same cross-sectional areas and an annular configuration due to the inclusion of a centerbody 240. Elements of the second embodiment that are similar to those in the first embodiment have been given similar reference numbers in the two-hundred series and only general differences will be discussed. For example, the first RDC 106 described in the first embodiment is numbered as the first RDC 206 in the second embodiment.

The figures of the various embodiments described herein include schematic depictions of the combustor systems and various components thereof. Accordingly, various components, such as the centerbodies, may be formed in any suitable aerodynamic shape.

The combustor system 200 includes a first wall 204 separated from a second wall 205 by a space 207. The first wall 204 defines a core 202 that receives a core oxidizer fuel mixture 201. The core 202 includes a first detonation chamber 220, a second detonation chamber 224, and a third detonation chamber 230 arranged in series. The first wall 204 is an inner wall of the combustor system 200. The second wall 205 is an outer wall and may extend around the periphery of the combustor system 200.

The first wall 204 of the combustor system 200 includes a first outer channel 212, a second outer channel 226, and a third outer channel 232. The first outer channel 212 of the first wall 204 is coupled to a first pilot oxidizer-fuel supply 223 by a first pilot fuel supply system 222. The first pilot oxidizer-fuel supply 223 may be coupled to the first outer channel 212 in any suitable manner, for example, by one or more openings in the first wall 204. The second outer channel 226 of the first wall 204 is coupled to a second pilot oxidizer-fuel supply 229 by a second pilot fuel supply system 228. The second pilot oxidizer-fuel supply 229 may be coupled to the second outer channel 226 in any suitable manner, for example, by one or more openings defined in the first wall 204. The third outer channel 232 in the first wall 204 is coupled to a third pilot oxidizer-fuel supply 235 by a third pilot fuel supply system 234. The third pilot oxidizer-fuel supply 235 may be coupled to the third outer channel 232 in any suitable manner, for example, by one or more openings in the first wall 204.

In some approaches, the first pilot oxidizer-fuel supply 223, the second pilot oxidizer-fuel supply 229, and the third pilot oxidizer-fuel supply 235 may be the same supply and, for example, may be a mixture of fuel and oxidizer that is present in the space 207.

The first RDC 206 includes a first detonation chamber 220, the first outer channel 212, and the first pilot fuel supply system 222. The first RDC 206 has a first cross-sectional area A1. The first detonation chamber 220 is surrounded at least in part by the first outer channel 212. The first pilot fuel supply system 222 delivers the first pilot oxidizer-fuel supply 223 to the first outer channel 212.

The second RDC 208 includes the second detonation chamber 224, the second outer channel 226, and the second pilot fuel supply system 228. The second RDC 208 has a second cross-sectional area A2. The second detonation chamber 224 is surrounded at least in part by the second outer channel 226. The second pilot fuel supply system 228 delivers the second pilot oxidizer-fuel supply 229 to the second outer channel 226.

The third RDC 210 includes a third detonation chamber 230, the third outer channel 232, and the third pilot fuel supply system 234. The third RDC 210 has a third cross-sectional area A3. The third detonation chamber 230 is surrounded at least in part by a third outer channel 232. The third pilot fuel supply system 234 delivers the third pilot oxidizer-fuel supply 235 to the third outer channel 232.

The cross-sectional areas of the first RDC 206, the second RDC 208, and the third RDC 210 are approximately the same so do not vary from an upstream portion of the combustor system 200 to a downstream portion.

The combustor system 200 is similar in most respects to the combustor system 100 with a difference being that the core 202 of the combustor system 200 includes the centerbody 240. Accordingly, the first detonation chamber 220, the second detonation chamber 224, and the third detonation chamber 230 are annular. An annular RDC is also referred to as a full-flow RDC and is generally designed such that the tangentially spinning detonation wave occupies the entire height and width of the annulus. An annular RDC may potentially lead to improved performance depending on the application, for example, in applications where there is a desire to maximize or otherwise increase thrust generation.

Figure 3:
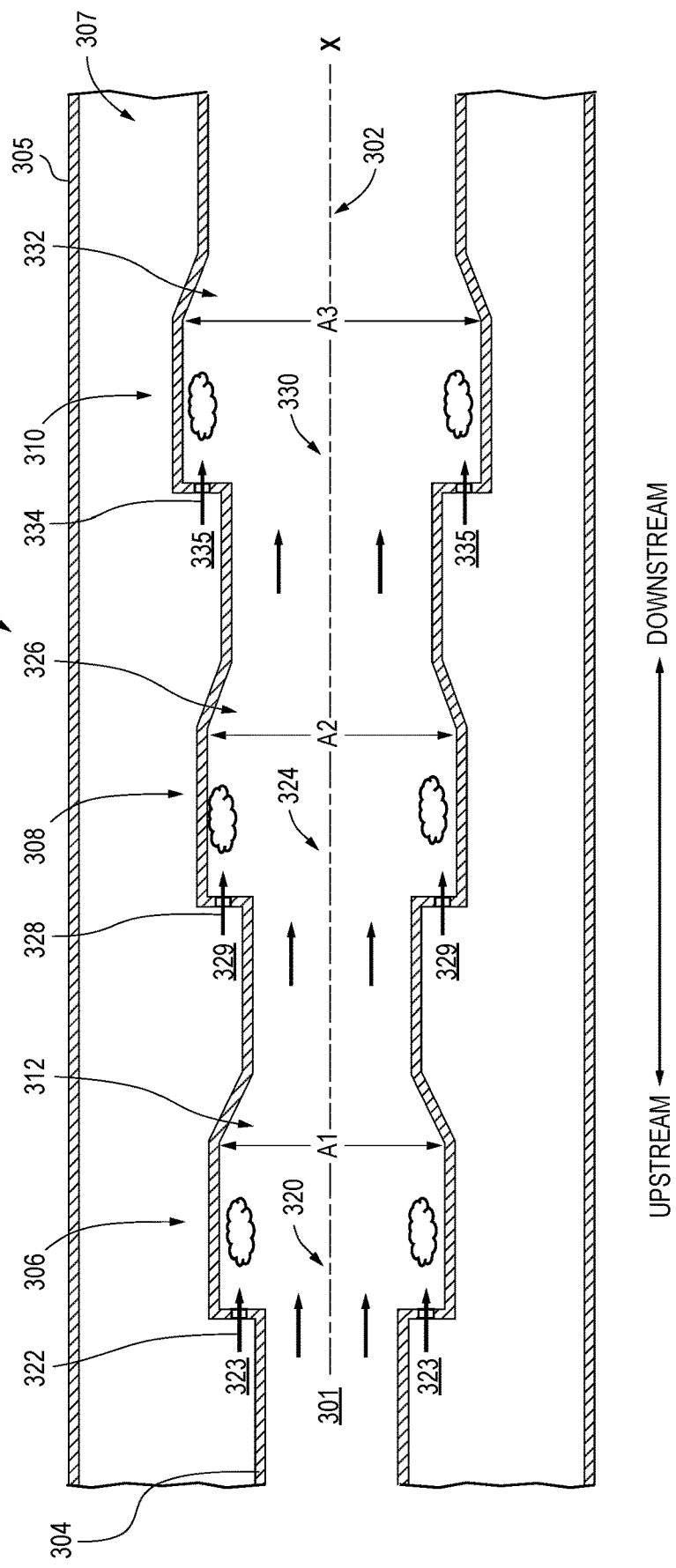
FIG. 3 comprises a schematic cross-sectional side view of a third embodiment of a combustor system with serial RDCs.

FIG. 3 shows a third embodiment of a combustor system 300 including serial RDCs. The combustor system 300 includes a plurality of RDCs arranged in series. The serial RDCs in the combustor system 300 have increasing cross-sectional areas Elements of the third embodiment that are similar to those in the first embodiment have been given similar reference numbers in the three-hundred series and only general differences will be discussed. For example, the first RDC 106 described in the first embodiment is numbered as the first RDC 306 in the third embodiment.

The combustor system 300 includes a first wall 304 separated from a second wall 305 by a space 307. The first wall 304 defines a core 302 that receives a core oxidizer fuel mixture 301. The core 302 includes a first detonation chamber 320, a second detonation chamber 324, and a third detonation chamber 330 arranged in series. The first wall 304 is an inner wall of the combustor system 300. The second wall 305 is an outer wall and may extend around the periphery of the combustor system 300.

The first wall 304 of the combustor system 300 includes a first outer channel 312, a second outer channel 326, and a third outer channel 332. The first outer channel 312 of the first wall 304 is coupled to a first pilot oxidizer-fuel supply 323 by a first pilot fuel supply system 322. The first pilot oxidizer-fuel supply 323 may be coupled to the first outer channel 312 in any suitable manner, for example, by one or more openings in the first wall 304. The second outer channel 326 of the first wall 304 is coupled to a second pilot oxidizer-fuel supply 329 by a second pilot fuel supply system 328. The second pilot oxidizer-fuel supply 329 may be coupled to the second outer channel 326 in any suitable manner, for example, by one or more openings defined in the first wall 304. The third outer channel 332 in the first wall 304 is coupled to a third pilot oxidizer-fuel supply 335 by a third pilot fuel supply system 334. The third pilot oxidizer-fuel supply 335 may be coupled to the third outer channel 332 in any suitable manner, for example, by one or more openings in the first wall 304.

In some approaches, the first pilot oxidizer-fuel supply 323, the second pilot oxidizer-fuel supply 329, and the third pilot oxidizer-fuel supply 335 may be the same supply and, for example, may be a mixture of fuel and oxidizer that is present in the space 307.

The combustor system 300 has a centerbody-less design and, accordingly, the core 302 is open and generally unobstructed from the midline X of the core 302 to the first wall 304. The combustor system 300 includes a first RDC 306, a second RDC 308, and a third RDC 310 arranged in series.

The first RDC 306 includes the first detonation chamber 320, the first outer channel 312, and the first pilot fuel supply system 322. The first RDC 306 has a first cross-sectional area A1. The first detonation chamber 320 surrounded at least in part by the first outer channel 312. The first pilot fuel supply system 322 delivers the first pilot oxidizer-fuel supply 323 to the first outer channel 312.

The second RDC 308 includes a second detonation chamber 324, the second outer channel 326, and the second pilot fuel supply system 328. The second RDC 308 has a second cross-sectional area A2. The second detonation chamber 324 is surrounded at least in part by the second outer channel 326. The second pilot fuel supply system 328 delivers the second pilot oxidizer-fuel supply 329 to the second outer channel 326.

The third RDC 310 includes the third detonation chamber 330, the third outer channel 332, and the third pilot fuel supply system 334. The third RDC 310 has a third cross-sectional area A3. The third detonation chamber 330 is surrounded at least in part by the third outer channel 332. The third pilot fuel supply system 334 delivers the third pilot oxidizer-fuel supply 335 to the third outer channel 332.

The combustor system 300 is similar in most respects to the combustor system 100 with a difference being that the cross-sectional areas of the first RDC 306, the second RDC 308, and the third RDC 310 increase in size from an upstream portion of the combustor system 300 to a downstream portion of the combustor system 300. Accordingly, the second cross-sectional area A2 is larger than the first cross-sectional area A1 and the third cross-sectional area A3 is greater than the second cross-sectional area A2 (e.g., $A1<A2<A3$).

Figure 4:
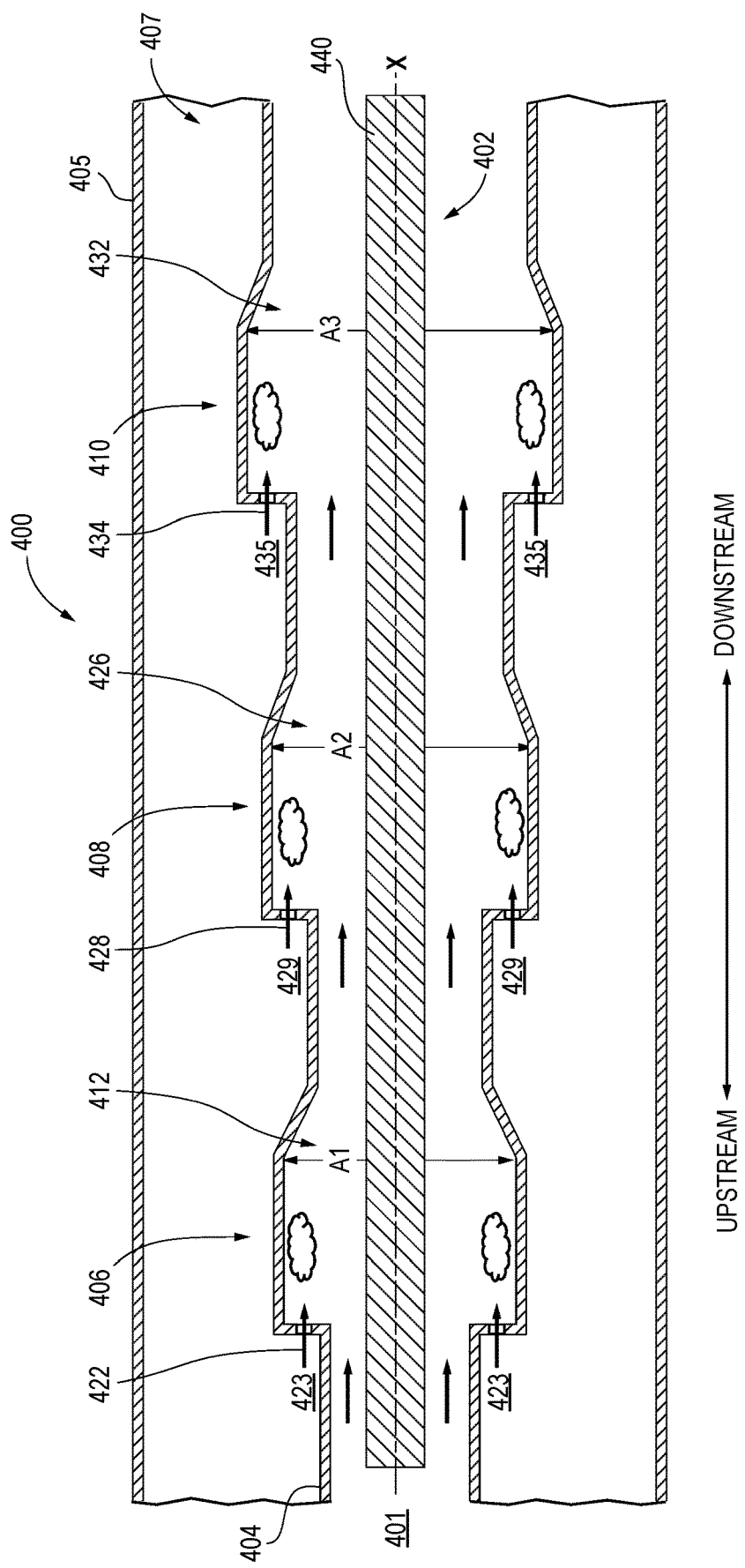
FIG. 4 comprises a schematic cross-sectional side view of a fourth embodiment of a combustor system with serial RDCs.

FIG. 4 shows a fourth embodiment of a combustor system 400 having serial RDCs. The combustor system 400 includes serial RDCs having increasing cross-sectional areas with a centerbody 440. Elements of the fourth embodiment that are similar to those in the first embodiment have been given similar reference numbers in the four-hundred series and only general differences will be discussed. For example, the first RDC 106 described in the first embodiment is numbered as the first RDC 406 in the fourth embodiment.

The combustor system 400 includes a first wall 404 separated from a second wall 405 by a space 407. The first wall 404 defines a core 402 that receives a core oxidizer fuel mixture 401. The core 402 includes a first detonation chamber 420, a second detonation chamber 424, and a third detonation chamber 430 arranged in series. The first wall 404 is an inner wall of the combustor system 400. The second wall 405 is an outer wall and may extend around the periphery of the combustor system 400.

The first wall 404 of the combustor system 400 includes a first outer channel 412, a second outer channel 426, and a third outer channel 432. The first outer channel 412 of the first wall 404 is coupled to a first pilot oxidizer-fuel supply 423 by a first pilot fuel supply system 422. The first pilot oxidizer-fuel supply 423 may be coupled to the first outer channel 412 in any suitable manner, for example, by one or more openings in the first wall 404. The second outer channel 426 of the first wall 404 is coupled to a second pilot oxidizer-fuel supply 429 by a second pilot fuel supply system 428. The second pilot oxidizer-fuel supply 429 may be coupled to the second outer channel 426 in any suitable manner, for example, by one or more openings defined in the first wall 404. The third outer channel 432 in the first wall 404 is coupled to a third pilot oxidizer-fuel supply 435 by a third pilot fuel supply system 434. The third pilot oxidizer-fuel supply 435 may be coupled to the third outer channel 432 in any suitable manner, for example, by one or more openings in the first wall 404.

In some approaches, the first pilot oxidizer-fuel supply 423, the second pilot oxidizer-fuel supply 429, and the third pilot oxidizer-fuel supply 435 may be the same supply and, for example, may be a mixture of fuel and oxidizer that is present in the space 407.

The core 402 of the combustor system 400 includes the centerbody 440. The centerbody 440 extends axially though the core 402 along the midline X. The core 402 is bounded by a first wall 404. The combustor system 400 includes a first RDC 406, a second RDC 408, and a third RDC 410.

The first RDC 406 includes the first detonation chamber 420, the first outer channel 412, and the first pilot fuel supply system 422. The first detonation chamber 420 is surrounded at least in part by the first outer channel 412. The first pilot fuel supply system 422 delivers the first pilot oxidizer-fuel supply 423 to the first outer channel 412.

The second RDC 408 includes the second detonation chamber 424, the second outer channel 426, and the second pilot fuel supply system 428. The second RDC 408 has a second cross-sectional area A2. The second detonation chamber 424 is surrounded at least in part by a second outer channel 426. The second pilot fuel supply system 428 delivers the second pilot oxidizer-fuel supply 429 to the second outer channel 426.

The third RDC 410 includes the third detonation chamber 430, the third outer channel 432, and the third pilot fuel supply system 434. The third RDC 410 has a third cross-sectional area A3. The third detonation chamber 430 is surrounded at least in part by the third outer channel 432. The third pilot fuel supply system 434 delivers the third pilot oxidizer-fuel supply 435 to the third outer channel 432.

The combustor system 400 is similar in most respects to the combustor system 100 with a difference being that the cross-sectional areas of the first RDC 406, the second RDC 408, and the third RDC 410 increase in size from an upstream portion of the combustor system 400 to a downstream portion of the combustor system 400. Accordingly, the second cross-sectional area A2 is larger than the first cross-sectional area A1 and the third cross-sectional area A3 is greater than the second cross-sectional area A2 (e.g., A1<A2<A3). In addition, because the core 402 includes the centerbody 440, the first detonation chamber 420, the second detonation chamber 424, and the third detonation chamber 430 are annular in shape rather than open cylinders in a centerbody-less configuration.

Figure 5:
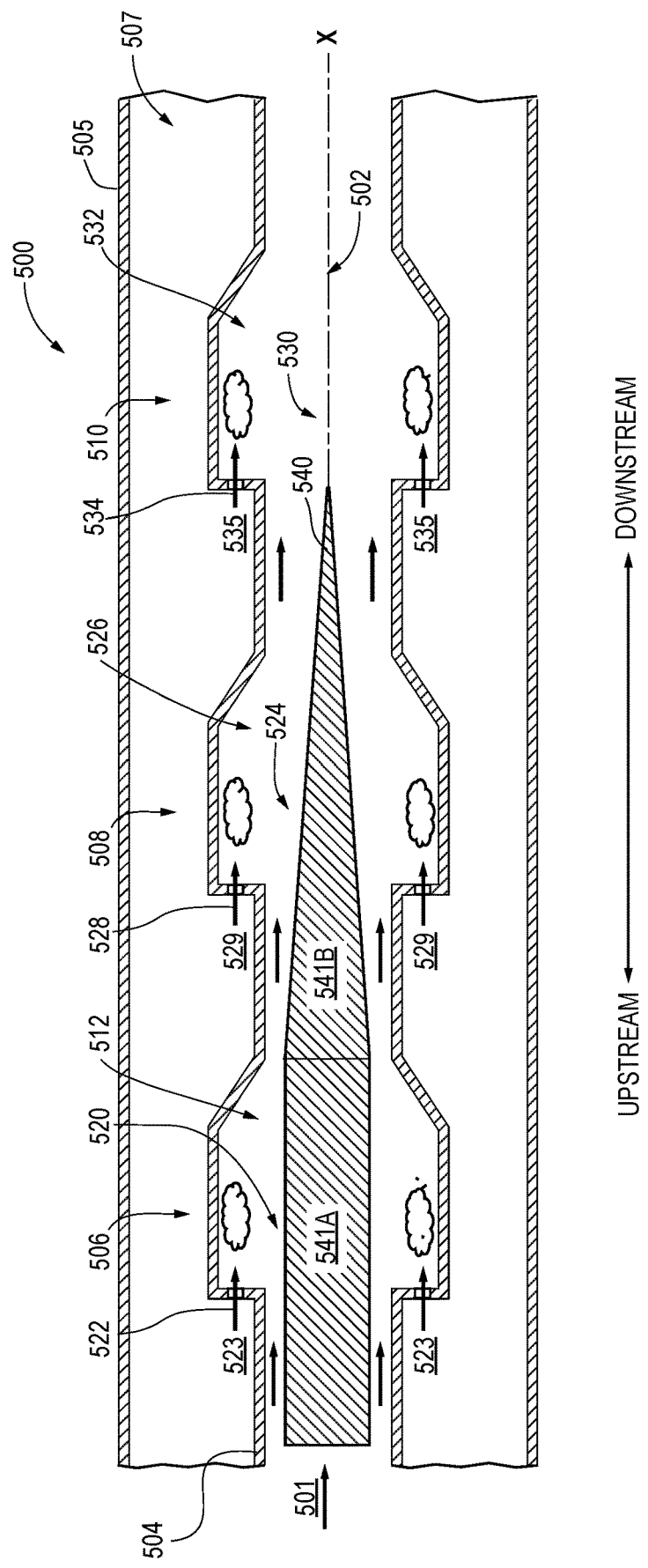
FIG. 5 comprises a schematic cross-sectional side view of a fifth embodiment of a combustor system with serial RDCs.

FIG. 5 shows a fifth embodiment of a combustor system 500 including serial RDCs. The combustor system 500 includes serial RDCs with a centerbody 540. The serial RDCs in the combustor system 500 have a combination of full flow, pilot flow, and centerbody-less configurations. Elements of the fifth embodiment that are similar to those in the first embodiment have been given similar reference numbers in the five-hundred series and only general differences will be discussed. For example, the first RDC 106 described in the first embodiment is numbered as the first RDC 506 in the fifth embodiment.

The combustor system 500 includes a first wall 504 separated from a second wall 505 by a space 507. The first wall 504 defines a core 502 that receives a core oxidizer fuel mixture 501. The core 502 includes a first detonation chamber 520, a second detonation chamber 524, and a third detonation chamber 530 arranged in series. The first wall 504 is an inner wall of the combustor system 500. The second wall 505 is an outer wall and may extend around the periphery of the combustor system 500.

The first wall 504 of the combustor system 500 includes a first outer channel 512, a second outer channel 526, and a third outer channel 532. The first outer channel 512 of the first wall 504 is coupled to a first pilot oxidizer-fuel supply 523 by a first pilot fuel supply system 522. The first pilot oxidizer-fuel supply 523 may be coupled to the first outer channel 512 in any suitable manner, for example, by one or more openings in the first wall 504. The second outer channel 526 of the first wall 504 is coupled to a second pilot oxidizer-fuel supply 529 by a second pilot fuel supply system 528. The second pilot oxidizer-fuel supply 529 may be coupled to the second outer channel 526 in any suitable manner, for example, by one or more openings defined in the first wall 504. The third outer channel 532 in the first wall 504 is coupled to a third pilot oxidizer-fuel supply 535 by a third pilot fuel supply system 534. The third pilot oxidizer-fuel supply 535 may be coupled to the third outer channel 532 in any suitable manner, for example, by one or more openings in the first wall 504.

In some approaches, the first pilot oxidizer-fuel supply 523, the second pilot oxidizer-fuel supply 529, and the third pilot oxidizer-fuel supply 535 may be the same supply and, for example, may be a mixture of fuel and oxidizer that is present in the space 507.

The combustor system 500 further includes a first RDC 506, a second RDC 508, and a third RDC 510.

The first RDC 506 includes the first detonation chamber 520, the first outer channel 512, and the first pilot fuel supply system 522. The first detonation chamber 520 is surrounded at least in part by the first outer channel 512. The first pilot fuel supply system 522 delivers the first pilot oxidizer-fuel supply 523 to the first outer channel 512.

The second RDC 508 includes the second detonation chamber 524, the second outer channel 526, and the second pilot fuel supply system 528. The second detonation chamber 524 is surrounded at least in part by the second outer channel 526. The second pilot fuel supply system 528 delivers the second pilot oxidizer-fuel supply 529 to the second outer channel 526.

The third RDC 510 includes the third detonation chamber 530, the third outer channel 532, and the third pilot fuel supply system 534. The third detonation chamber 530 is surrounded at least in part by the third outer channel 532. The third pilot fuel supply system 534 delivers the third pilot oxidizer-fuel supply 535 to the third outer channel 532.

The combustor system 500 is similar in most respects to the combustor system 100 with a difference being that the core 502 of the combustor system 500 includes the centerbody 540. The centerbody 540 has a first portion 541A and a second portion 541B. The first portion 541A is upstream of the second portion 541B. The first portion 541A of the centerbody 540 is disposed in the first RDC 506 and has a constant or approximately constant cross-sectional size. The second portion 541B of the centerbody 540 is disposed downstream of the first RDC 506 within the second RDC 508. The second portion 541B of the centerbody 540 has a tapered shape that decreases from an upstream end to a downstream end of the second portion 541B. The second portion 541B of the centerbody 540 ends upstream of the third RDC 510.

Because the centerbody 540 extends through the first RDC 506 and the second RDC 508, the first detonation chamber 520 and the second detonation chamber 524 are annular. Due to the decreasing cross-sectional size of the second portion 541B of the centerbody 540, the annular cross-sectional area of the second detonation chamber 524 increases from upstream to downstream. Further, because the centerbody 540 ends upstream of the third RDC 510, the third detonation chamber 530 is centerbody-less, that is, is uninterrupted from a midline X of the core 502 to the first wall 504. So configured, the combustor system 500 includes a combination of a full flow RDC (e.g., the first RDC 506), a pilot flow RDC (e.g., the second RDC 508), and a centerbody-less RDC (e.g., the third RDC 510). In a full-flow RDC, the detonation wave is designed to occupy the entire height and width of the annulus. In a pilot flow RDC, the detonation wave does not occupy one or more of the height and width of the annulus and stabilizes the core flame in detonation or deflagration mode inside an annulus. In a centerbody-less RDC, there is no centerbody and, thus, the detonation is designed to extend through the core of the detonation chamber and reach the midline X to consume a core oxidizer-fuel mixture that may be present in the core of the detonation chamber. The detonation wave in a centerbody-less RDC burns injected core fuel in detonation or deflagration mode or a combination thereof.

In some embodiments, the centerbody 540 may be translatable and may shift through at least a portion of the core 502. For example, the centerbody 540 may be mechanically or fluidically translatable in one or more of an upstream direction and a downstream direction along the midline X. In this manner, the combustor system 500 may have a variable geometry. Translation of the centerbody 540 may change which of the first RDC 506, the second RDC 508, and the third RDC 510 are full flow, pilot flow, or centerbody-less.

Figure 6:
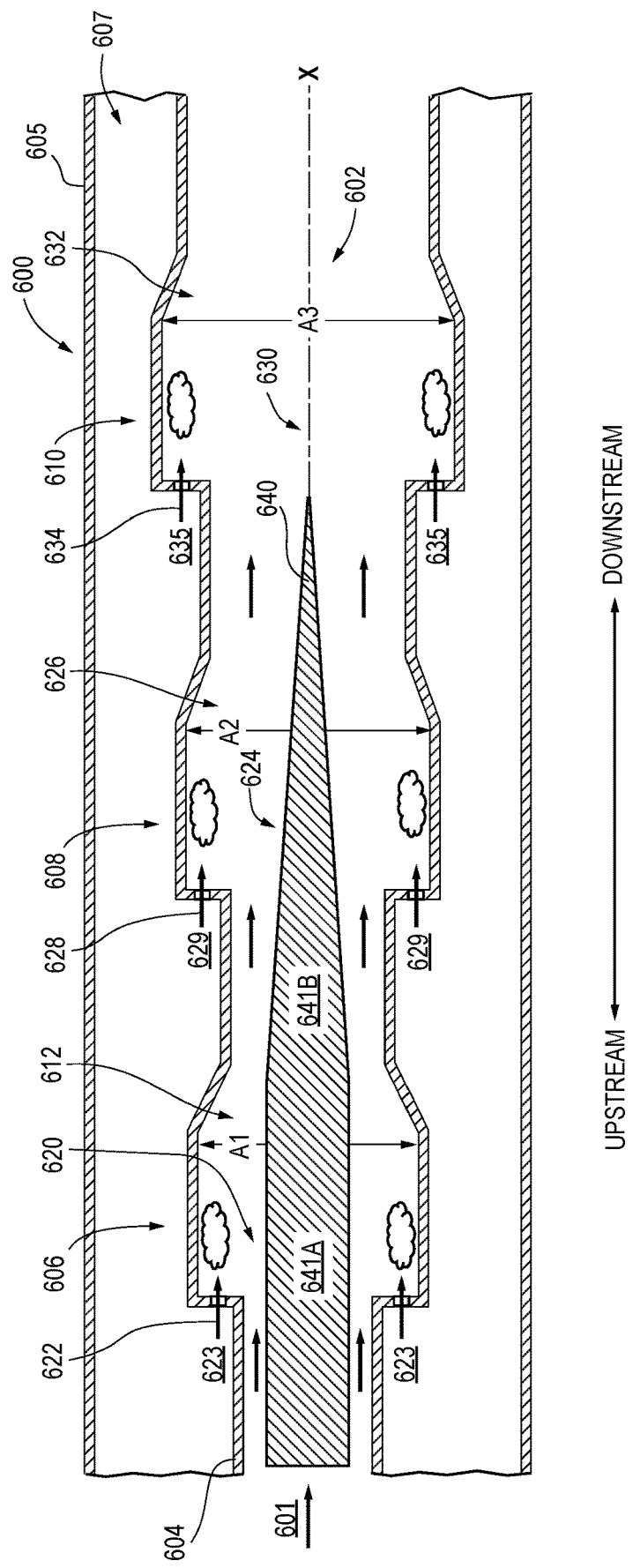
FIG. 6 comprises a schematic cross-sectional side view of a sixth embodiment of a combustor system with serial RDCs.

FIG. 6 shows a sixth embodiment of a combustor system 600 including serial RDCs. At least a portion of the combustor system 600 includes a centerbody 640. At least a portion of the centerbody 640 decreases in cross-sectional size from upstream to downstream. The combustor system 600 includes the combination of expanding serial RDCs having a combination of full flow, pilot flow, and centerbody-less configurations. Elements of the sixth embodiment that are similar to those in the fifth embodiment have been given similar reference numbers in the six-hundred series and only general differences will be discussed. For example, the first RDC 506 described in the fifth embodiment is numbered as the first RDC 606 in the sixth embodiment.

The combustor system 600 includes a first wall 604 separated from a second wall 605 by a space 607. The first wall 604 defines a core 602 that receives a core oxidizer fuel mixture 601. The core 602 includes a first detonation chamber 620, a second detonation chamber 624, and a third detonation chamber 630 arranged in series. The first wall 604 is an inner wall of the combustor system 600. The second wall 605 is an outer wall and may extend around the periphery of the combustor system 600.

The first wall 604 of the combustor system 600 includes a first outer channel 612, a second outer channel 626, and a third outer channel 632. The first outer channel 612 of the first wall 604 is coupled to a first pilot oxidizer-fuel supply 623 by a first pilot fuel supply system 622. The first pilot oxidizer-fuel supply 623 may be coupled to the first outer channel 612 in any suitable manner, for example, by one or more openings in the first wall 604. The second outer channel 626 of the first wall 604 is coupled to a second pilot oxidizer-fuel supply 629 by a second pilot fuel supply system 628. The second pilot oxidizer-fuel supply 629 may be coupled to the second outer channel 626 in any suitable manner, for example, by one or more openings defined in the first wall 604. The third outer channel 632 in the first wall 604 is coupled to a third pilot oxidizer-fuel supply 635 by a third pilot fuel supply system 634. The third pilot oxidizer-fuel supply 635 may be coupled to the third outer channel 632 in any suitable manner, for example, by one or more openings in the first wall 604.

In some approaches, the first pilot oxidizer-fuel supply 623, the second pilot oxidizer-fuel supply 629, and the third pilot oxidizer-fuel supply 635 may be the same supply and, for example, may be a mixture of fuel and oxidizer that is present in the space 607.

The combustor system 600 further includes a first RDC 606, a second RDC 608, and a third RDC 610 within the core 602.

The first RDC 606 includes the first detonation chamber 620, the first outer channel 612, and the first pilot fuel supply system 622. The first RDC 606 has a first cross-sectional area A1. The first detonation chamber 620 surrounded at least in part by the first outer channel 612. The first pilot fuel supply system 622 delivers the first pilot oxidizer-fuel supply 623 to the first outer channel 612.

The second RDC 608 includes the second detonation chamber 624, the second outer channel 626, and the second pilot fuel supply system 628. The second RDC 608 has a second cross-sectional area A2. The second detonation chamber 624 is surrounded at least in part by the second outer channel 626. The second pilot fuel supply system 628 delivers the second pilot oxidizer-fuel supply 629 to the second outer channel 626.

The third RDC 610 includes the third detonation chamber 630, the third outer channel 632, and the third pilot fuel supply system 634. The third RDC 610 has a third cross-sectional area A3. The third detonation chamber 630 is surrounded at least in part by the third outer channel 632. The third pilot fuel supply system 634 delivers the third pilot oxidizer-fuel supply 635 to the third outer channel 632.

The combustor system 600 includes the centerbody 640. The centerbody 640 has a first portion 641A and a second portion 641B. The first portion 641A is upstream of the second portion 641B. The first portion 641A of the centerbody 640 is disposed in the first RDC 606 and has a constant or approximately constant diameter (and cross-sectional area). The second portion 641B of the centerbody 640 is disposed downstream of the first RDC 606 within the second RDC 608. The second portion 641B of the centerbody 640 has a tapered shape that decreases from an upstream end to a downstream end of the second portion 641B. The second portion 641B of the centerbody 640 ends upstream of the third RDC 610.

The combustor system 600 is similar in most respects to the combustor system 500 with a difference being that the core 602 of the combustor system 600 is expanding. That is, the core 602 of the combustor system 600 increases from an upstream end of the combustor system to a downstream end. Accordingly, the first cross-sectional area A1 of the first RDC 606 is smaller than the second cross-sectional area A2 of the second RDC 608 and, similarly, the second cross-sectional area A2 of the second RDC 608 is smaller than the third cross-sectional area A3 of the third RDC 610 (e.g., A1<A2<A3).

In some embodiments, the centerbody 640 may be translatable and may shift through at least a portion of the core 602. For example, the centerbody 640 may be mechanically or fluidically translatable in one or more of an upstream direction and a downstream direction along the midline X.

Figure 7:
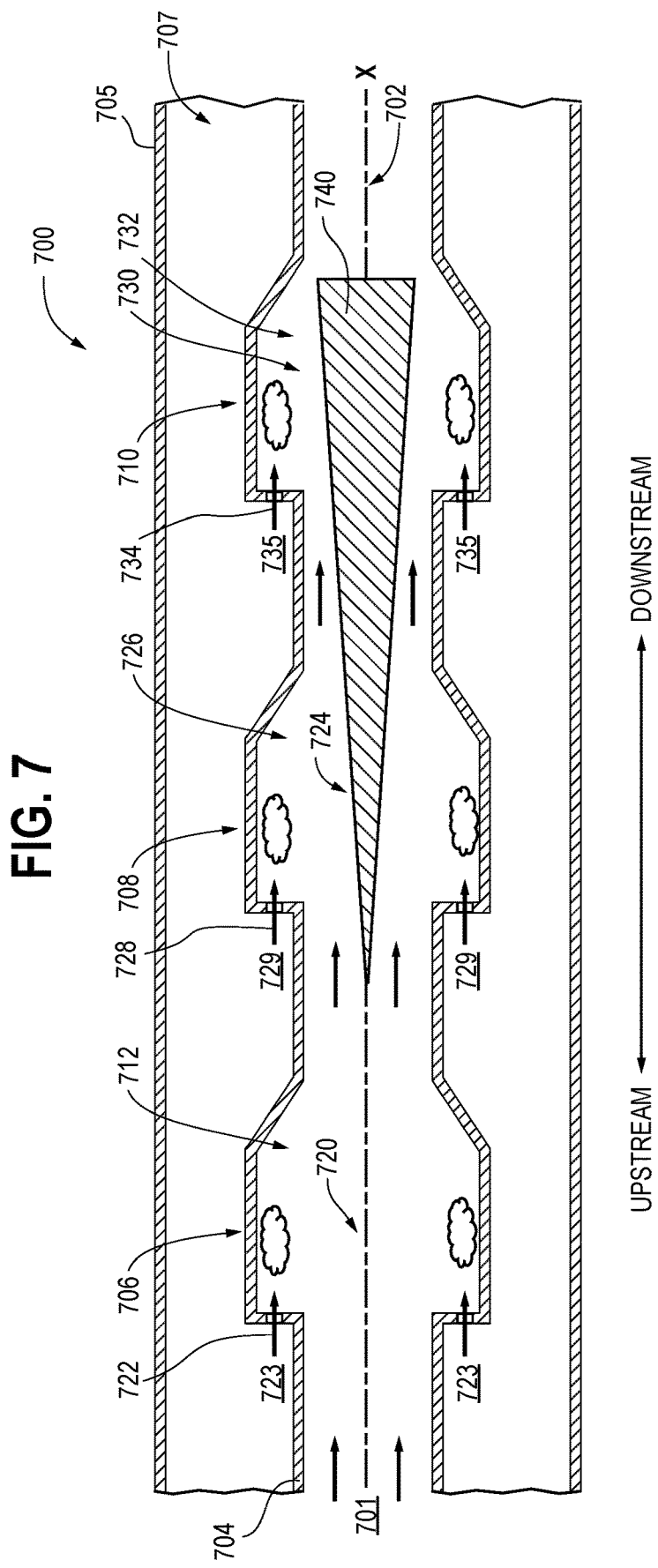
FIG. 7 comprises a schematic cross-sectional side view of a seventh embodiment of a combustor system with serial RDCs.

FIG. 7 shows a seventh embodiment of a combustor system 700 that includes serial RDCs. At least a portion of the combustor system 700 includes a centerbody 740. At least a portion of the centerbody 740 increases in cross-sectional size from upstream to downstream. The combustor system 700 includes serial RDCs having a combination of centerbody-less, pilot flow, and full flow configurations. Elements of the seventh embodiment that are similar to those in the first embodiment have been given similar reference numbers in the seven-hundred series and only general differences will be discussed. For example, the first RDC 106 described in the first embodiment is numbered as the first RDC 706 in the seventh embodiment.

The combustor system 700 includes a first wall 704 separated from a second wall 705 by a space 707. The first wall 704 defines a core 702 that receives a core oxidizer fuel mixture 701. The core 702 includes a first detonation chamber 720, a second detonation chamber 724, and a third detonation chamber 730 arranged in series. The first wall 704 is an inner wall of the combustor system 700. The second wall 705 is an outer wall and may extend around the periphery of the combustor system 700.

The first wall 704 of the combustor system 700 includes a first outer channel 712, a second outer channel 726, and a third outer channel 732. The first outer channel 712 of the first wall 704 is coupled to a first pilot oxidizer-fuel supply 723 by a first pilot fuel supply system 722. The first pilot oxidizer-fuel supply 723 may be coupled to the first outer channel 712 in any suitable manner, for example, by one or more openings in the first wall 704. The second outer channel 726 of the first wall 704 is coupled to a second pilot oxidizer-fuel supply 729 by a second pilot fuel supply system 728. The second pilot oxidizer-fuel supply 729 may be coupled to the second outer channel 726 in any suitable manner, for example, by one or more openings defined in the first wall 704. The third outer channel 732 in the first wall 704 is coupled to a third pilot oxidizer-fuel supply 735 by a third pilot fuel supply system 734. The third pilot oxidizer-fuel supply 735 may be coupled to the third outer channel 732 in any suitable manner, for example, by one or more openings in the first wall 704.

In some approaches, the first pilot oxidizer-fuel supply 723, the second pilot oxidizer-fuel supply 729, and the third pilot oxidizer-fuel supply 735 may be the same supply and, for example, may be a mixture of fuel and oxidizer that is present in the space 707.

The combustor system 700 further includes a first RDC 706, a second RDC 708, and a third RDC 710 within the core 702.

The first RDC 706 includes the first detonation chamber 720, the first outer channel 712, and the first pilot fuel supply system 722. The first detonation chamber 720 is surrounded at least in part by the first outer channel 712. The first pilot fuel supply system 722 delivers the first pilot oxidizer-fuel supply 723 to the first outer channel 712.

The second RDC 708 includes the second detonation chamber 724, the second outer channel 726, and the second pilot fuel supply system 728. The second detonation chamber 724 is surrounded at least in part by the second outer channel 726. The second pilot fuel supply system 728 delivers the second pilot oxidizer-fuel supply 729 to the second outer channel 726.

The third RDC 710 includes the third detonation chamber 730, the third outer channel 732, and the third pilot fuel supply system 734. The third detonation chamber 730 is surrounded at least in part by the third outer channel 732. The third pilot fuel supply system 734 delivers the third pilot oxidizer-fuel supply 735 to the third outer channel 732.

The combustor system 700 is similar in most respects to the combustor system 100 with a difference being that the core 702 of the combustor system 700 includes the centerbody 740. The centerbody 740 is generally cone-shaped and has a tapered shape that increases from an upstream end of the centerbody 740 to a downstream end of the centerbody 740. The centerbody 740 is disposed downstream of the first RDC 706 and extends through the second RDC 708 and the third RDC 710.

Because the centerbody 740 extends through the second RDC 708 and the third RDC 710, the second detonation chamber 724 and the third detonation chamber 730 are annular. Due to the increasing tapered shape of the centerbody 540, the annular cross-sectional areas of the second detonation chamber 724 and the third detonation chamber 730 decrease from upstream to downstream. Further, because the centerbody 740 begins downstream of the first RDC 706, the first detonation chamber 720 is centerbody-less, that is, is uninterrupted from a midline X of the core 702 to the first wall 704. So configured, the combustor system 500 includes a combination of a centerbody-less RDC (e.g., the first RDC 706), a pilot flow RDC (e.g., the second RDC 708), and a full flow RDC (e.g., the third RDC 710).

In some embodiments, the centerbody 740 may be translatable and may shift through at least a portion of the core 702. For example, the centerbody 740 may be mechanically or fluidically translatable in one or more of an upstream direction and a downstream direction along the midline X.

Figure 8:
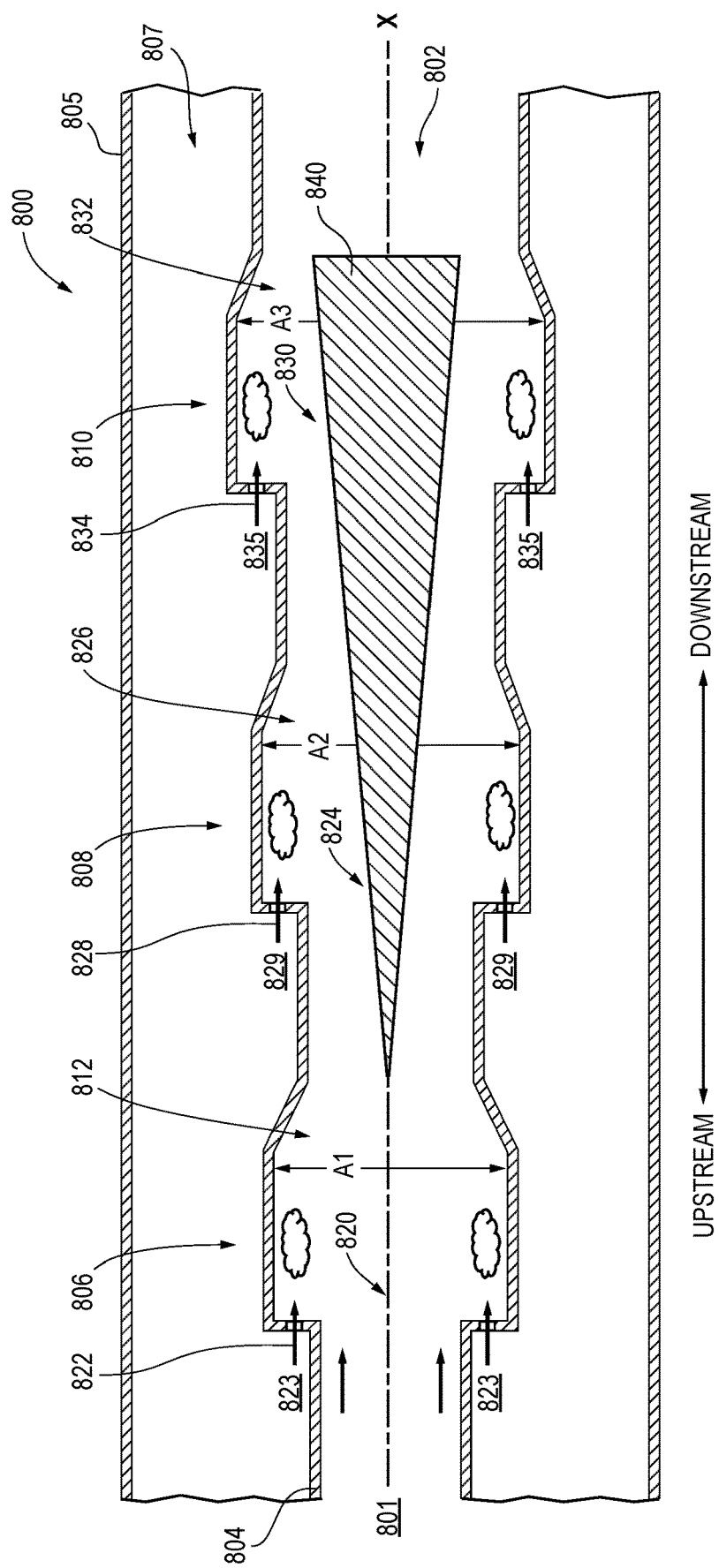
FIG. 8 comprises a schematic cross-sectional side view of an eighth embodiment of a combustor system with serial RDCs.

FIG. 8 an eighth embodiment of a combustor system 800 including serial RDCs. At least a portion of the combustor system 800 includes a centerbody 840. At least a portion of the centerbody 840 increases in cross-sectional size from upstream to downstream. The combustor system 800 includes expanding serial RDCs having a combination of centerbody-less, pilot flow, and full flow configurations. Elements of the eighth embodiment that are similar to those in the seventh embodiment have been given similar reference numbers in the eighth-hundred series and only general differences will be discussed. For example, the first RDC 706 described in the seventh embodiment is numbered as the first RDC 806 in the eighth embodiment.

The combustor system 800 includes a first wall 804 separated from a second wall 805 by a space 807. The first wall 804 defines a core 802 that receives a core oxidizer fuel mixture 801. The core 802 includes a first detonation chamber 820, a second detonation chamber 824, and a third detonation chamber 830 arranged in series. The first wall 804 is an inner wall of the combustor system 800. The second wall 805 is an outer wall and may extend around the periphery of the combustor system 800.

The first wall 804 of the combustor system 800 includes a first outer channel 812, a second outer channel 826, and a third outer channel 832. The first outer channel 812 of the first wall 804 is coupled to a first pilot oxidizer-fuel supply 823 by a first pilot fuel supply system 822. The first pilot oxidizer-fuel supply 823 may be coupled to the first outer channel 812 in any suitable manner, for example, by one or more openings in the first wall 804. The second outer channel 826 of the first wall 804 is coupled to a second pilot oxidizer-fuel supply 829 by a second pilot fuel supply system 828. The second pilot oxidizer-fuel supply 829 may be coupled to the second outer channel 826 in any suitable manner, for example, by one or more openings defined in the first wall 804. The third outer channel 832 in the first wall 804 is coupled to a third pilot oxidizer-fuel supply 835 by a third pilot fuel supply system 734. The third pilot oxidizer-fuel supply 835 may be coupled to the third outer channel 832 in any suitable manner, for example, by one or more openings in the first wall 804.

In some approaches, the first pilot oxidizer-fuel supply 823, the second pilot oxidizer-fuel supply 829, and the third pilot oxidizer-fuel supply 835 may be the same supply and, for example, may be a mixture of fuel and oxidizer that is present in the space 807.

The combustor system 800 also includes a first RDC 806, a second RDC 808, and a third RDC 810 within the core 802.

The first RDC 806 includes the first detonation chamber 820, the first outer channel 812, and the first pilot fuel supply system 822. The first RDC 806 has a first cross-sectional area A1. The first detonation chamber 820 is surrounded at least in part by the first outer channel 812. The first pilot fuel supply system 822 delivers the first pilot oxidizer-fuel supply 823 to the first outer channel 812. The second RDC 808 has a second cross-sectional area A2.

The second RDC 808 includes the second detonation chamber 824, the second outer channel 826, and the second pilot fuel supply system 828. The second detonation chamber 824 is surrounded at least in part by the second outer channel 826. The second pilot fuel supply system 828 delivers the second pilot oxidizer-fuel supply 829 to the second outer channel 826. The third RDC 810 has a third cross-sectional area A3.

The third RDC 810 includes the third detonation chamber 830, the third outer channel 832, and the third pilot fuel supply system 834. The third detonation chamber 830 is surrounded at least in part by the third outer channel 832. The third pilot fuel supply system 834 delivers the third pilot oxidizer-fuel supply 835 to the third outer channel 832.

The combustor system 800 is similar in most respects to the combustor system 700 with a difference being that the core 802 of the combustor system 800 is expanding. That is, the core 802 of the combustor system 800 increases from an upstream end of the combustor system to a downstream end. Accordingly, the first cross-sectional area A1 of the first RDC 806 is smaller than the second cross-sectional area A2 of the second RDC 808 and, similarly, the second cross-sectional area A2 of the second RDC 808 is smaller than the third cross-sectional area A3 of the third RDC 810 (e.g., A1<A2<A3).

In some embodiments, the centerbody 840 may be translatable and may shift through at least a portion of the core 802. For example, the centerbody 840 may be mechanically or fluidically translatable in one or more of an upstream direction and downstream direction along the midline X.

Figure 9:
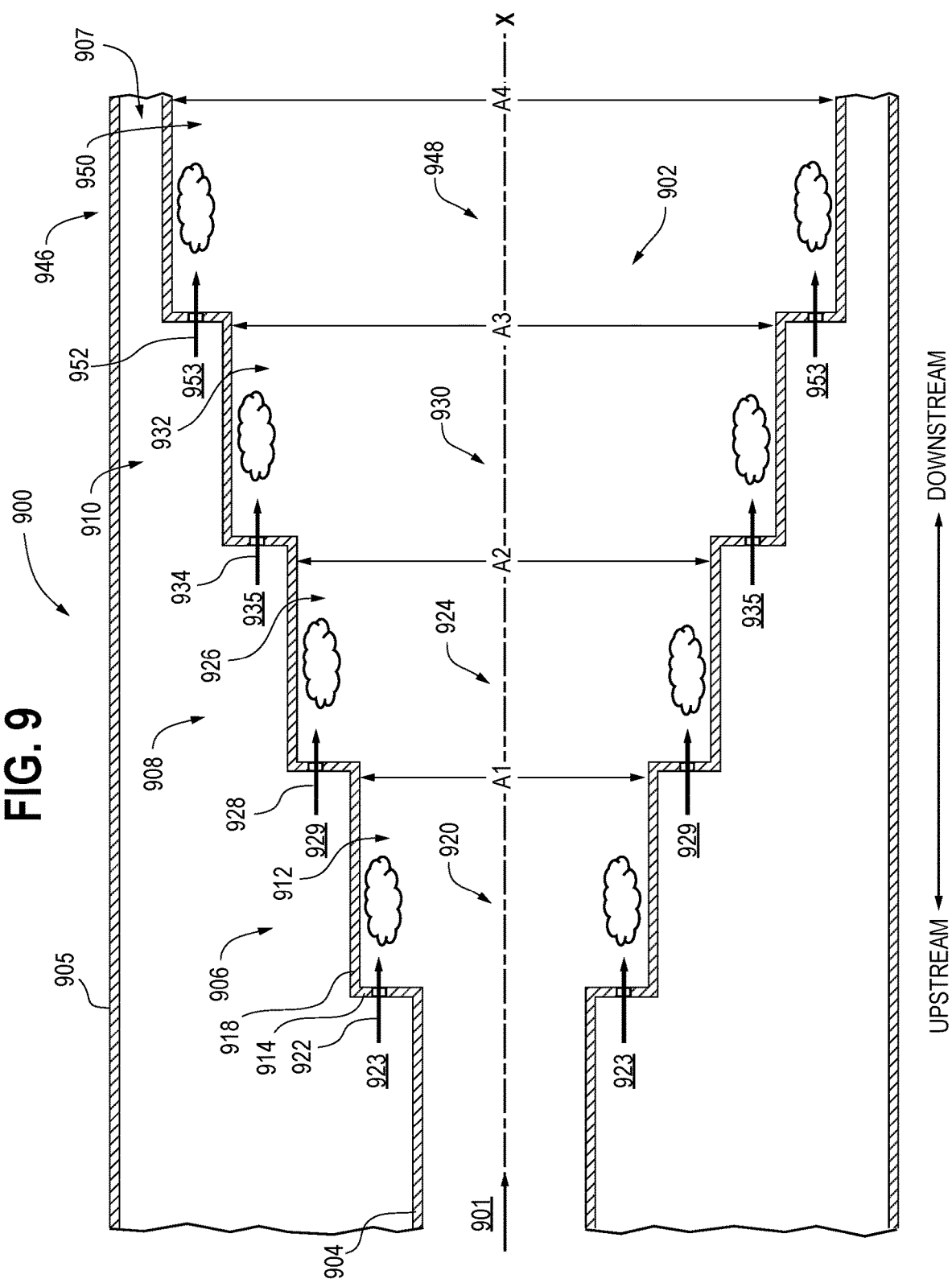
FIG. 9 comprises a schematic cross-sectional side view of a ninth embodiment of a combustor system with serial RDCs.

FIG. 9 shows a ninth embodiment of a combustor system 900 including serial RDCs. In particular, the combustor system 900 includes expanding centerbody-less serial RDCs. Elements of the ninth embodiment that are similar to those in the first embodiment have been given similar reference numbers in the nine-hundred series and only general differences will be discussed. For example, the first RDC 106 described in the first embodiment is numbered as the first RDC 906 in the ninth embodiment.

The combustor system 900 includes a first wall 904 separated from a second wall 905 by a space 907. The first wall 904 defines a core 902 that receives a core oxidizer fuel mixture 901. The core 902 includes a first detonation chamber 920, a second detonation chamber 924, a third detonation chamber 930, and a fourth detonation chamber 948 arranged in series. The first wall 904 is an inner wall of the combustor system 900. The second wall 905 is an outer wall and may extend around the periphery of the combustor system 900.

The first wall 904 of the combustor system 900 includes a first outer channel 912, a second outer channel 926, a third outer channel 932, and a fourth outer channel 950. The first outer channel 912 of the first wall 904 is coupled to a first pilot oxidizer-fuel supply 923 by a first pilot fuel supply system 922. The first pilot oxidizer-fuel supply 923 may be coupled to the first outer channel 912 in any suitable manner, for example, by one or more openings in the first wall 904. The second outer channel 926 of the first wall 904 is coupled to a second pilot oxidizer-fuel supply 929 by a second pilot fuel supply system 928. The second pilot oxidizer-fuel supply 929 may be coupled to the second outer channel 926 in any suitable manner, for example, by one or more openings defined in the first wall 904. The third outer channel 932 in the first wall 904 is coupled to a third pilot oxidizer-fuel supply 935 by a third pilot fuel supply system 934. The third pilot oxidizer-fuel supply 935 may be coupled to the third outer channel 932 in any suitable manner, for example, by one or more openings in the first wall 904. The fourth outer channel 950 in the first wall 904 is coupled to a fourth pilot oxidizer-fuel supply 953 by a fourth pilot fuel supply system 952. The fourth pilot oxidizer-fuel supply 953 may be coupled to the fourth outer channel 950 in any suitable manner, for example, by one or more openings in the first wall 904.

In some approaches, the first pilot oxidizer-fuel supply 923, the second pilot oxidizer-fuel supply 929, the third pilot oxidizer-fuel supply 935, and the fourth pilot oxidizer-fuel supply 953 may be the same supply and, for example, may be a mixture of fuel and oxidizer that is present in the space 907.

One difference between the first and ninth embodiments is that the combustor system 900 has a first wall 904 that is stepped and defines detonation chambers that increase in size from an upstream portion of the combustor system 900 to a downstream portion of the combustor system 900. Another difference is in the shape of the first outer channel 912, the second outer channel 926, the third outer channel 932, and the fourth outer channel 950. The stepped arrangement of the first wall 904 forms channels that lack a forward-facing step and, instead, only include a backward-facing step 914 and a recessed portion 918. Though removal of the forward-facing step may potentially reduce the effectiveness of the detonation wave to penetrate towards the center, in certain applications, this may be a preferred approach.

The combustor system 900 includes a first RDC 906, a second RDC 908, a third RDC 910, and a fourth RDC 946. The combustor system 900 has a core 902 that is bounded by the first wall 904. The core 902 is void of a centerbody. The first wall 904 is stepped to define a plurality of stabilization structures therein (e.g., a first outer channel 912, a second outer channel 926, a third outer channel 932, and a fourth outer channel 950).

The first RDC 906 includes the first detonation chamber 920, the first outer channel 912, and the first pilot fuel supply system 922. The first RDC 906 has a first cross-sectional area A1. The first detonation chamber 920 is bounded by a first outer channel 912. The first outer channel 912 includes a backward-facing step 914 and a recessed portion 918. The recessed portion 918 is recessed relative to an adjacent portion of the first wall 904. A first pilot fuel supply system 922 is coupled to the first outer channel 912 to deliver the first pilot oxidizer-fuel supply 923 to one or more of the first outer channel 912 and the first detonation chamber 920.

The second RDC 908 includes the second detonation chamber 924, the second outer channel 926, and the second pilot fuel supply system 928. The second RDC 908 has a second cross-sectional area A2. The second detonation chamber 924, the second outer channel 926, and the second pilot fuel supply system 928 are similar to the first detonation chamber 920, the first outer channel 912, and the first pilot fuel supply system 922, respectively.

The third RDC 910 includes the third detonation chamber 930, the third outer channel 932, and the third pilot fuel supply system 934. The third RDC 910 has a third cross-sectional area A3. The third detonation chamber 930, the third outer channel 932, and the third pilot fuel supply system 934 are similar to the first detonation chamber 920, the first outer channel 912, and the first pilot fuel supply system 922, respectively.

The fourth RDC 946 includes a fourth detonation chamber 948, the fourth outer channel 950, and the fourth pilot fuel supply system 952. The fourth RDC 946 has a fourth cross-sectional area A4. The fourth RDC 946 includes a fourth detonation chamber 948, a fourth outer channel 950, and a fourth pilot fuel supply system 952 that are similar to the first detonation chamber 920, the first outer channel 912, and the first pilot fuel supply system 922, respectively.

In the combustor system 900, the cross-sectional areas of the serial RDCs increase from an upstream end of the combustor system 900 to a downstream end (e.g., A1<A2<A3<A4). That is, the first cross-sectional area A1 of the first RDC 906 is smaller than the second cross-sectional area A2 of the second RDC 908, which is smaller than the third cross-sectional area A3 of the third RDC 910, which is smaller than the fourth cross-sectional area A4 of the fourth RDC 946.

Figure 10:
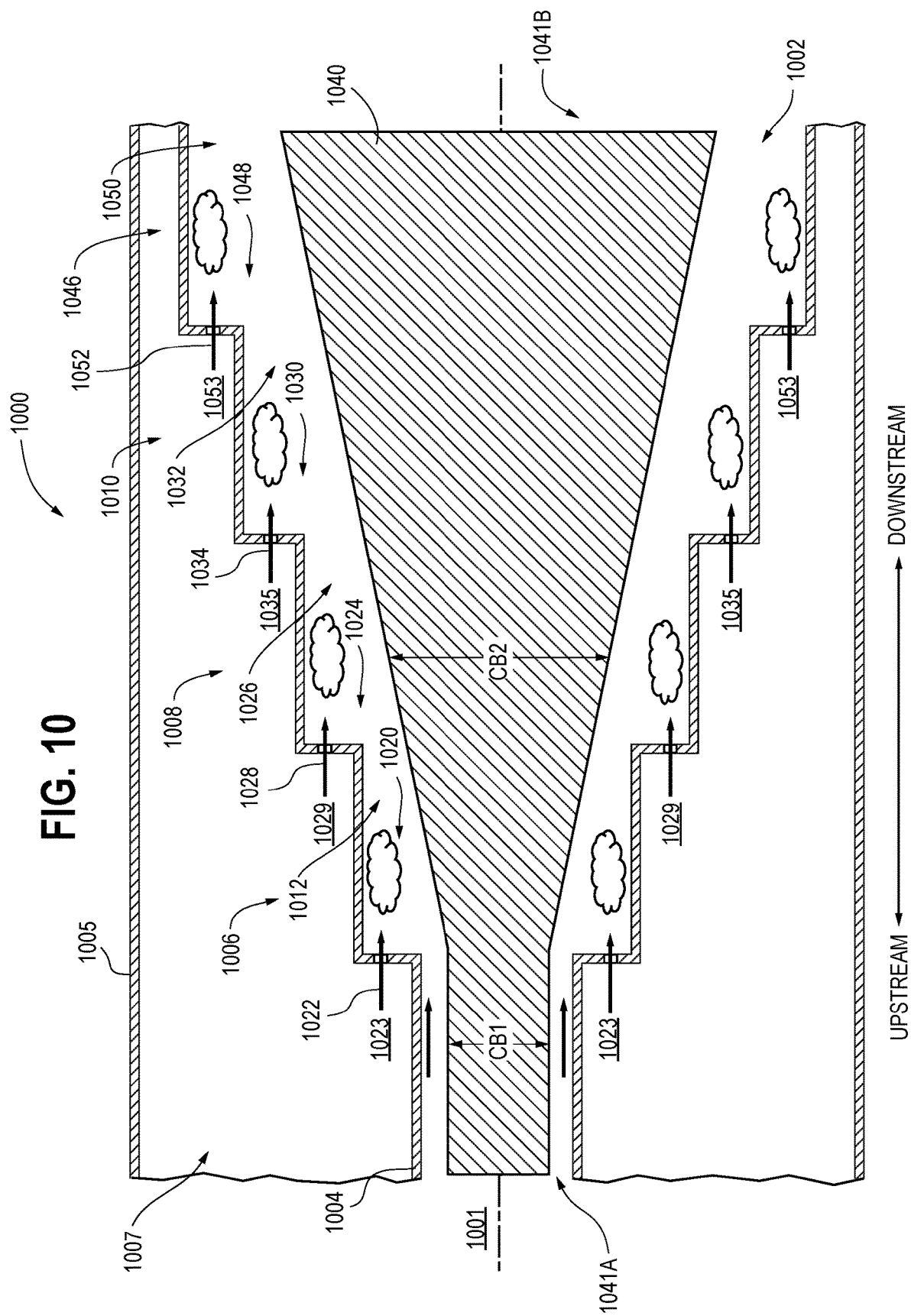
FIG. 10 comprises a schematic cross-sectional side view of a tenth embodiment of a combustor system with serial RDCs.

FIG. 10 shows a tenth embodiment of a combustor system 1000 including serial RDCs. In particular, the combustor system 1000 includes expanding serial RDCs with a centerbody 1040. At least a portion of the centerbody 1040 increases in cross-sectional size from upstream to downstream. Elements of the tenth embodiment that are similar to those in the ninth embodiment have been given similar reference numbers in the ten-hundred series and only general differences will be discussed. For example, the first RDC 906 described in the ninth embodiment is numbered as the first RDC 1006 in the tenth embodiment. One difference between the ninth and tenth embodiments is that the combustor system 1000 in the tenth embodiment has a centerbody 1040.

The combustor system 1000 includes a first wall 1004 separated from a second wall 1005 by a space 1007. The first wall 1004 defines a core 1002 that receives a core oxidizer fuel mixture 1001. The core 1002 includes a first detonation chamber 1020, a second detonation chamber 1024, a third detonation chamber 1030, and a fourth detonation chamber 1048 arranged in series. The first wall 1004 is an inner wall of the combustor system 1000. The second wall 1005 is an outer wall and may extend around the periphery of the combustor system 1000.

The first wall 1004 of the combustor system 1000 includes a first outer channel 1012, a second outer channel 1026, a third outer channel 1032, and a fourth outer channel 1050. The first outer channel 1012 of the first wall 1004 is coupled to a first pilot oxidizer-fuel supply 1023 by a first pilot fuel supply system 1022. The first pilot oxidizer-fuel supply 1023 may be coupled to the first outer channel 1012 in any suitable manner, for example, by one or more openings in the first wall 1004. The second outer channel 1026 of the first wall 1004 is coupled to a second pilot oxidizer-fuel supply 1029 by a second pilot fuel supply system 1028. The second pilot oxidizer-fuel supply 1029 may be coupled to the second outer channel 1026 in any suitable manner, for example, by one or more openings defined in the first wall 1004. The third outer channel 1032 in the first wall 1004 is coupled to a third pilot oxidizer-fuel supply 1035 by a third pilot fuel supply system 1034. The third pilot oxidizer-fuel supply 1035 may be coupled to the third outer channel 1032 in any suitable manner, for example, by one or more openings in the first wall 1004. The fourth outer channel 1050 in the first wall 1004 is coupled to a fourth pilot oxidizer-fuel supply 1053 by a fourth pilot fuel supply system 1052. The fourth pilot oxidizer-fuel supply 1053 may be coupled to the fourth outer channel 1050 in any suitable manner, for example, by one or more openings in the first wall 1004.

In some approaches, the first pilot oxidizer-fuel supply 1023, the second pilot oxidizer-fuel supply 1029, the third pilot oxidizer-fuel supply 1035, and the fourth pilot oxidizer-fuel supply 1053 may be the same supply and, for example, may be a mixture of fuel and oxidizer that is present in the space 1007.

The combustor system 1000 includes a first RDC 1006, a second RDC 1008, a third RDC 1010, and a fourth RDC 1046 in the core 1002.

The first RDC 1006 includes the first detonation chamber 1020, the first outer channel 1012, and the first pilot fuel supply system 1022. The first detonation chamber 1020 is surrounded at least in part by the first outer channel 1012. The first pilot fuel supply system 1022 that delivers the first pilot oxidizer-fuel supply 1023 to the first outer channel 1012.

The second RDC 1008 includes the second detonation chamber 1024, the second outer channel 1026, and the second pilot fuel supply system 1028. The second detonation chamber 1124 is surrounded at least in part by the second outer channel 1026. The second pilot fuel supply system 1028 delivers the second pilot oxidizer-fuel supply 1029 to the second outer channel 1026.

The third RDC 1010 includes the third detonation chamber 1030, the third outer channel 1032, and the third pilot fuel supply system 1034. The third detonation chamber 1130 is surrounded at least in part by the third outer channel 1032. The third pilot fuel supply system 1034 that delivers the third pilot oxidizer-fuel supply 1035 to the third outer channel 1032.

The fourth RDC 1046 includes the fourth detonation chamber 1048, the fourth outer channel 1050, and the fourth pilot fuel supply system 1052. The fourth detonation chamber 1048 is surrounded at least in part by the fourth outer channel 1050. The fourth pilot fuel supply system 1052 delivers the fourth pilot oxidizer-fuel supply 1053 to the fourth outer channel 1050.

The centerbody 1040 of the combustor system 1000 extends axially through the core 1002 from an upstream portion of the combustor system 1000 to a downstream portion. The centerbody 1040 has a first portion 1041A and a second portion 1041B. The first portion 1041A is upstream of the second portion 1041B. The first portion 1041A has a constant or approximately constant cross-sectional area CB1 and, accordingly, is generally cylindrical in shape (not shown in the cross-sectional view of FIG. 10). The second portion 1041B of the centerbody 1040 has an increasing cross-sectional area CB2 is generally cone-shaped (not shown in the cross-sectional view of FIG. 10). The second portion 1041B has a tapered shape that increases from an upstream portion of the combustor system 1000 to a downstream portion of the combustor system 1000. Due to the presence of the centerbody 1040, the first detonation chamber 1020, the second detonation chamber 1024, and the third detonation chamber 1030 are annular. Further, the tapered shape of the centerbody 1040 results in the first detonation chamber 1020, the second detonation chamber 1024, the third detonation chamber 1030, and the fourth detonation chamber 1048 being approximately the same size (e.g., having approximately the same cross-sectional area, the same volume, etc.).

In some embodiments, the centerbody 1040 may be translatable and may shift through at least a portion of the core 1002. For example, the centerbody 1040 may be mechanically or fluidically translatable in one or more of an upstream direction and a downstream direction along the midline X.

Figure 11:
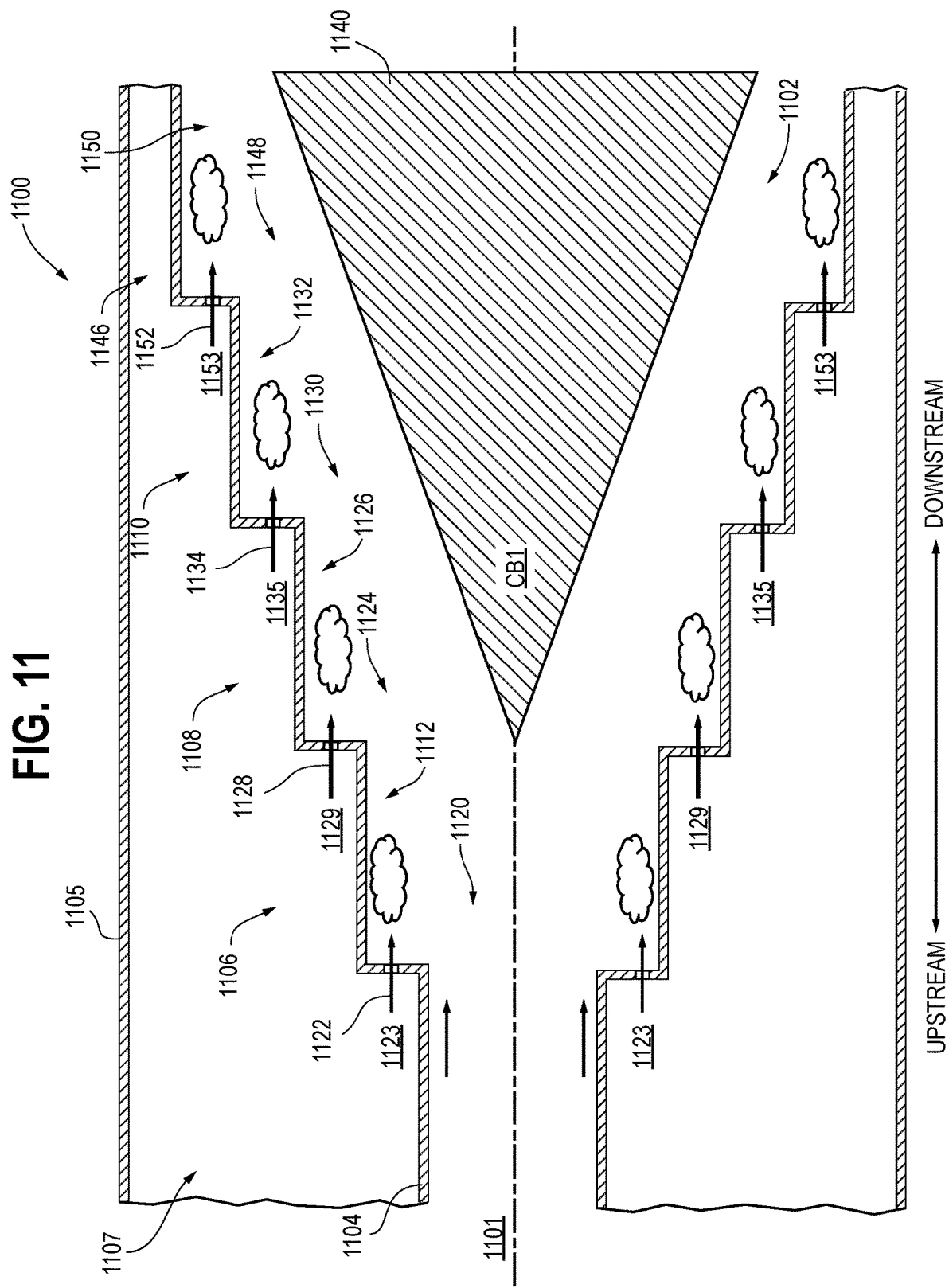
FIG. 11 comprises a schematic cross-sectional side view of an eleventh embodiment of a combustor system with serial RDCs.

FIG. 11 shows an eleventh embodiment of a combustor system 1100 that includes serial RDCs. The combustor system 1100 includes expanding serial RDCs with a combination of centerbody-less, pilot flow, and full flow RDCs. Elements of the eleventh embodiment that are similar to those in the ninth embodiment have been given similar reference numbers in the ten-hundred series and only general differences will be discussed. For example, the first RDC 906 described in the ninth embodiment is numbered as the first RDC 1106 in the eleventh embodiment. One difference between the ninth and eleventh embodiments is that the combustor system 1100 has a centerbody 1140 disposed in a portion of the combustor system 1100.

The combustor system 1100 includes a first wall 1104 separated from a second wall 1105 by a space 1107. The first wall 1104 defines a core 1102 that receives a core oxidizer fuel mixture 1101. The core 1102 includes a first detonation chamber 1120, a second detonation chamber 1124, a third detonation chamber 1130, and a fourth detonation chamber 1148 arranged in series. The first wall 1104 is an inner wall of the combustor system 1100. The second wall 1105 is an outer wall and may extend around the periphery of the combustor system 1100.

The first wall 1104 of the combustor system 1100 includes a first outer channel 1112, a second outer channel 1126, a third outer channel 1132, and a fourth outer channel 1150. The first outer channel 1112 of the first wall 1104 is coupled to a first pilot oxidizer-fuel supply 1123 by a first pilot fuel supply system 1122. The first pilot oxidizer-fuel supply 1123 may be coupled to the first outer channel 1112 in any suitable manner, for example, by one or more openings in the first wall 1104. The second outer channel 1126 of the first wall 1104 is coupled to a second pilot oxidizer-fuel supply 1129 by a second pilot fuel supply system 1128. The second pilot oxidizer-fuel supply 1129 may be coupled to the second outer channel 1126 in any suitable manner, for example, by one or more openings defined in the first wall 1104. The third outer channel 1132 in the first wall 1104 is coupled to a third pilot oxidizer-fuel supply 1135 by a third pilot fuel supply system 1134. The third pilot oxidizer-fuel supply 1135 may be coupled to the third outer channel 1132 in any suitable manner, for example, by one or more openings in the first wall 1104. The fourth outer channel 1150 in the first wall 1104 is coupled to a fourth pilot oxidizer-fuel supply 1153 by a fourth pilot fuel supply system 1152. The fourth pilot oxidizer-fuel supply 1053 may be coupled to the fourth outer channel 1150 in any suitable manner, for example, by one or more openings in the first wall 1104.

In some approaches, the first pilot oxidizer-fuel supply 1123, the second pilot oxidizer-fuel supply 1129, the third pilot oxidizer-fuel supply 1135, and the fourth pilot oxidizer-fuel supply 1153 may be the same supply and, for example, may be a mixture of fuel and oxidizer that is present in the space 1107.

The combustor system 1100 includes a first RDC 1106, a second RDC 1108, a third RDC 1110, and a fourth RDC 1146.

The first RDC 1106 includes the first detonation chamber 1120, the first outer channel 1112, and the first pilot fuel supply system 1122. The first detonation chamber 1120 is surrounded at least in part by the first outer channel 1112. The first pilot fuel supply system 1122 delivers the first pilot oxidizer-fuel supply 1123 to the first outer channel 1112.

The second RDC 1108 includes the second detonation chamber 1124, the second outer channel 1126, and the second pilot fuel supply system 1128. The second detonation chamber 1124 is surrounded at least in part by the second outer channel 1126. The second pilot fuel supply system 1128 delivers the second pilot oxidizer-fuel supply 1129 to the second outer channel 1126.

The third RDC 1110 includes the third detonation chamber 1130, the third outer channel 1132, and the third pilot fuel supply system 1134. The third detonation chamber 1130 is surrounded at least in part by the third outer channel 1132. The third pilot fuel supply system 1134 delivers the third pilot oxidizer-fuel supply 1135 to the third outer channel 1132.

The fourth RDC 1146 includes the fourth detonation chamber 1148, the fourth outer channel 1150, and the fourth pilot fuel supply system 1152. The fourth detonation chamber 1148 is surrounded at least in part by the fourth outer channel 1150. The fourth pilot fuel supply system 1152 delivers the fourth pilot oxidizer-fuel supply 1153 to the fourth outer channel 1150.

The centerbody 1140 of the combustor system 1100 extends axially through the core 1102 from an upstream portion of the combustor system 1100 to a downstream portion. The centerbody 1140 begins after the first RDC 1106 and extends through the second RDC 1108, the third RDC 1110, and the fourth RDC 1146. Due to the positioning of the centerbody 1140, the first detonation chamber 1120 of the first RDC 1106 is cylindrical and generally unobstructed. By contrast, the second detonation chamber 1124 of the second RDC 1108, the third detonation chamber 1130 of the third RDC 1110, and the fourth detonation chamber 1148 of the fourth RDC 1146 are annular in shape.

The centerbody 1140 has a tapered shape that increases in size from an upstream portion to a downstream portion of the centerbody 1140. The centerbody 1140 is generally cone-shaped (not shown in the cross-sectional view of FIG. 11). The centerbody 1140 has a cross-sectional area CB1 that increases in cross-sectional area from an upstream portion of the combustor system 1100 to a downstream portion.

In some embodiments, the centerbody 1140 may be translatable and may shift through at least a portion of the core 1102. For example, the centerbody 1140 may be mechanically or fluidically translatable in one or more of an upstream direction and a downstream direction along the midline X.

Figure 12:
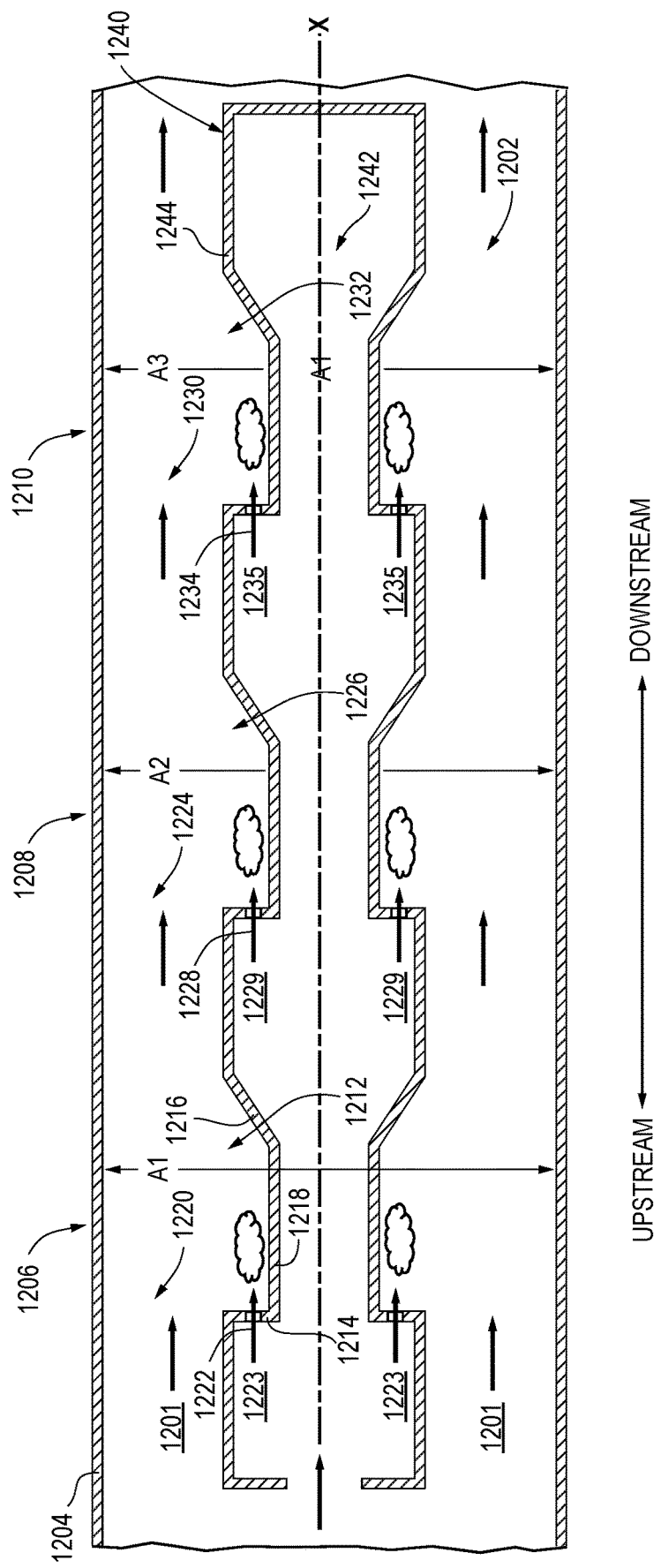
FIG. 12 comprises a schematic cross-sectional side view of a twelfth embodiment of a combustor system with serial RDCs.
Figure 13:
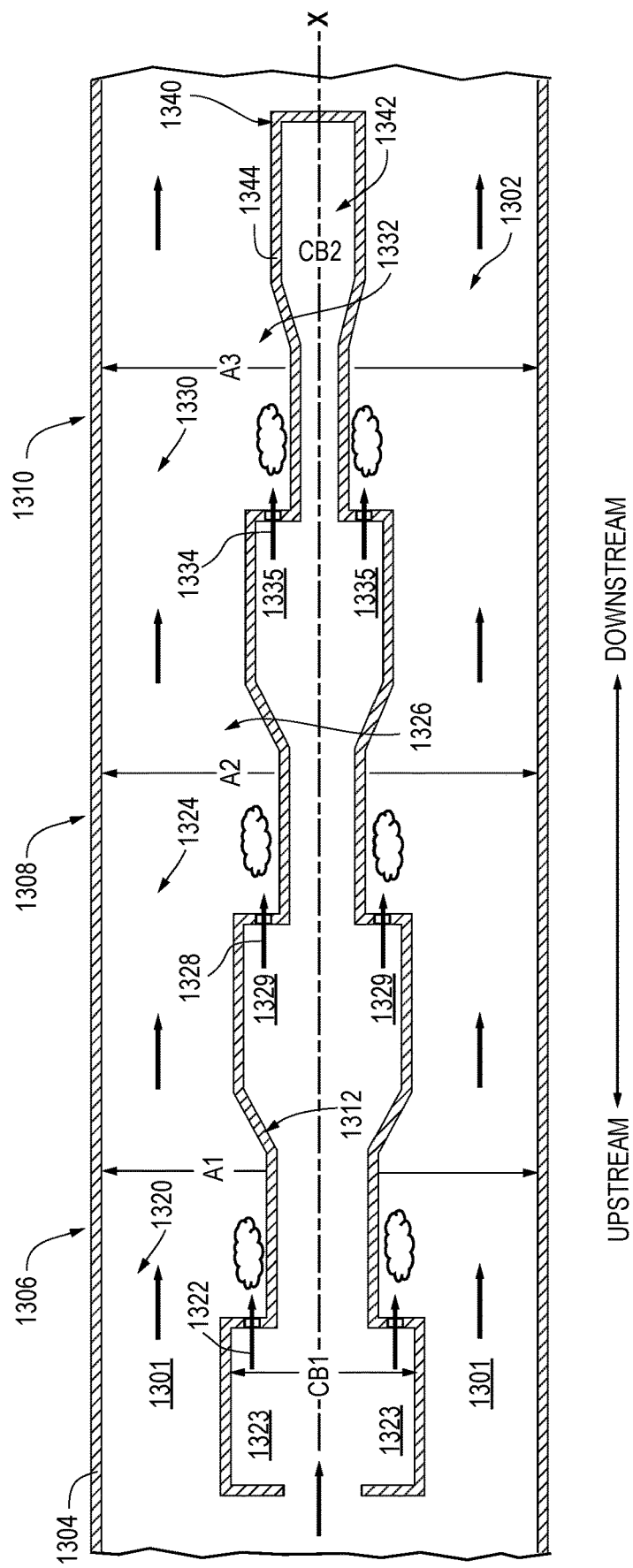
FIG. 13 comprises a schematic cross-sectional side view of a thirteenth embodiment of a combustor system with serial RDCs.
Figure 14:
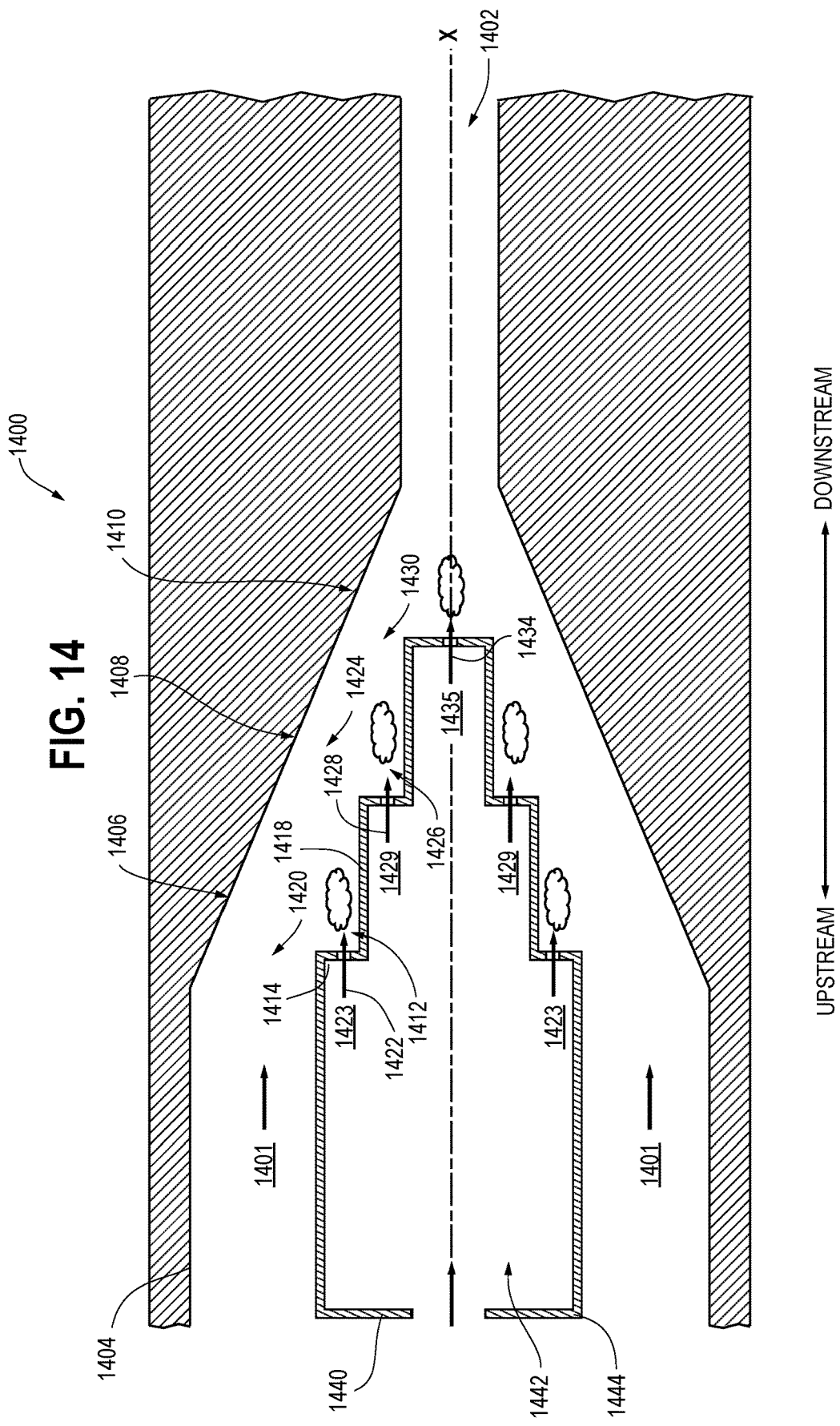
FIG. 14 comprises a schematic cross-sectional side view of a fourteenth embodiment of a combustor system with serial RDCs.

Turning now to FIGS. 12-14, various combustor systems are shown that include a plurality of RDCs in series. In the embodiments of FIGS. 12-14, the RDCs include inner channels and inner pilot oxidizer-fuel supplies that for inner pilots that initiate rotating detonation reactions. The inner channels are formed in a centerbody of the combustor systems and, accordingly, rotating detonation waves initiated in the inner channels may travel radially outwardly. In this manner, the rotating detonation reactions that are initiated in the inner channels can support combustion reactions in an annulus surrounding the centerbody of the system.

FIG. 12 shows a twelfth embodiment of a combustor system 1200 including serial RDCs. The combustor system 1200 includes serial RDCs having the same or a similar cross-sectional area and with centerbody injection of pilot fuel. Elements of the twelfth embodiment that are similar to those in the first embodiment have been given similar reference numbers in the twelve-hundred series and only general differences will be discussed. For example, the first RDC 106 described in the first embodiment is numbered as the first RDC 1206 in the twelfth embodiment. The combustor system 1200 is similar to the combustor system 100 with a difference being that the combustor system 1200 lacks a second wall and includes a centerbody 1240. Pilot fuel is injected into the RDCs via the centerbody 1240 rather than being injected along the first wall 1204. Further, the serial RDCs in the combustor system 1200 include inner channels formed in an external surface 1244 of the centerbody 1240 rather than outer channels formed in the first wall 1204.

The first wall 1204 of the combustor system 1200 defines a core 1202. The first wall 1204 may extend about the periphery of the combustor system 1200. The first wall 1204 defines a core 1202 that receives a core oxidizer fuel mixture 1201. The core 1202 includes a first detonation chamber 1220, a second detonation chamber 224, and a third detonation chamber 1230 arranged in series. The centerbody 1240 is disposed in the core 1202 extends axially along the midline X. The centerbody 1240 is bounded at least in part by the external surface 1244. The external surface 1244 is spaced from the first wall 1204. A cavity 1242 or opening extends through the centerbody 1240.

The external surface 1244 of the centerbody 1240 includes a first inner channel 1212, a second inner channel 1226, and a third inner channel 1232. The first inner channel 1212 of the centerbody 1240 is coupled to a first pilot oxidizer-fuel supply 1223 by a first pilot fuel supply system 1222. The first pilot oxidizer-fuel supply 1223 may be coupled to the first inner channel 1212 in any suitable manner, for example, by one or more openings in the external surface 1244 of the centerbody 1240. The second inner channel 1226 of the centerbody 1240 is coupled to a second pilot oxidizer-fuel supply 1229 by a second pilot fuel supply system 1228. The second pilot oxidizer-fuel supply 1229 may be coupled to the second inner channel 1226 in any suitable manner, for example, by one or more openings defined in the external surface 1244 of the centerbody 1240. The third inner channel 1232 in the centerbody 1240 is coupled to a third pilot oxidizer-fuel supply 1235 by a third pilot fuel supply system 1234. The third pilot oxidizer-fuel supply 1235 may be coupled to the third inner channel 1232 in any suitable manner, for example, by one or more openings in the external surface 1244 of the centerbody 1240.

In some approaches, the first pilot oxidizer-fuel supply 1223, the second pilot oxidizer-fuel supply 1229, and the third pilot oxidizer-fuel supply 1235, may be the same supply and, for example, may be a mixture of fuel and oxidizer that is present in the space 1207. For example, pilot fuel or a pilot fuel-oxidizer mixture may be injected into the cavity 1242 of the centerbody 1240 to provide pilot fuel for the RDCs.

The combustor system 1200 further includes a first RDC 1206, a second RDC 1208, and a third RDC 1210 arranged in series.

The first RDC 1206 includes the first detonation chamber 1220, the first inner channel 1212, and the first pilot fuel supply system 1222. The first RDC 1206 has a first cross-sectional area A1. Due to the presence of the centerbody 1240, the first detonation chamber 1220 is generally annular in shape. The external surface 1244 of the centerbody 1240 forms an inner wall of the first detonation chamber 1220 and the first wall 1204 forms an outer wall of the first detonation chamber 1220. The first detonation chamber 1220 is bounded at least in part by a first inner channel 1212 formed in the external surface 1244 of the centerbody 1240. Similar to the first outer channel 112, the first inner channel 1212 includes a backward-facing step 1214 and a forward-facing step 1216 that are recessed in the external surface 1244 of the centerbody 1240 and joined together by a recessed surface 1218. The recessed surface 1218 is recessed, for example, relative to adjacent portions of the external surface 1244. A first pilot fuel supply system 1222 is coupled to the first inner channel 1212. The first pilot fuel supply system 1222 receives the first pilot oxidizer-fuel supply 1223 from the cavity 1242 of the centerbody 1240 and delivers the first pilot oxidizer-fuel supply 1223 to the first inner channel 1212 to support one or more reactions occurring therein.

The second RDC 1208 includes the second detonation chamber 1224, the second inner channel 1226, and the second pilot fuel supply system 1228. The second RDC 1208 has a second cross-sectional area A2. The second detonation chamber 1224 is similar to the first detonation chamber 1220. The second inner channel 1226 and the second pilot fuel supply system 1228 are similar to the first inner channel 1212 and the first pilot fuel supply system 1222, respectively.

The third RDC 1210 includes the third detonation chamber 1230, the third inner channel 1232, and the third pilot fuel supply system 1234. The third RDC 1210 has a third cross-sectional area A3. The third detonation chamber 1230 is similar to the first detonation chamber 1220. The third inner channel 1232 and the third pilot fuel supply system 1234 are similar to the first inner channel 1212 and the first pilot fuel supply system 1222, respectively.

The cross-sectional areas of the first RDC 1206, the second RDC 1208, and the third RDC 1210 are approximately the same and generally do not vary from an upstream portion of the combustor system 1200 to a downstream portion of the combustor system 1200. That is, the first cross-sectional area A1, the second cross-sectional area A2, and the third cross-sectional area A3 are the same or approximately the same.

In operation, a rotating detonation reaction is initiated in one or more of the first RDC 1206, the second RDC 1208, and the third RDC 1210. The first inner channel 1212 and the first pilot fuel supply system 1222 act as an inner pilot for rotating detonation reactions and combustion reactions occurring within the first detonation chamber 1220. In the first RDC, the first pilot fuel supply system 1222 supplies a pilot fuel or a pilot fuel-oxidizer mixture to the first inner channel 1212. The first pilot fuel supply system 1222 receives pilot fuel or a pilot fuel-oxidizer mixture from the cavity 1242 of the centerbody 1240. An igniter (not shown) ignites the pilot fuel-oxidizer mixture in the first inner channel 1212 to initiate the rotating detonation reaction. The rotating detonation reaction produces a rotating detonation wave. The first inner channel 1212 may anchor the rotating detonation wave such that the wave propagates circumferentially around the centerbody 1240 in the first detonation chamber 1220. In addition, the first inner channel 1212 may help to direct the rotating detonation wave axially through the first detonation chamber 1220 away from the centerbody 1240 so that the reaction can consume a core oxidizer-fuel mixture present in the core of the first detonation chamber 1220 and adjacent to the first wall 1204. Similar reactions occur in one or more of the second RDC 1208 and the third RDC 1210.

FIG. 13 shows a thirteenth embodiment of a combustor system 1300 including a plurality of serial RDCs. The combustor system 1300 includes serial RDCs having an increasing cross-sectional area and centerbody injection of the pilot flow. Elements of the thirteenth embodiment that are similar to those in the twelfth embodiment have been given similar reference numbers in the thirteen-hundred series and only general differences will be discussed. For example, the first RDC 1206 described in the twelfth embodiment is numbered as the first RDC 1306 in the thirteenth embodiment. The combustor system 1300 is similar to the combustor system 1200 with a difference being that the combustor system 1300 has a centerbody 1340. The centerbody 1340 has a first cross-sectional area CB1 that is greater than a second-cross sectional area CB2. The cross-sectional area CB1 is a cross-sectional area of an upstream portion of the combustor system 1300 while the cross-sectional area CB2 is a cross-sectional area of a downstream portion of the combustor system 1300. The cross-sectional area of the centerbody 1340 need not decrease linearly. A cavity 1342 or opening extends through the centerbody 1340.

The combustor system 1300 is bounded by a first wall 1304 surrounding a core 1302. The core 1302 receives a core oxidizer fuel mixture 1301. The core 1302 includes a first detonation chamber 1320, a second detonation chamber 1324, and a third detonation chamber 1330 arranged in series. The centerbody 1340 has an external surface 1344. The centerbody 1340 is disposed in the core 1302.

The external surface 1344 of the centerbody 1340 includes a first inner channel 1312, a second inner channel 1326, and a third inner channel 1332. The first inner channel 1312 of the centerbody 1340 is coupled to a first pilot oxidizer-fuel supply 1323 by a first pilot fuel supply system 1322. The first pilot oxidizer-fuel supply 1323 may be coupled to the first inner channel 1312 in any suitable manner, for example, by one or more openings in the external surface 1344 of the centerbody 1340. The second inner channel 1326 of the centerbody 1340 is coupled to a second pilot oxidizer-fuel supply 1329 by a second pilot fuel supply system 1328. The second pilot oxidizer-fuel supply 1329 may be coupled to the second inner channel 1326 in any suitable manner, for example, by one or more openings defined in the external surface 1344 of the centerbody 1340. The third inner channel 1332 in the centerbody 1340 is coupled to a third pilot oxidizer-fuel supply 1335 by a third pilot fuel supply system 1334. The third pilot oxidizer-fuel supply 1335 may be coupled to the third inner channel 1332 in any suitable manner, for example, by one or more openings in the external surface 1344 of the centerbody 1340.

In some approaches, the first pilot oxidizer-fuel supply 1323, the second pilot oxidizer-fuel supply 1329, and the third pilot oxidizer-fuel supply 1335, may be the same supply and, for example, may be a mixture of fuel and oxidizer that is present in the space 1307. For example, pilot fuel or a pilot fuel-oxidizer mixture may be injected into the cavity 1342 of the centerbody 1340 to provide pilot fuel for the RDCs.

The combustor system 1300 includes a first RDC 1306, a second RDC 1308, and a third RDC 1310 disposed in the core 1302 in series.

The first RDC 1306 includes the first detonation chamber 1320, the first inner channel 1312, and the first pilot fuel supply system 1322. The first RDC 1306 has a first cross-sectional area A1. An inner portion of the first detonation chamber 1320 is bounded at least in part by the first inner channel 1312 and the outer portion is bounded by the first wall 1304. The first pilot fuel supply system 1322 delivers the first pilot oxidizer-fuel supply 1323 to the first inner channel 1312.

The second RDC 1308 includes the second detonation chamber 1324, the second inner channel 1326, and the second pilot fuel supply system 1328. The second detonation chamber 1324 has a second cross-sectional area A2. An inner portion of the second detonation chamber 1324 is bounded at least in part by the second inner channel 1326 and the outer portion is bounded by the first wall 1304. The second pilot fuel supply system 1328 delivers the second pilot oxidizer-fuel supply 1329 to the second inner channel 1326.

The third RDC 1310 includes the third detonation chamber 1330, the third inner channel 1332, and the third pilot fuel supply system 1334. The third detonation chamber 1330 has a third cross-sectional area A3. An inner portion of the third detonation chamber 1330 is bounded at least in part by a third inner channel 1332 and an outer portion is bounded by the first wall 1304. The third pilot fuel supply system 1334 delivers the third pilot oxidizer-fuel supply 1335 to the third inner channel 1332.

In the combustor system 1300, the volume of the detonation chambers of the serial RDCs increases from upstream to downstream due to the decreasing cross-sectional area of the centerbody 1340. The first cross-sectional area A1 of the first detonation chamber 1320 is smaller than the second cross-sectional area A2 of the second detonation chamber 1324 and, similarly, the second cross-sectional area A2 of the second detonation chamber 1324 is smaller than the third cross-sectional area A3 of the third detonation chamber 1330 (e.g., A1<A2<A3). Thus, the first detonation chamber 1320 has a volume that is smaller than the second detonation chamber 1324. Similarly, the second detonation chamber 1324 has a volume that is smaller than the volume of the third detonation chamber 1330.

FIG. 14 shows a fourteenth embodiment of a combustor system 1400 including serial RDCs. The combustor system 1400 includes contracting serial RDCs with centerbody injection of pilot fuel. Elements of the fourteenth embodiment that are similar to those in the first embodiment have been given similar reference numbers in the fourteen-hundred series and only general differences will be discussed. For example, the first RDC 106 described in the first embodiment is numbered as the first RDC 1406 in the fourteenth embodiment. The combustor system 1400 is similar to the combustor system 100 with a difference being that the combustor system 1400 includes a centerbody 1440 and pilot fuel is injected into the RDCs via the centerbody 1440. A cavity 1442 or opening extends through the centerbody 1440. Further, the serial RDCs in the combustor system 1400 include inner channels formed in an external surface 1444 of the centerbody 1440 rather than outer channels formed in the first wall 1404. In addition, the first wall 1404 that bounds a core 1402 of the combustor system 1400 has a portion that is sloped or tapered, resulting in RDCs that contract in size.

The combustor system 1400 is bounded by a first wall 1404 surrounding a core 1402. At least a portion of the first wall 1404 has a thickness with a taper that decreases from upstream to downstream. The core 1402 receives a core oxidizer fuel mixture 1401. The core 1402 includes a first detonation chamber 1420, a second detonation chamber 1424, and a third detonation chamber 1430 arranged in series. The centerbody 1440 has an external surface 1444.

The centerbody 1440 is disposed in the core 1402. The centerbody 1440 has an external surface 1444.

The external surface 1444 of the centerbody 1440 includes a first inner channel 1412, a second inner channel 1426, and a third inner channel 1432. The first inner channel 1412 of the centerbody 1440 is coupled to a first pilot oxidizer-fuel supply 1423 by a first pilot fuel supply system 1422. The first pilot oxidizer-fuel supply 1423 may be coupled to the first inner channel 1412 in any suitable manner, for example, by one or more openings in the external surface 1444 of the centerbody 1440. The second inner channel 1426 of the centerbody 1440 is coupled to a second pilot oxidizer-fuel supply 1429 by a second pilot fuel supply system 1428. The second pilot oxidizer-fuel supply 1429 may be coupled to the second inner channel 1426 in any suitable manner, for example, by one or more openings defined in the external surface 1444 of the centerbody 1440. The third inner channel 1432 in the centerbody 1440 is coupled to a third pilot oxidizer-fuel supply 1435 by a third pilot fuel supply system 1434. The third pilot oxidizer-fuel supply 1435 may be coupled to the third inner channel 1432 in any suitable manner, for example, by one or more openings in the external surface 1444 of the centerbody 1440.

In some approaches, the first pilot oxidizer-fuel supply 1423, the second pilot oxidizer-fuel supply 1429, and the third pilot oxidizer-fuel supply 1435, may be the same supply and, for example, may be a mixture of fuel and oxidizer that is present in the space 1407. For example, pilot fuel or a pilot fuel-oxidizer mixture may be injected into the cavity 1442 of the centerbody 1440 to provide pilot fuel for the RDCs.

The combustor system 1400 includes a first RDC 1406, a second RDC 1408, and a third RDC 1410 arranged in series.

The centerbody 1440 of the combustor system 1400 extends through the core 1402 of the combustor system 1400. The centerbody 1440 extends through the first RDC 1406 and the second RDC 1408. the combustor system 1400. The centerbody 1440 is stepped, in this manner, defines stabilization structures therein (e.g., a first inner channel 1412 and a second inner channel 1426). The stepped arrangement of the centerbody 1440 creates a first inner channel 1412 and a second inner channel 1426 that lack a forward-facing step and, instead, only include a backward-facing step and a recessed portion.

The first RDC 1406 includes the first detonation chamber 1420, the first inner channel 1412, and the first pilot fuel supply system 1422. The first RDC 1406 has a first cross-sectional area A1. The first detonation chamber 1420 is bounded in part by a first inner channel 1412 and by the first wall 1404. Because the centerbody 1440 extends through the first RDC 1406, the first detonation chamber 1420 is annular. The first inner channel 1412 includes a backward-facing step 1414 and a recessed portion 1418. The recessed portion 1418 is recessed relative to an adjacent portion of the centerbody 1440. The first pilot fuel supply system 1422 is coupled to the first inner channel 1412. The first pilot fuel supply system 1422 the first pilot oxidizer-fuel supply 1423 to one or more of the first inner channel 1412 and the first detonation chamber 1420. The first pilot fuel supply system is fed by the centerbody 1440.

The second RDC 1408 includes the second detonation chamber 1424, the second inner channel 1426, and the second pilot fuel supply system 1428. The second RDC 1408 has a second cross-sectional area A2. The second detonation chamber 1424, a second inner channel 1426, and a second pilot fuel supply system 1428 are similar to the first detonation chamber 1420, the first inner channel 1412, and the first pilot fuel supply system 1422, respectively.

The third RDC 1410 includes the third detonation chamber 1430, the third inner channel 1432, and the third pilot fuel supply system 1434. The third RDC 1410 has a third cross-sectional area A3. Because the centerbody 1440 ends upstream of the third RDC 1410, the third detonation chamber 1430 is centerbody-less and is unobstructed from the midline X of the core 1402 to the first wall 1404. The third pilot fuel supply system 1434 delivers pilot fuel along the midline X at the core of the third detonation chamber 1430.

Due to the decreasing tapered shape of the first wall 1404, the third cross-sectional area A3 of the third RDC 1410 is smaller than the second cross-sectional area A2 of the second RDC 1408 and, similarly, the second cross-sectional area A2 of the second RDC 1408 is smaller than the first cross-sectional area A1 of the first RDC 1406 (e.g., A3<A2<A1).

In some embodiments, the centerbody 1440 may be translatable and may shift through at least a portion of the core 1402. For example, the centerbody 1440 may be mechanically or fluidically translatable in one or more of an upstream direction and a downstream direction along the midline X.

Turning now to FIGS. 15-20, various combustor systems are shown that include a plurality of RDCs arranged in series. In the embodiments of FIGS. 15-20, the RDCs include both inner channels coupled to inner pilot oxidizer-fuel supplies and outer channels coupled out outer pilot oxidizer-fuel supplies. Rotating detonation reactions may be initiated in both the inner and outer channels.

Figure 15:
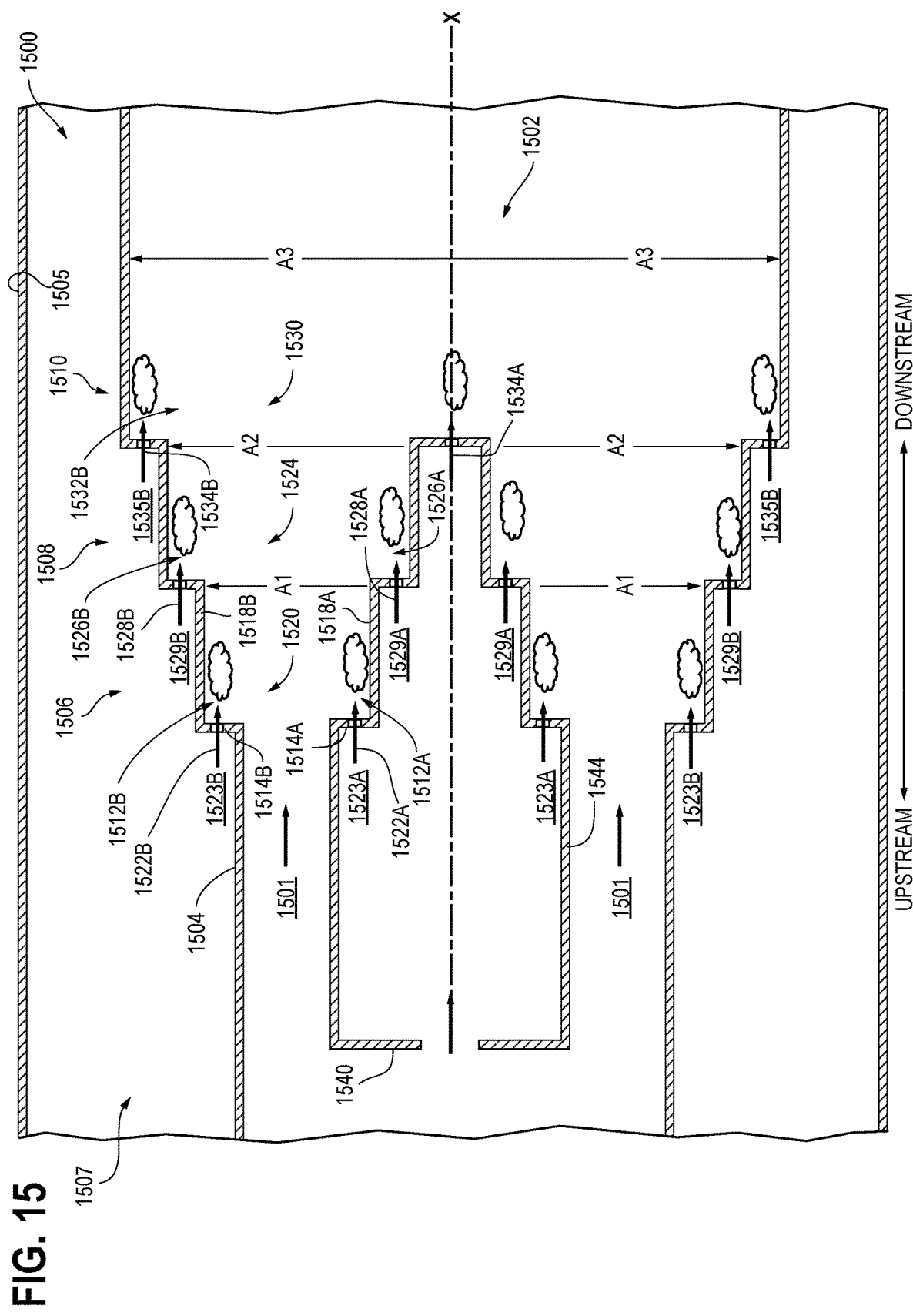
FIG. 15 comprises a schematic cross-sectional side view of a fifteenth embodiment of a combustor system with serial RDCs.

FIG. 15 shows a fifteenth embodiment of a combustor system 1500 including serial RDCs. The combustor system 1500 includes expanding-contracting serial RDCs with both inner and outer pilots. Elements of the fifteenth embodiment that are similar to those in the first embodiment have been given similar reference numbers in the fifteen-hundred series and only general differences will be discussed. For example, the first RDC 106 described in the first embodiment is numbered as the first RDC 1506 in the fifteenth embodiment. One difference between the first and fifteenth embodiments is that the combustor system 1500 has a first wall 1504 that is stepped and defines detonation chambers that increase in size from an upstream portion of the combustor system 1500 to a downstream portion of the combustor system 1500. A further difference is that the combustor system 1500 includes a centerbody 1540 and pilot fuel is injected into the RDCs via the centerbody 1540. Further, the serial RDCs in the combustor system 1500 include inner channels formed in an external surface 1544 of the centerbody 1540 in addition to outer channels formed in a first wall 1504 of the combustor system 1500. Another difference is in the shape of the channels. The stepped arrangement of the first wall 1504 forms a first outer channel 1512B, a second outer channel 1526B, and a third outer channel 1532B that lack a forward-facing step and, instead, only include a backward-facing step and a recessed portion. Similarly, the stepped arrangement of the centerbody 1540 forms inner channels 1512A, 1526A that only include a backward-facing step and a recessed portion. Though removal of backward-facing step may potentially reduce the effectiveness of detonation wave to penetrate towards center, in certain applications this may be a preferred approach, for example, in applications where there is a likelihood that the detonation wave may travel upstream.

The combustor system 1500 includes a first wall 1504 separated from a second wall 1505 by a space 1507. The first wall 1504 defines a core 1502. The core 1502 receives a core oxidizer fuel mixture 1501. The core 1502 includes a first detonation chamber 1520, a second detonation chamber 1524, and a third detonation chamber 1530 arranged in series. The first wall 1504 is an inner wall of the combustor system 1500. The second wall 1505 is an outer wall and may extend around the periphery of the combustor system 1500.

The first wall 1504 of the combustor system 1500 includes a first outer channel 1512B, a second outer channel 1526B, and a third outer channel 1532B. The first outer channel 1512B of the first wall 1504 is coupled to a first outer pilot oxidizer-fuel supply 1523B by a first outer pilot fuel supply system 1522B. The first outer pilot oxidizer-fuel supply 1523B may be coupled to the first outer channel 1512B in any suitable manner, for example, by one or more openings in the first wall 1504. The second outer channel 1526B of the first wall 1504 is coupled to a second outer pilot oxidizer-fuel supply 1529B by a second outer pilot fuel supply system 1528B. The second outer pilot oxidizer-fuel supply 1529B may be coupled to the second outer channel 1526B in any suitable manner, for example, by one or more openings defined in the first wall 1504. The third outer channel 1532B in the first wall 1504 is coupled to a third outer pilot oxidizer-fuel supply 1535B by a third outer pilot fuel supply system 1534B. The third outer pilot oxidizer-fuel supply 1535B may be coupled to the third outer channel 1532B in any suitable manner, for example, by one or more openings in the first wall 1504.

In some approaches, the first outer pilot oxidizer-fuel supply 1523, the second outer pilot oxidizer-fuel supply 1529, and the third outer pilot oxidizer-fuel supply 1535 may be the same supply and, for example, may be a mixture of fuel and oxidizer that is present in the space 1507.

The core 1502 of the combustor system 1500 includes a centerbody 1540. The centerbody 1540 has an external surface 1544. The external surface 1544 of the centerbody 1540 includes a first inner channel 1512A and a second inner channel 1526A. The first inner channel 1512A of the centerbody 1540 is coupled to a first inner pilot oxidizer-fuel supply 1523A by a first inner pilot fuel supply system 1522A. The first inner pilot oxidizer-fuel supply 1523A may be coupled to the first inner channel 1512A in any suitable manner, for example, by one or more openings in the external surface 1544 of the centerbody 1540. The second inner channel 1526A of the centerbody 1540 is coupled to a second inner pilot oxidizer-fuel supply 1529A by a second inner pilot fuel supply system 1528A. The second inner pilot oxidizer-fuel supply 1529A may be coupled to the second inner channel 1526A in any suitable manner, for example, by one or more openings defined in the external surface 1544 of the centerbody 1540.

In some approaches, the first inner pilot oxidizer-fuel supply 1523A, the second inner pilot oxidizer-fuel supply 1529A, and the third inner pilot oxidizer-fuel supply 1535A, may be the same supply and, for example, may be a mixture of fuel and oxidizer that is present in the centerbody 1540.

The centerbody 1540 has a cross-sectional area that decreases or contracts in size from upstream to downstream. In particular, the external surface 1544 is stepped to define a plurality of stabilization structures therein (e.g., the first inner channel 1512A, the second inner channel 1526A). The first wall 1504 of the combustor system 1500 is also stepped to define a plurality of stabilization structures therein (e.g., a first outer channel 1512B, a second outer channel 1526B, and a third outer channel 1532B). The first inner channel 1512A and the first outer channel 1512B are radially aligned (i.e., positioned along a common radius that extends from the midline X to the first wall 1504). The first inner channel 1512A is opposite the first outer channel 1512B. That is, the first inner channel 1512A and the first outer channel 1512B are disposed at the same position along a length of the combustor system 1500.

The combustor system 1500 further includes a first RDC 1506, a second RDC 1508, and a third RDC 1510. The combustor system 1500 has a core 1502 that is bounded by the first wall 1504.

The first RDC 1506 includes the first detonation chamber 1520, the first inner channel 1512A, the first inner pilot fuel supply system 1522A, the first outer channel 1512B, and the first outer pilot fuel supply system 1522B. The first detonation chamber 1520 of the first RDC 1506 is bounded, at least in part, by the first inner channel 1512A and the first outer channel 1512B. The first detonation chamber 1520 has a first width A1. The first inner channel 1512A includes a backward-facing step 1514A and a recessed portion 1518A. The recessed portion 1518A is recessed relative to an adjacent portion of the centerbody 1540. The first inner pilot fuel supply system 1522A is coupled to the first inner channel 1512A to deliver pilot fuel from the centerbody to the first inner channel 1512A. The first inner pilot fuel supply system 1522A is in fluid communication with a cavity within the centerbody 1540 and with the first inner channel 1512A. The first outer channel 1512B similarly includes a backward-facing step 1514B and a recessed portion 1518B. The first outer pilot fuel supply system 1522B is coupled to the first outer channel 1512B to deliver pilot fuel to the first outer channel 1512B.

The second RDC 1508 includes the second detonation chamber 1524, the second inner channel 1526A, the second inner pilot fuel supply system 1528A, the second outer channel 1526B, and the second outer pilot fuel supply system 1528B. The second detonation chamber 1524, the second inner channel 1526A, the second outer channel 1526B, the second inner pilot fuel supply system 1528A, and the second outer pilot fuel supply system 1528B are similar to the first detonation chamber 1520, the first inner channel 1512A, the first outer channel 1512B, and the first inner pilot fuel supply system 1522A, respectively. The second detonation chamber 1524 has a second width A2.

The third RDC 1510 includes the third detonation chamber 1530, the third inner pilot fuel supply system 1534A, the third outer channel 1532B, and the third outer pilot fuel supply system 1534B. The third detonation chamber 1530, the third outer channel 1532B, and the third outer pilot fuel supply system 1534B are similar to the first detonation chamber 1520, the first outer channel 1512B, and the first outer pilot fuel supply system 1522B, respectively. The third detonation chamber 1530 has a third width A3. Because the centerbody 1540 ends upstream of the third RDC 1510, the third detonation chamber 1530 is centerbody-less and lacks an inner channel for piloting reactions in the third detonation chamber 1530. Instead, the third inner pilot fuel supply system 1534A is disposed at the center of the centerbody 1540. The third inner pilot fuel supply system 1534 injects pilot fuel into the center of the third detonation chamber 1530.

The centerbody 1540 extends through the first RDC 1506 and the second RDC 1508 and ends upstream of the third RDC 1510. Because of the positioning of the centerbody 1540, the first detonation chamber 1520 of the first RDC 1506 and the second detonation chamber 1524 of the second RDC 1508 are annular. However, because the centerbody 1540 ends upstream of the third RDC 1510, the third detonation chamber 1530 is centerbody-less.

Due to the opposing stepped configuration of the external surface 1544 of the centerbody 1540 and the first wall 1504, the first cross-sectional area A1 is smaller than the second cross-sectional area A2 and the second cross-sectional area A2 is smaller than the third cross-sectional area A3 (e.g., A1<A2<A3).

In some embodiments, the centerbody 1540 may be translatable and may shift through at least a portion of the core 1502. For example, the centerbody 1540 may be mechanically or fluidically translatable in one or more of an upstream direction and a downstream direction along the midline X.

Figure 16:
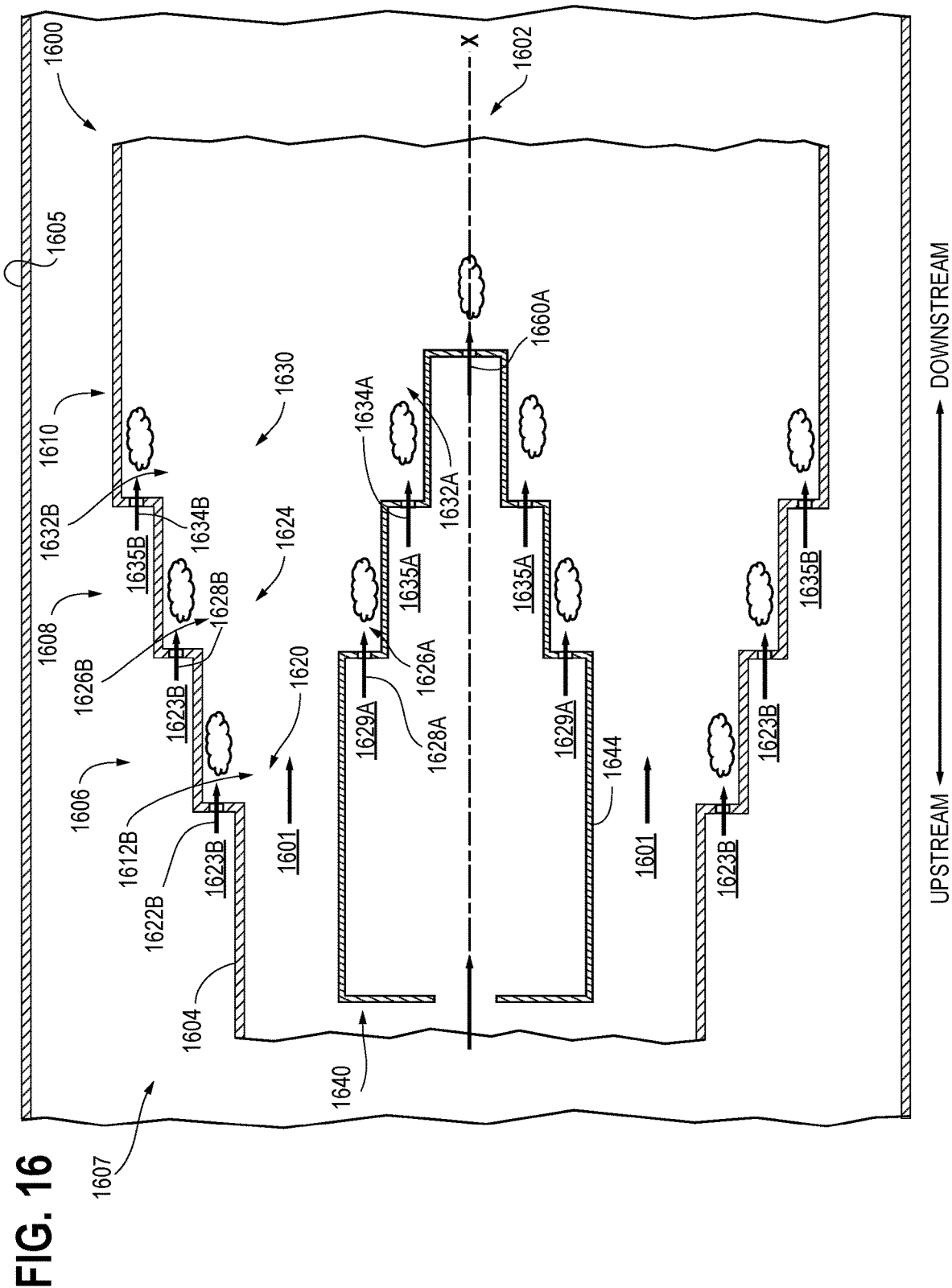
FIG. 16 comprises a schematic cross-sectional side view of a sixteenth embodiment of a combustor system with serial RDCs.

FIG. 16 shows a second embodiment of a combustor system 1600 including serial RDCs. The combustor system 1600 includes serial RDCs having expanding-contracting serial RDCs with staggered inner and outer pilots. Elements of the sixteenth embodiment that are similar to those in the fifteenth embodiment have been given similar reference numbers in the fifteen-hundred series and only general differences will be discussed. For example, the first RDC 1506 described in the first embodiment is numbered as the first RDC 1606 in the sixteenth embodiment. The combustor system 1600 is similar to the combustor system 1500 with a difference being that the inner channels 1626A, 1632A formed in the external surface 1644 of the centerbody 1640 are staggered from the outer channels 1612B, 1626B, 1632B formed in the first wall 1604. That is, the steps in the centerbody 1640 and the steps in the first wall 1604 are staggered or offset by one step or a portion thereof.

The combustor system 1600 includes a first wall 1604 separated from a second wall 1605 by a space 1607. The first wall 1604 defines a core 1602. The core 1602 receives a core oxidizer fuel mixture 1601. The core 1602 includes a first detonation chamber 1620, a second detonation chamber 1624, and a third detonation chamber 1630 arranged in series. The first wall 1604 is an inner wall of the combustor system 1600. The second wall 1605 is an outer wall and may extend around the periphery of the combustor system 1600.

The first wall 1604 of the combustor system 1600 includes a first outer channel 1612B, a second outer channel 1626B, and a third outer channel 1632B. The first outer channel 1612B of the first wall 1604 is coupled to a first outer pilot oxidizer-fuel supply 1623B by a first outer pilot fuel supply system 1622B. The first outer pilot oxidizer-fuel supply 1623B may be coupled to the first outer channel 1612B in any suitable manner, for example, by one or more openings in the first wall 1604. The second outer channel 1626B of the first wall 1604 is coupled to a second outer pilot oxidizer-fuel supply 1629B by a second outer pilot fuel supply system 1628B. The second outer pilot oxidizer-fuel supply 1629B may be coupled to the second outer channel 1626B in any suitable manner, for example, by one or more openings defined in the first wall 1604. The third outer channel 1632B in the first wall 1604 is coupled to a third outer pilot oxidizer-fuel supply 1635B by a third outer pilot fuel supply system 1634B. The third outer pilot oxidizer-fuel supply 1635B may be coupled to the third outer channel 1632B in any suitable manner, for example, by one or more openings in the first wall 1604.

In some approaches, the first outer pilot oxidizer-fuel supply 1623B, the second outer pilot oxidizer-fuel supply 1629B, and the third outer pilot oxidizer-fuel supply 1635B may be the same supply and, for example, may be a mixture of fuel and oxidizer that is present in the space 1607.

The core 1602 of the combustor system 1600 includes a centerbody 1640. The centerbody 1640 has an external surface 1644. The external surface 1644 of the centerbody 1640 includes a first inner channel 1612A and a second inner channel 1626A. The first inner channel 1612A of the centerbody 1640 is coupled to a first inner pilot oxidizer-fuel supply 1623A by a first inner pilot fuel supply system 1622A. The first inner pilot oxidizer-fuel supply 1623A may be coupled to the first inner channel 1612A in any suitable manner, for example, by one or more openings in the external surface 1644 of the centerbody 1640. The second inner channel 1626A of the centerbody 1640 is coupled to the second inner pilot oxidizer-fuel supply 1629A by a second inner pilot fuel supply system 1628A. The second inner pilot oxidizer-fuel supply 1629A may be coupled to the second inner channel 1626A in any suitable manner, for example, by one or more openings defined in the external surface 1644 of the centerbody 1640.

In some approaches, the first inner pilot oxidizer-fuel supply 1623A, the second inner pilot oxidizer-fuel supply 1629A, and the third inner pilot oxidizer-fuel supply 1635A, may be the same supply and, for example, may be a mixture of fuel and oxidizer that is present in the centerbody 1640.

The first inner channel 1612A is staggered from the first outer channel 1612B along a length of the combustor system 1600. The second inner channel 1626A is staggered from the second outer channel 1626B along the length of the combustor system 1600. The third inner channel 1632A is staggered from the third outer channel 1632B along the length of the combustor system 1600.

The combustor system 1600 further includes a first RDC 1606, a second RDC 1608, and a third RDC.

The first RDC 1606 includes the first detonation chamber 1620, the first outer channel 1612B, and the first outer pilot fuel supply system 1622B. An outer portion of the first detonation chamber 1620 is bounded at least in part by a first outer channel 1612B. The first outer pilot fuel supply system 1622B delivers pilot fuel to the first outer channel 1612B.

The second RDC 1608 includes the second detonation chamber 1624, the second inner channel 1626A, the second inner pilot fuel supply system 1628A, the second outer channel 1626B, and the second outer pilot fuel supply system 1628B. The second RDC 1608 includes a second detonation chamber 1624. The second detonation chamber 1624 is bounded by a second inner channel 1626A on the inside and by a second outer channel 1626B on the outside. The second inner pilot fuel supply system 1628A delivers pilot fuel to the second inner channel 1626A. The second outer pilot fuel supply system 1628B delivers pilot fuel to the second outer channel 1626B.

The third RDC 1610 includes the third detonation chamber 1630, the third inner channel 1632A, the third inner pilot fuel supply system 1634A, the third outer channel 1632B, and the third outer pilot fuel supply system 1634B. The third detonation chamber 1630 is bounded by a third inner channel 1632A on the inside and by a third outer channel 1632B on the outside. The third inner pilot fuel supply system 1634A delivers pilot fuel to the third inner channel 1632A. The third outer pilot fuel supply system 1634B delivers pilot fuel to the third outer channel 1632B.

Due to the staggered configuration of the steps in the centerbody 1640 and the steps in the first wall 1604, the first detonation chamber 1620 lacks an inner channel and is only bounded by the first outer channel 1612B. However, the second RDC 1608 includes both a second inner channel 1626A and a second outer channel 1626B. Similarly, the third RDC 1610 includes both a third inner channel 1632A and a third outer channel 1632B.

Further, the combustor system 1600 includes a core pilot fuel supply system 1660A downstream of the third RDC 1610. Depending on the injection scheme, the third RDC 1610 may operate as an independently stabilized RDC or may be stabilized by the RDCs upstream. The core pilot fuel supply system 1660A is disposed adjacent to the midline X of the combustor system 1600. The core pilot fuel supply system 1660A is configured to deliver pilot fuel from the centerbody 1640 to the core of the combustor system 1600 downstream of the serial RDCs. The core pilot fuel supply system 1660A may act as a pilot for combustion reactions occurring in the core of the volume of the combustor system 1600.

In some embodiments, the centerbody 1640 may be translatable and may shift through at least a portion of the core 1602. For example, the centerbody 1640 may be mechanically or fluidically translatable in one or more of an upstream direction and a downstream direction along the midline X.

Figure 17:
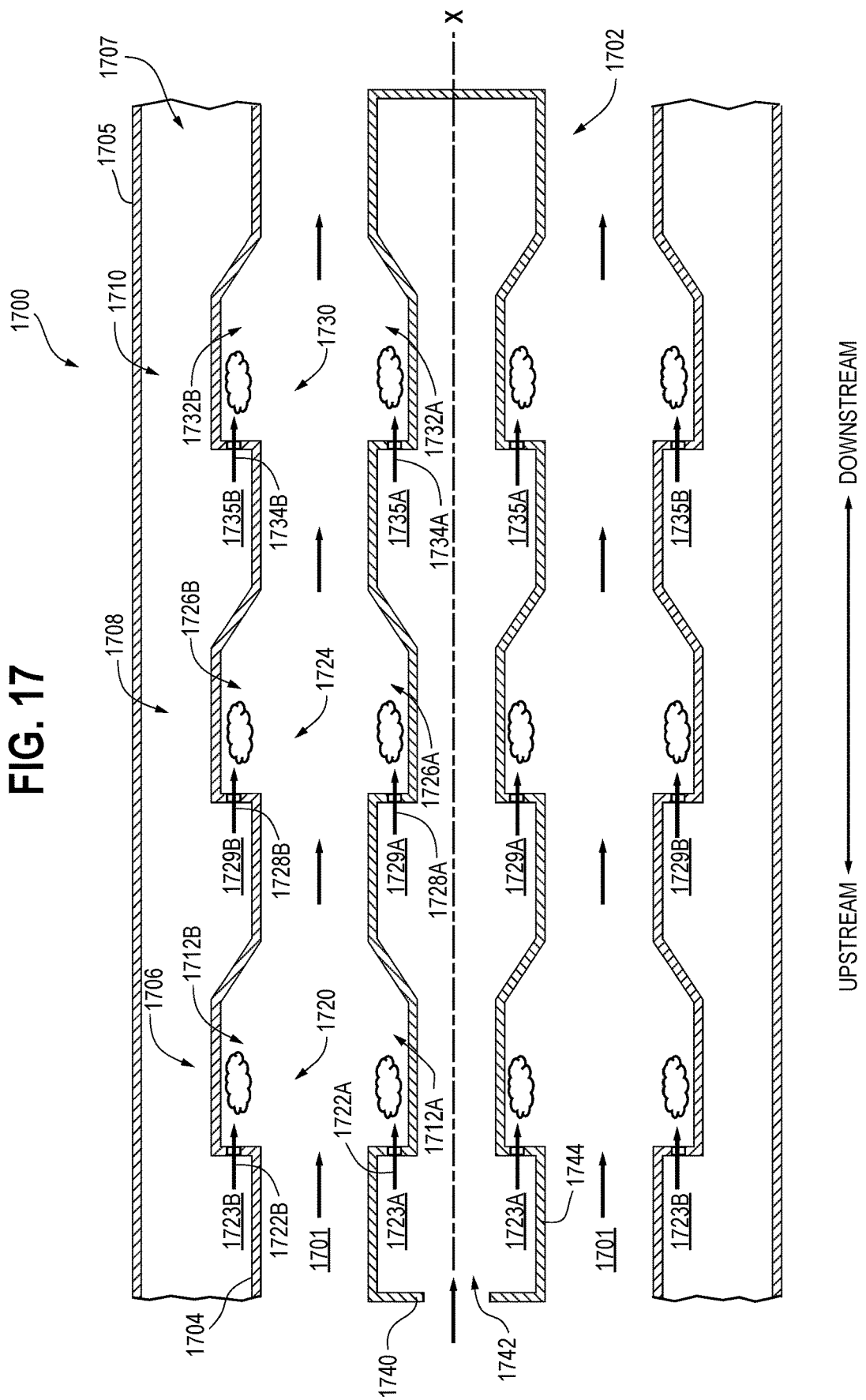
FIG. 17 comprises a schematic cross-sectional side view of a seventeenth embodiment of a combustor system with serial RDCs.

FIG. 17 shows a seventeenth embodiment of a combustor system 1700 including serial RDCs. The combustor system 1700 includes serial RDCs having the same or a similar cross-sectional area and with inner and outer pilots. Elements of the seventeenth embodiment that are similar to those in the first embodiment have been given similar reference numbers in the seventeen-hundred series and only general differences will be discussed. For example, the first RDC 106 described in the first embodiment is numbered as the first RDC 1706 in the seventeenth embodiment. The combustor system 1700 is similar to the combustor system 100 with a difference being that the combustor system 1700 includes a centerbody 1740 and pilot fuel is injected into the RDCs via the centerbody 1740 in addition to being injected along the first wall 1704. Further, the serial RDCs in the combustor system 1700 include inner channels formed in an external surface 1744 of the centerbody 1740 in addition to the outer channels formed in the first wall 1704.

The combustor system 1700 includes a first wall 1704 separated from a second wall 1705 by a space 1707. The first wall 1704 defines a core 1702. The core 1702 receives a core oxidizer fuel mixture 1701. The core 1702 includes a first detonation chamber 1720, a second detonation chamber 1724, and a third detonation chamber 1730 arranged in series. The first wall 1704 is an inner wall of the combustor system 1700. The second wall 1705 is an outer wall and may extend around the periphery of the combustor system 1700.

The first wall 1704 of the combustor system 1700 includes a first outer channel 1712B, a second outer channel 1726B, and a third outer channel 1732B. The first outer channel 1712B of the first wall 1704 is coupled to a first outer pilot oxidizer-fuel supply 1723B by a first outer pilot fuel supply system 1722B. The first outer pilot oxidizer-fuel supply 1723B may be coupled to the first outer channel 1712B in any suitable manner, for example, by one or more openings in the first wall 1704. The second outer channel 1726B of the first wall 1704 is coupled to a second outer pilot oxidizer-fuel supply 1729B by a second outer pilot fuel supply system 1728B. The second outer pilot oxidizer-fuel supply 1729B may be coupled to the second outer channel 1726B in any suitable manner, for example, by one or more openings defined in the first wall 1704. The third outer channel 1732B in the first wall 1704 is coupled to a third outer pilot oxidizer-fuel supply 1735B by a third outer pilot fuel supply system 1734B. The third outer pilot oxidizer-fuel supply 1735B may be coupled to the third outer channel 1732B in any suitable manner, for example, by one or more openings in the first wall 1704.

In some approaches, the first outer pilot oxidizer-fuel supply 1723B, the second outer pilot oxidizer-fuel supply 1729B, and the third outer pilot oxidizer-fuel supply 1735B may be the same supply and, for example, may be a mixture of fuel and oxidizer that is present in the space 1707.

The core 1702 of the combustor system 1700 includes a centerbody 1740. The centerbody 1740 has an external surface 1744. The external surface 1744 of the centerbody 1740 includes a first inner channel 1712A, a second inner channel 1726A, and a third inner channel 1732A. The first inner channel 1712A of the centerbody 1740 is coupled to a first inner pilot oxidizer-fuel supply 1723A by a first inner pilot fuel supply system 1722A. The first inner pilot oxidizer-fuel supply 1723A may be coupled to the first inner channel 1712A in any suitable manner, for example, by one or more openings in the external surface 1744 of the centerbody 1740. The second inner channel 1726A of the centerbody 1740 is coupled to the second inner pilot oxidizer-fuel supply 1729A by a second inner pilot fuel supply system 1728A. The second inner pilot oxidizer-fuel supply 1729A may be coupled to the second inner channel 1726A in any suitable manner, for example, by one or more openings defined in the external surface 1744 of the centerbody 1740.

In some approaches, the first inner pilot oxidizer-fuel supply 1723A, the second inner pilot oxidizer-fuel supply 1729A, and the third inner pilot oxidizer-fuel supply 1735A, may be the same supply and, for example, may be a mixture of fuel and oxidizer that is present in the centerbody 1740.

The centerbody 1740 extends axially through the core 1702 along the midline X. The centerbody 1740 is bounded at least in part by the external surface 1744. A cavity 1742 or opening extends through the centerbody 1740. Pilot fuel or a pilot fuel-oxidizer mixture may be injected into the cavity 1742 of the centerbody 1740 to provide pilot fuel for the RDCs. The combustor system 1700 further includes a first RDC 1706, a second RDC 1708, and a third RDC 1710 arranged in series within the core 1702.

The first RDC 1706 includes the first detonation chamber 1720, the first inner channel 1712A, the first inner pilot fuel supply system 1722A, the first outer channel 1712B, and the first outer pilot fuel supply system 1722B. Due to the centerbody 1740, the first detonation chamber 1720 is generally annular in shape. The external surface 1744 of the centerbody 1740 forms an inner wall of the first detonation chamber 1720 and the first wall 1704 forms an outer wall of the first detonation chamber 1720. The first detonation chamber 1720 is bounded at least in part by a first inner channel 1712A formed in the external surface 1744 of the centerbody 1740. The first detonation chamber 1720 is also bounded at least in part by a first outer channel 1712B formed in the first wall 1704. Similar to the first outer channel 112, The first outer channel 1712B includes a backward-facing step and a forward-facing step that are recessed in the first wall 1704 of the combustor system 1700. The first outer pilot fuel supply system 1722B delivers fuel or a fuel-oxidizer mixture to the first outer channel 1712B. Similarly, the first inner channel 1712A includes a backward-facing step and a forward-facing step that are recessed in the external surface 1744 of the centerbody 1740 and joined together by a recessed surface 1718. The first inner pilot fuel supply system 1722A is coupled to the first inner channel 1712A. The first inner pilot fuel supply system 1722A receives from the first inner pilot oxidizer-fuel supply 1723A from the cavity 1742 of the centerbody 1740 and delivers the first inner pilot oxidizer-fuel supply 1723A to the first inner channel 1712A to support one or more reactions occurring therein.

The second RDC 1708 includes the second detonation chamber 1724, the second inner channel 1726A, the second inner pilot fuel supply system 1728A, the second outer channel 1726B, and the second outer pilot fuel supply system 1728B. The second detonation chamber 1724 is similar to the first detonation chamber 1720. The second inner channel 1726A, the second outer channel 1726B, the second inner pilot fuel supply system 1728A, and the second outer pilot fuel supply system 1728B are similar to the first inner channel 1712A, the first outer channel 1712B, the first inner pilot fuel supply system 1722A, and the first outer pilot fuel supply system 1722B, respectively.

The third RDC 1710 includes the third detonation chamber 1730, the third inner channel 1732A, the third inner pilot fuel supply system 1734A, the third outer channel 1732B, and the third outer pilot fuel supply system 1734B. The third detonation chamber 1730 is similar to the first detonation chamber 1720. The third inner channel 1732A, the third outer channel 1732B, the third inner pilot fuel supply system 1734A, and the third outer pilot fuel supply system 1734B are similar to the first inner channel 1712A, the first outer channel 1712B, the first inner pilot fuel supply system 1722A, and the first outer pilot fuel supply system 1722B, respectively.

The cross-sectional areas of the first RDC 1706, the second RDC 1708, and the third RDC 1710 are approximately the same and generally do not vary from an upstream portion of the combustor system 1700 to a downstream portion of the combustor system 1700.

In some embodiments, the centerbody 1740 may be translatable and may shift through at least a portion of the core 1702. For example, the centerbody 1740 may be mechanically or fluidically translatable in one or more of an upstream direction and a downstream direction along the midline X.

Figure 18:
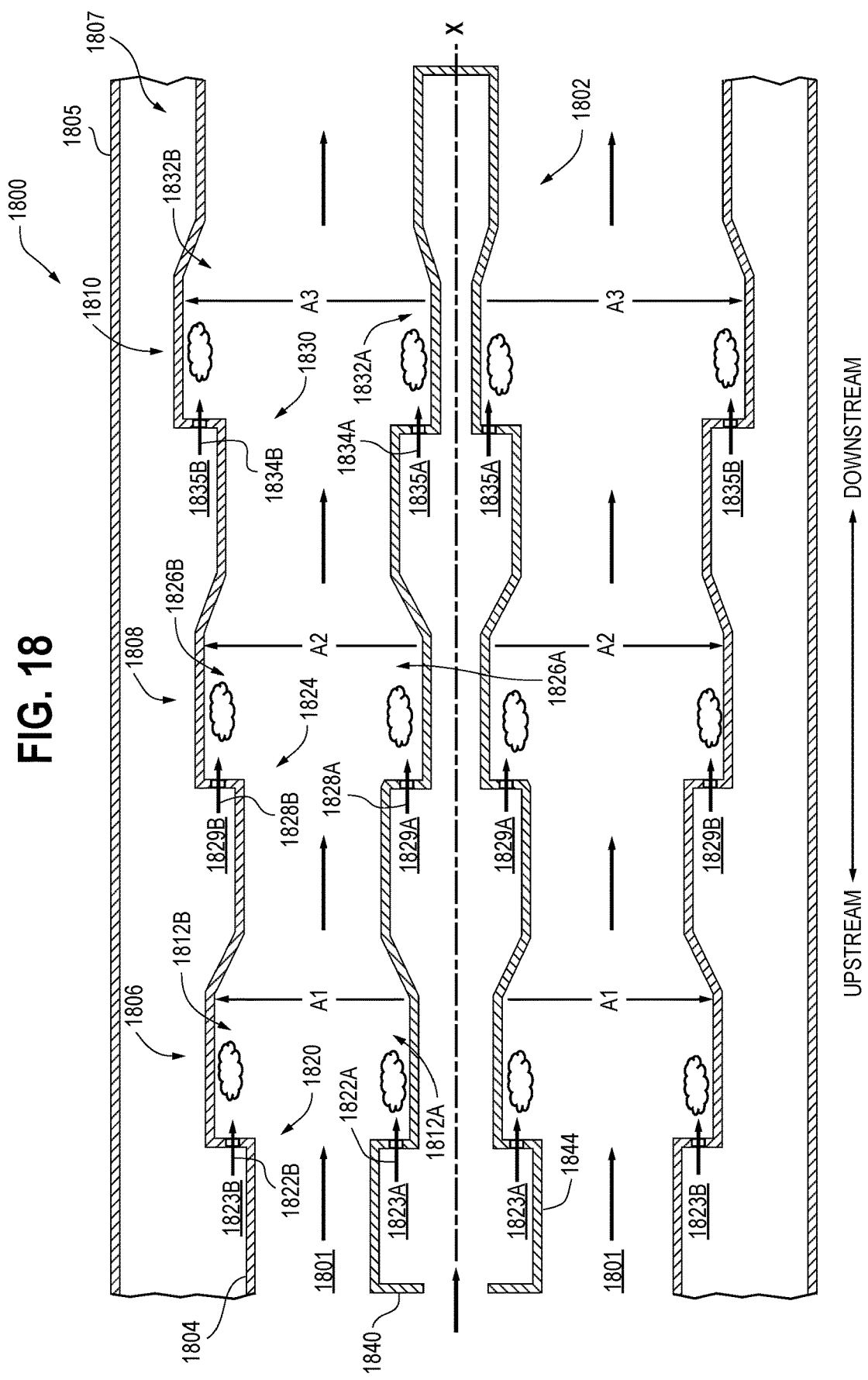
FIG. 18 comprises a schematic cross-sectional side view of an eighteenth embodiment of a combustor system with serial RDCs.

FIG. 18 is an eighteenth embodiment of a combustor system 1800 including serial RDCs is shown. The combustor system 1800 includes serial RDCs having both inner and outer pilots with centerbody injection of pilot fuel, the serial RDCs increasing in cross-sectional area. The eighteenth embodiment is similar to the seventeenth embodiment and similar elements have been given similar reference numbers in the eighteen-hundred series and only general differences will be discussed. For example, the first RDC 1706 described in the seventeenth embodiment is numbered as the first RDC 1806 in the eighteenth embodiment.

The combustor system 1800 includes a first wall 1804 separated from a second wall 1805 by a space 1807. The first wall 1804 defines a core 1802. The core 1802 receives a core oxidizer fuel mixture 1801. The core 1802 includes a first detonation chamber 1820, a second detonation chamber 1824, and a third detonation chamber 1430 arranged in series. The first wall 1804 is an inner wall of the combustor system 1800. The second wall 1805 is an outer wall and may extend around the periphery of the combustor system 1800. The first wall 1804 has a taper such that a cross-sectional area of the core 1802 increases from an upstream end of the combustor system 1800 to a downstream end. Because the first wall is tapered, the cross-sectional area (viewed from an end of the combustor system 1800) of the first RDC 1806 is smaller than the cross-sectional area of the second RDC 1808 is smaller than the cross-sectional area of the third RDC 1810.

The first wall 1804 of the combustor system 1800 includes a first outer channel 1812B, a second outer channel 1826B, and a third outer channel 1832B. The first outer channel 1812B of the first wall 1804 is coupled to a first outer pilot oxidizer-fuel supply 1823B by a first outer pilot fuel supply system 1822B. The first outer pilot oxidizer-fuel supply 1823B may be coupled to the first outer channel 1812B in any suitable manner, for example, by one or more openings in the first wall 1804. The second outer channel 1826B of the first wall 1804 is coupled to a second outer pilot oxidizer-fuel supply 1829B by a second outer pilot fuel supply system 1828B. The second outer pilot oxidizer-fuel supply 1829B may be coupled to the second outer channel 1826B in any suitable manner, for example, by one or more openings defined in the first wall 1804. The third outer channel 1832B in the first wall 1804 is coupled to a third outer pilot oxidizer-fuel supply 1835B by a third outer pilot fuel supply system 1834B. The third outer pilot oxidizer-fuel supply 1835B may be coupled to the third outer channel 1832B in any suitable manner, for example, by one or more openings in the first wall 1804.

In some approaches, the first outer pilot oxidizer-fuel supply 1823B, the second outer pilot oxidizer-fuel supply 1829B, and the third outer pilot oxidizer-fuel supply 1835B may be the same supply and, for example, may be a mixture of fuel and oxidizer that is present in the space 1707.

The core 1802 of the combustor system 1800 includes a centerbody 1840. The centerbody 1840 has an external surface 1844. The external surface 1844 of the centerbody 1840 includes a first inner channel 1812A, a second inner channel 1826A, and a third inner channel 1832A. The first inner channel 1812A of the centerbody 1840 is coupled to a first inner pilot oxidizer-fuel supply 1823A by a first inner pilot fuel supply system 1822A. The first inner pilot oxidizer-fuel supply 1823A may be coupled to the first inner channel 1812A in any suitable manner, for example, by one or more openings in the external surface 1844 of the centerbody 1840. The second inner channel 1826A of the centerbody 1840 is coupled to the second inner pilot oxidizer-fuel supply 1829A by a second inner pilot fuel supply system 1828A. The second inner pilot oxidizer-fuel supply 1829A may be coupled to the second inner channel 1826A in any suitable manner, for example, by one or more openings defined in the external surface 1844 of the centerbody 1840.

In some approaches, the first inner pilot oxidizer-fuel supply 1823A, the second inner pilot oxidizer-fuel supply 1829A, and the third inner pilot oxidizer-fuel supply 1835A, may be the same supply and, for example, may be a mixture of fuel and oxidizer that is present in the centerbody 1840.

The combustor system 1800 includes a first RDC 1806, a second RDC 1808, and a third RDC 1810 disposed in the core 1802 in series.

The first RDC 1806 includes the first detonation chamber 1820, the first inner channel 1812A, the first inner pilot fuel supply system 1822A, the first outer channel 1812B, and the first outer pilot fuel supply system 1822B. The first detonation chamber 1820 is bounded by the first inner channel 1812A on the inside and the first outer channel 1812B on the outside. The first detonation chamber 1820 has a first width A1. The first inner pilot fuel supply system 1822A delivers fuel to the first inner channel 1812A. The first outer pilot fuel supply system 1822B delivers pilot fuel to the first outer channel 1812B.

The second RDC 1808 includes the second detonation chamber 1824, the second inner channel 1826A, the second inner pilot fuel supply system 1828A, the second outer channel 1826B, and the second outer pilot fuel supply system 1828B. The second detonation chamber 1824 is bounded by the second inner channel 1826A on the inside and by the second outer channel 1826B on the outside. The second detonation chamber 1824 has a second width A2. The second inner pilot fuel supply system 1828A delivers pilot fuel to the second inner channel 1826A. The second outer pilot fuel supply system 1828B delivers pilot fuel to the second outer channel 1826B.

The third RDC 1810 includes the third detonation chamber 1830, the third inner channel 1832A, the third inner pilot fuel supply system 1834A, the third outer channel 1832B, and the third outer pilot fuel supply system 1834B. The third detonation chamber 1830 is bounded by the third inner channel 1832A on the inside and by the third outer channel 1832B on the outside. The third detonation chamber 1830 has a third width A3. The third inner pilot fuel supply system 1834A delivers pilot fuel to the third inner channel 1832A. The third outer pilot fuel supply system 1834B delivers pilot fuel to the third outer channel 1832B.

The centerbody 1840 has a taper such that a cross-sectional area of the centerbody 1840 decreases from an upstream end of the centerbody 1840 to a downstream end. Due to the taper of the first wall 1804 and the taper of the centerbody 1840, the cross-sectional area A1 (viewed from an end of the combustor system 1800) of the first detonation chamber 1820 is smaller than the cross-sectional area A2 of the second detonation chamber 1824. Similarly, the cross-sectional area A2 of the second detonation chamber 1824 is smaller than the cross-sectional area A3 of the third detonation chamber 1830.

In some embodiments, the centerbody 1840 may be translatable and may shift through at least a portion of the core 1802. For example, the centerbody 1840 may be mechanically or fluidically translatable in one or more of an upstream direction and a downstream direction along the midline X.

Figure 19:
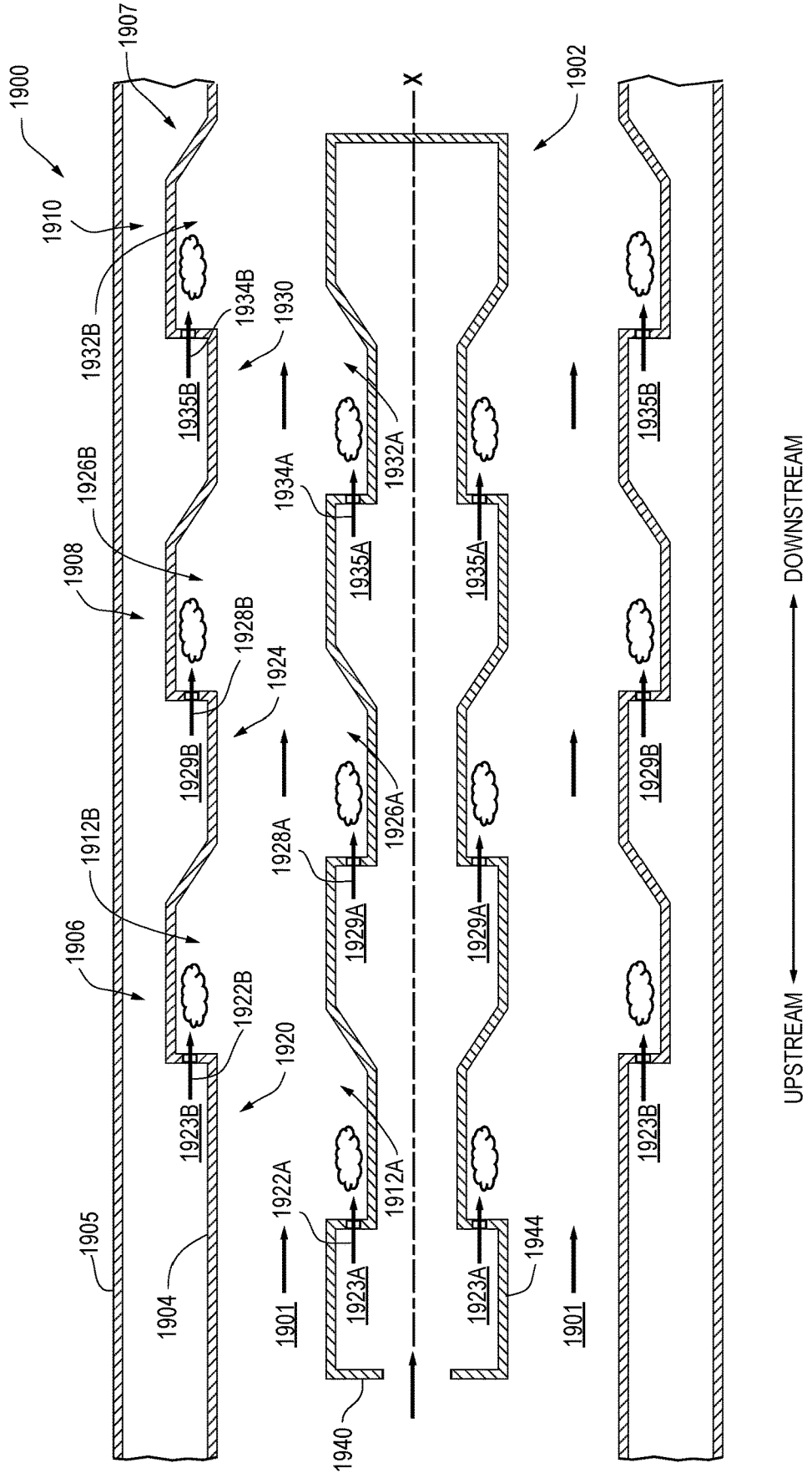
FIG. 19 comprises a schematic cross-sectional side view of a nineteenth embodiment of a combustor system with serial RDCs.

FIG. 19 is a nineteenth embodiment of a combustor system 1900 including serial RDCs is shown. The combustor system 1900 includes a core 1902 including serial RDCs. The serial RDCs in the combustor system 1900 have both inner and outer pilots with centerbody injection of pilot fuel, the serial RDCs having similar or constant cross-sectional areas. The nineteenth embodiment is similar to those in the seventeenth embodiment and similar elements have been given similar reference numbers in the nineteen-hundred series and only general differences will be discussed. For example, the first RDC 1706 described in the seventeenth embodiment is numbered as the first RDC 1906 in the nineteenth embodiment.

The combustor system 1900 includes a first wall 1904 separated from a second wall 1905 by a space 1907. The first wall 1904 defines a core 1902. The core 1902 receives a core oxidizer fuel mixture 1901. The core 1902 includes a first detonation chamber 1920, a second detonation chamber 1924, and a third detonation chamber 1430 arranged in series. The first wall 1904 is an inner wall of the combustor system 1900. The second wall 1905 is an outer wall and may extend around the periphery of the combustor system 1900.

The first wall 1904 of the combustor system 1900 includes a first outer channel 1912B, a second outer channel 1926B, and a third outer channel 1932B. The first outer channel 1912B of the first wall 1904 is coupled to a first outer pilot oxidizer-fuel supply 1923B by a first outer pilot fuel supply system 1922B. The first outer pilot oxidizer-fuel supply 1923B may be coupled to the first outer channel 1912B in any suitable manner, for example, by one or more openings in the first wall 1904. The second outer channel 1926B of the first wall 1904 is coupled to a second outer pilot oxidizer-fuel supply 1929B by a second outer pilot fuel supply system 1928B. The second outer pilot oxidizer-fuel supply 1929B may be coupled to the second outer channel 1926B in any suitable manner, for example, by one or more openings defined in the first wall 1904. The third outer channel 1932B in the first wall 1904 is coupled to a third outer pilot oxidizer-fuel supply 1935B by a third outer pilot fuel supply system 1934B. The third outer pilot oxidizer-fuel supply 1935B may be coupled to the third outer channel 1932B in any suitable manner, for example, by one or more openings in the first wall 1904.

In some approaches, the first outer pilot oxidizer-fuel supply 1923B, the second outer pilot oxidizer-fuel supply 1929B, and the third outer pilot oxidizer-fuel supply 1935B may be the same supply and, for example, may be a mixture of fuel and oxidizer that is present in the space 1907.

The core 1902 of the combustor system 1900 includes a centerbody 1940. The centerbody 1940 has an external surface 1944. The external surface 1944 of the centerbody 1940 includes a first inner channel 1912A, a second inner channel 1926A, and a third inner channel 1932A. The first inner channel 1912A of the centerbody 1940 is coupled to a first inner pilot oxidizer-fuel supply 1923A by a first inner pilot fuel supply system 1922A. The first inner pilot oxidizer-fuel supply 1923A may be coupled to the first inner channel 1912A in any suitable manner, for example, by one or more openings in the external surface 1944 of the centerbody 1940. The second inner channel 1926A of the centerbody 1940 is coupled to the second inner pilot oxidizer-fuel supply 1929A by a second inner pilot fuel supply system 1928A. The second inner pilot oxidizer-fuel supply 1929A may be coupled to the second inner channel 1926A in any suitable manner, for example, by one or more openings defined in the external surface 1944 of the centerbody 1940.

In some approaches, the first inner pilot oxidizer-fuel supply 1923A, the second inner pilot oxidizer-fuel supply 1929A, and the third inner pilot oxidizer-fuel supply 1935A, may be the same supply and, for example, may be a mixture of fuel and oxidizer that is present in the centerbody 1940.

The combustor system 1900 includes a first RDC 1906, a second RDC 1908, and a third RDC 1910.

The first RDC 1906 includes the first detonation chamber 1920, the first inner channel 1912A, the first inner pilot fuel supply system 1922A, the first outer channel 1912B, and the first outer pilot fuel supply system 1922B. The first detonation chamber 1980 is bounded by the first inner channel 1912A on the inside and the first outer channel 1912B on the outside. The first inner channel 1912A is offset from the first outer channel 1912B such that the first outer channel 1912B is positioned further downstream than the first inner channel 1912A. The first inner pilot fuel supply system 1922A delivers fuel to the first inner channel 1912A. The first outer pilot fuel supply system 1922B delivers pilot fuel to the first outer channel 1912B.

The second RDC 1908 includes the second detonation chamber 1924, the second inner channel 1926A, the second inner pilot fuel supply system 1928A, the second outer channel 1926B, and the second outer pilot fuel supply system 1928B. The second detonation chamber 1924 is bounded by the second inner channel 1926A on the inside and by the second outer channel 1926B on the outside. The second inner channel 1926A is offset from the second outer channel 1926B such that the second outer channel 1926B is positioned further downstream than the second inner channel 1926A. The second inner pilot fuel supply system 1928A delivers pilot fuel to the second inner channel 1926A. The second outer pilot fuel supply system 1928B delivers pilot fuel to the second outer channel 1926B.

The third RDC 1910 includes the third detonation chamber 1930, the third inner channel 1932A, the third inner pilot fuel supply system 1934A, the third outer channel 1932B, and the third outer pilot fuel supply system 1934B. The third detonation chamber 1930 is bounded by the third inner channel 1932A on the inside and by the third outer channel 1932B on the outside. The third inner channel 1932A is offset from the third outer channel 1932B such that the third outer channel 1932B is positioned further downstream than the third inner channel 1932A. The third inner pilot fuel supply system 1934A delivers pilot fuel to the third inner channel 1932A. The third outer pilot fuel supply system 1934B delivers pilot fuel to the third outer channel 1932B.

In some embodiments, the centerbody 1940 may be translatable and may shift through at least a portion of the core 1902. For example, the centerbody 1940 may be mechanically or fluidically translatable in one or more of an upstream direction and a downstream direction along the midline X.

Figure 20:
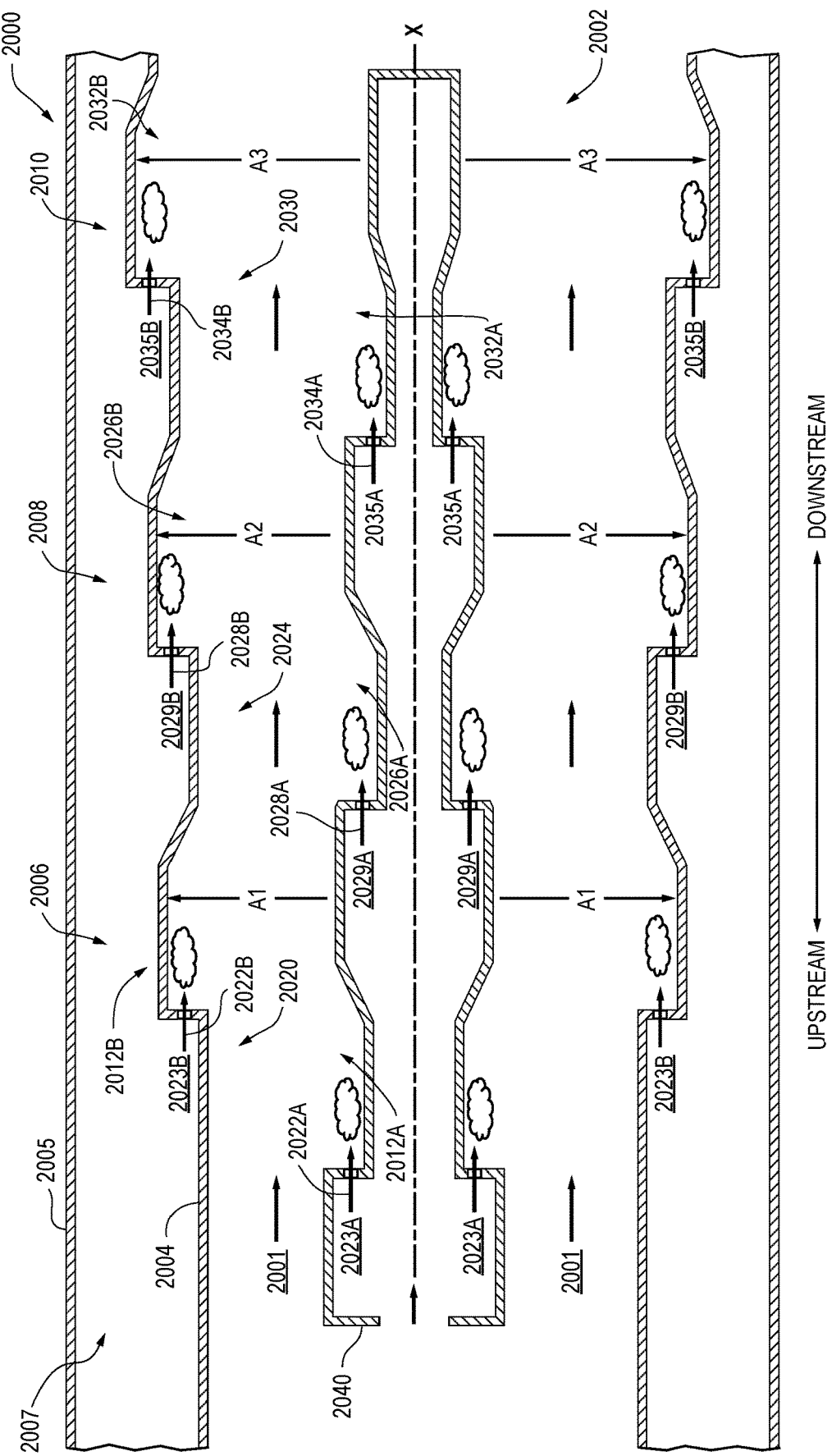
FIG. 20 comprises a schematic cross-sectional side view of a twentieth embodiment of a combustor system with serial RDCs.

FIG. 20 is a twentieth embodiment of a combustor system 2000 including serial RDCs is shown. The combustor system 2000 includes serial RDCs having staggered inner and outer pilots with centerbody injection of pilot fuel, the serial RDCs increasing in cross-sectional area. The twentieth embodiment is similar to the nineteenth embodiment and similar elements have been given similar reference numbers in the twenty-hundred series and only general differences will be discussed. For example, the first RDC 1906 described in the nineteenth embodiment is numbered as the first RDC 2006 in the twentieth embodiment.

The combustor system 2000 includes a first wall 2004 separated from a second wall 2005 by a space 2007. The first wall 2004 defines a core 2002. The core 2002 receives a core oxidizer fuel mixture 2001. The core 2002 includes a first detonation chamber 2020, a second detonation chamber 2024, and a third detonation chamber 2030 arranged in series. The first wall 2004 is an inner wall of the combustor system 2000. The second wall 2005 is an outer wall and may extend around the periphery of the combustor system 2000. The first wall 2004 has a taper such that a cross-sectional area of the core 2002 increases from an upstream end of the combustor system 2000 to a downstream end.

The first wall 2004 of the combustor system 2000 includes a first outer channel 2012B, a second outer channel 2026B, and a third outer channel 2032B. The first outer channel 2012B of the first wall 2004 is coupled to a first outer pilot oxidizer-fuel supply 2023B by a first outer pilot fuel supply system 2022B. The first outer pilot oxidizer-fuel supply 2023B may be coupled to the first outer channel 2012B in any suitable manner, for example, by one or more openings in the first wall 2004. The second outer channel 2026B of the first wall 2004 is coupled to a second outer pilot oxidizer-fuel supply 2029B by a second outer pilot fuel supply system 2028B. The second outer pilot oxidizer-fuel supply 2029B may be coupled to the second outer channel 2026B in any suitable manner, for example, by one or more openings defined in the first wall 2004. The third outer channel 2032B in the first wall 2004 is coupled to a third outer pilot oxidizer-fuel supply 2035B by a third outer pilot fuel supply system 2034B. The third outer pilot oxidizer-fuel supply 2035B may be coupled to the third outer channel 2032B in any suitable manner, for example, by one or more openings in the first wall 2004.

In some approaches, the first outer pilot oxidizer-fuel supply 2023B, the second outer pilot oxidizer-fuel supply 2029B, and the third outer pilot oxidizer-fuel supply 2035B may be the same supply and, for example, may be a mixture of fuel and oxidizer that is present in the space 2007.

The core 2002 of the combustor system 2000 includes a centerbody 2040. The centerbody 2040 has an external surface 2044. The external surface 2044 of the centerbody 2040 includes a first inner channel 2012A, a second inner channel 2026A, and a third inner channel 2032A. The first inner channel 2012A of the centerbody 2040 is coupled to a first inner pilot oxidizer-fuel supply 2023A by a first inner pilot fuel supply system 2022A. The first inner pilot oxidizer-fuel supply 2023A may be coupled to the first inner channel 2012A in any suitable manner, for example, by one or more openings in the external surface 2044 of the centerbody 2040. The second inner channel 2026A of the centerbody 2040 is coupled to the second inner pilot oxidizer-fuel supply 2029A by a second inner pilot fuel supply system 2028A. The second inner pilot oxidizer-fuel supply 2029A may be coupled to the second inner channel 2026A in any suitable manner, for example, by one or more openings defined in the external surface 2044 of the centerbody 2040.

In some approaches, the first inner pilot oxidizer-fuel supply 2023A, the second inner pilot oxidizer-fuel supply 2029A, and the third inner pilot oxidizer-fuel supply 2035A, may be the same supply and, for example, may be a mixture of fuel and oxidizer that is present in the centerbody 2040.

The combustor system 2000 further includes a first RDC 2006, a second RDC 2008, and a third RDC 2010.

The first RDC 2006 includes the first detonation chamber 2020, the first inner channel 2012A, the first inner pilot fuel supply system 2022A, the first outer channel 2012B, and the first outer pilot fuel supply system 2022B. The first detonation chamber 2080 is bounded by the first inner channel 2012A on the inside and the first outer channel 2012B on the outside. The first inner channel 2012A is offset from the first outer channel 2012B such that the first outer channel 2012B is positioned further downstream than the first inner channel 2012A. The first inner pilot fuel supply system 2022A delivers fuel to the first inner channel 2012A. The first outer pilot fuel supply system 2022B delivers pilot fuel to the first outer channel 2012B.

The second RDC 2008 includes the second detonation chamber 2024, the second inner channel 2026A, the second inner pilot fuel supply system 2028A, the second outer channel 2026B, and the second outer pilot fuel supply system 2028B. The second detonation chamber 2024 is bounded by the second inner channel 2026A on the inside and by the second outer channel 2026B on the outside. The second inner channel 2026A is offset from the second outer channel 2026B such that the second outer channel 2026B is positioned further downstream than the second inner channel 2026A. The second inner pilot fuel supply system 2028A delivers pilot fuel to the second inner channel 2026A. The second outer pilot fuel supply system 2028B delivers pilot fuel to the second outer channel 2026B.

The third RDC 2010 includes the third detonation chamber 2030, the third inner channel 2032A, the third inner pilot fuel supply system 2034A, the third outer channel 2032B, and the third outer pilot fuel supply system 2034B. The third detonation chamber 2030 is bounded by the third inner channel 2032A on the inside and by the third outer channel 2032B on the outside. The third inner channel 2032A is offset from the third outer channel 2032B such that the third outer channel 2032B is positioned further downstream than the third inner channel 2032A. The third inner pilot fuel supply system 2034A delivers pilot fuel to the third inner channel 2032A. The third outer pilot fuel supply system 2034B delivers pilot fuel to the third outer channel 2032B.

In addition, the combustor system 2000 includes a centerbody 2040 that extends axially through the core 2002. The centerbody 2040 also has a taper such that a cross-sectional area of the centerbody 2040 decreases from an upstream end of the centerbody 2040 to a downstream end. Due to the taper of the first wall 2004 and the taper of the centerbody 2040, the cross-sectional area A1 (viewed from an end of the combustor system 2000) of the first detonation chamber 2020 is smaller than the cross-sectional area A2 of the second detonation chamber 2024. Similarly, the cross-sectional area A2 of the second detonation chamber 1824 is smaller than the cross-sectional area A3 of the third detonation chamber 2030.

In some embodiments, the centerbody 2040 may be translatable and may shift through at least a portion of the core 2002. For example, the centerbody 2040 may be mechanically or fluidically translatable in one or more of an upstream direction and a downstream direction along the midline X.

In some approaches, the combustor systems described herein may be made of high-temperature capable materials such as metals, etc.

It is contemplated that any of the features of the embodiment of combustor system described herein and depicted in FIGS. 1-20 may be combined in any manner. Any aspects of the various illustrated embodiments may be combined to form new combinations.

Figure 21:
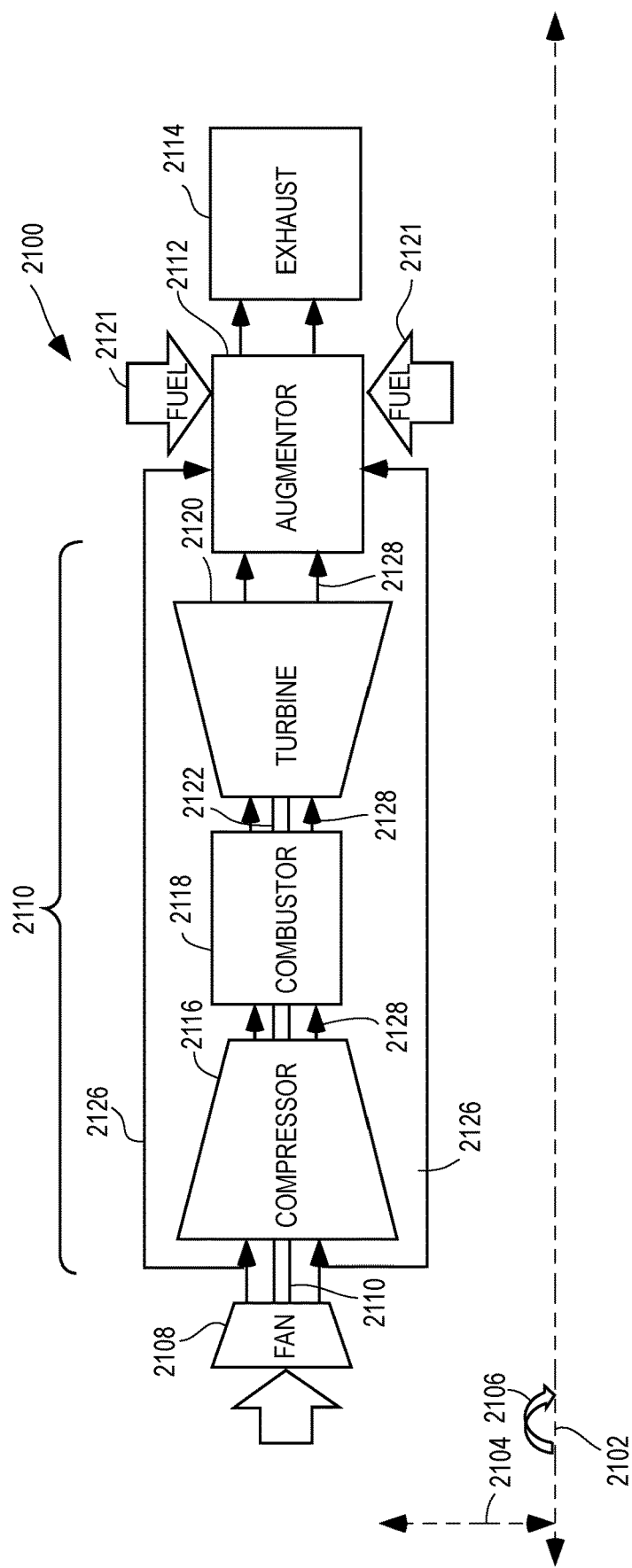
FIG. 21 comprises a schematic diagram of a gas turbine engine with serial RDCs in accordance with various embodiments of these teachings.

Referring now to FIG. 21, a gas turbine engine 2100 that is compatible with many of these teachings will now be presented. The gas turbine engine 2100 may incorporate any of the combustor systems with serial RDCs described herein. In some embodiments, the gas turbine engine 2100 may include any of the serial RDCs described herein in the combustor 2118. In other embodiments, the gas turbine engine 2100 may include the serial RDCs described herein in the augmentor 2112. It should be appreciated that the gas turbine engine 2100 depicted in FIG. 21 and described below is by way of example only. In other embodiments, the gas turbine engine 2100 may have any other suitable configuration. For example, in other exemplary embodiments, the gas turbine engine 2100 may include any suitable number of compressors, turbines, shafts, or combinations thereof. Additionally, the gas turbine engine 2100 may not include each of the features described herein, or alternatively, may include one or more features not described herein. Additionally, the gas turbine engine 2100 may be configured as any other suitable ducted gas turbine engine such as, for example, a turbofan engine, or used in conjunction with a ramjet engine or a scramjet engine. In a ramjet or scramjet configuration, the turbomachinery will be bypassed as the temperatures are too extreme.

As a frame of reference, the gas turbine engine 2100 defines an axial direction 2102, a radial direction 2104, and a circumferential direction 2106 (i.e., a direction extending about the axial direction 2102).

The gas turbine engine 2100 includes a fan 2108 followed by a core section 2110, an augmentor 2112, and an exhaust system 2114. The core section 2110 includes a compressor 2116 followed by a combustor 2118 and a turbine 2120. The augmentor 2112 is positioned downstream of the core section 2110 and upstream of the exhaust system 2114. A shaft 2122 is coupled to several components throughout the gas turbine engine 2100, including the compressor 2116 and the turbine 2120. Further, the shaft 2122 is coupled to a load (not shown).

The fan 2108 draws oxidizer into the gas turbine engine 2100. It is contemplated that the fan 2108 may be any suitable type of oxidizer intake device, such as a cold oxidizer intake. The fan 2108 draws oxidizer into the gas turbine engine 2100. The turbine 2120 may drive rotation of blades of the fan. The fan 2108 is in fluid communication with a bypass oxidizer flow passage 2126 and a core oxidizer path 2128.

The compressor 2116 is positioned downstream of the fan 2108 and upstream of the turbine 2120. The compressor 2116 includes blades rigidly mounted to a rotor which is coupled to the shaft 2122. The combustor 2118 is positioned downstream of the compressor 2116. The combustor 2118 is configured to combust an oxidizer-fuel mixture and includes a passage to route combustion gases into the turbine 2120. The combustor 2118 may incorporate a rotating detonation architecture to generate a rotating detonation wave. The rotating detonation architecture of the combustor 2118 may be any of the architectures illustrated in FIGS. 1-20.

The turbine 2120 includes one or more stators having fixed vanes or blades, and one or more rotors having blades which rotate relative to the stators. The turbine 2120 includes a turbine rotor that is coupled to the shaft 2122.

The augmentor 2112 is configured to combust mixtures of fuel and oxidizer in a volume thereof and incorporates a rotating detonation architecture to generate a rotating detonation wave. The rotating detonation architecture of the augmentor 2112 may be any of the architectures illustrated in FIGS. 1-20. The augmentor 2112 incorporates one or more fuel supply systems 2121. The one or more fuel supply systems 2121 may supply a liquid fuel or a gaseous fuel, such as jet fuel, methane, ethylene, or H2. The fuel type may depend on one or more of the engine architecture, engine size, and thrust class. It is contemplated that fuel may be delivered to the augmentor 2112 using one or more separate fuel delivery systems. The augmentor 2112 is positioned downstream of the turbine 2120 of the gas turbine engine 2100 and is positioned upstream of the exhaust system 2114.

As will be appreciated, the shaft 2122 may be coupled to a load. The load may be any suitable device that may use the power of the rotational output of the gas turbine engine 2100, such as an external mechanical load or an electrical generator. For example, the load may include a propeller of an airplane or an electrical generator.

In operation, oxidizer enters the gas turbine engine 2100 through the fan 2108. A portion of the oxidizer passes into the bypass oxidizer flow passage 2126 to provide bypass oxidizer flow to the augmentor 2112. Another portion of the oxidizer passes into the core section 2110 and flows through the core oxidizer path 2128 as core oxidizer. The core oxidizer enters the compressor 2116. As the core oxidizer passes through the rotating blades of the compressor 2116 the pressure increases, thereby providing the combustor 2118 with sufficient oxidizer for combustion. The combustor 2118 receives core oxidizer from the compressor 2116 and fuel from a fuel supply forming an oxidizer-fuel mixture. The combustor 2118 ignites and combusts the oxidizer-fuel mixture and passes hot pressurized gases into the turbine 2120. The combustor 2118 may combust the oxidizer-fuel mixture in a rotating detonation reaction. The hot pressurized gases pass through rotor blades of the turbine 2120, thereby driving the turbine rotor to rotate. Coupling between the turbine rotor and the shaft 2122 causes the shaft 2122 to rotate. The rotor of the compressor 2116 is driven to rotate by the shaft 2122.

The augmentor 2112 receives core oxidizer from the turbine 2120 via the core oxidizer path 2128. The augmentor 2112 also receives bypass oxidizer from the fan 2108 via the bypass oxidizer flow passage 2126. Fuel is provided to the augmentor 2112 via the one or more fuel supply systems 2121. The augmentor 2112 ignites a mixture of bypass oxidizer and fuel in a rotating detonation reaction. The rotating detonation reaction supports combustion reaction that consumes of a mixture of core oxidizer and fuel in the augmentor 2112. Products from the reactions occurring within the augmentor 2112, which include hot pressurized gases, pass into the exhaust system 2114, enhancing thrust. The products exit the gas turbine engine 2100 through an outlet of the exhaust system 2114 to generate thrust for the gas turbine engine 2100.

Figure 22:
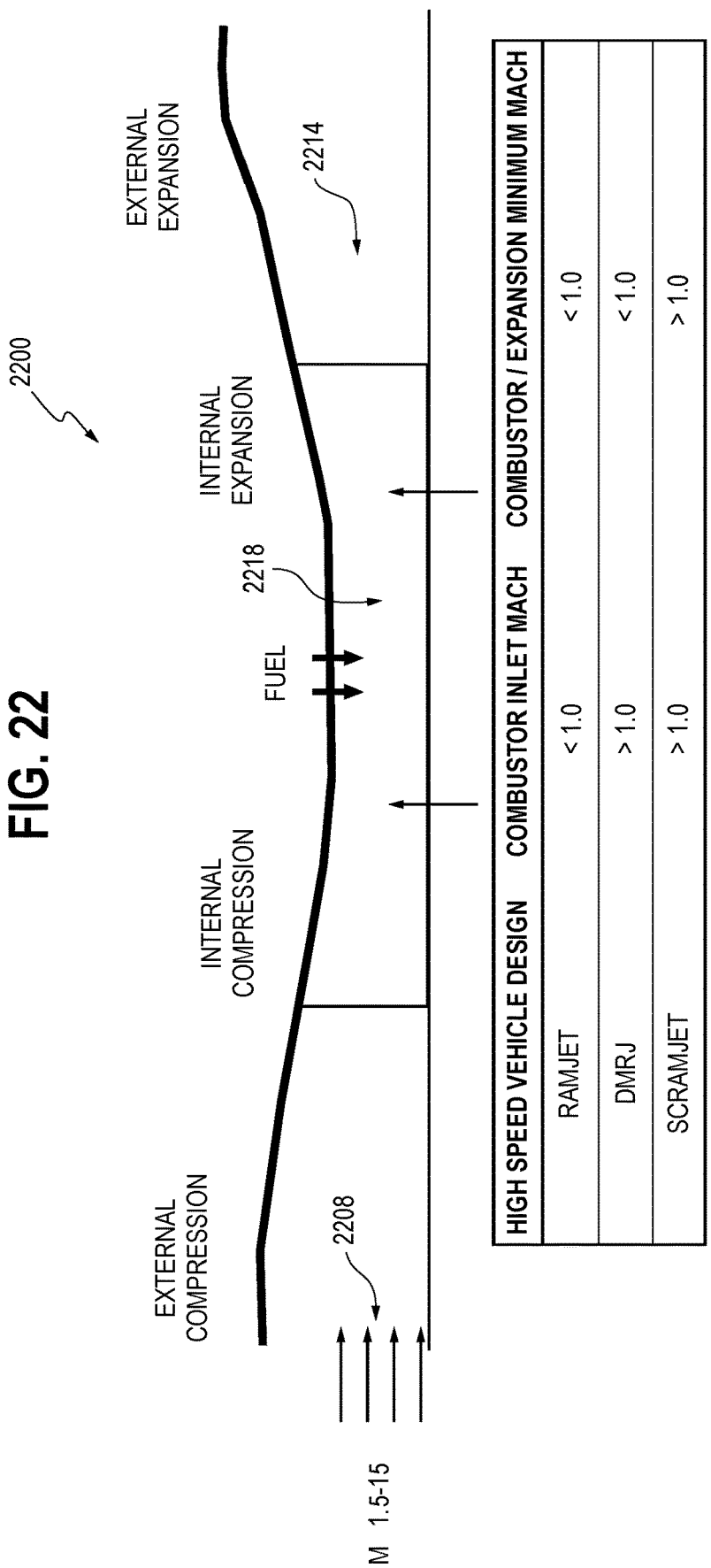
FIG. 22 comprises a schematic diagram of a ramjet/scramjet engine with serial RDCs in accordance with various embodiments of these teachings.

Referring now to FIG. 22, a ramjet/scramjet engine 2200 is illustrated. It should be appreciated that the ramjet/scramjet engine 2200 is by way of example only. In other embodiments, the ramjet/scramjet engine 2200 may have any other suitable configuration.

Oxidizer enters the ramjet/scramjet engine 2200 through the intake 2208. The ramjet/scramjet engine 2200 lacks a compressor. Forward speed of the vehicle (e.g., an aircraft) compresses the oxidizer. The oxidizer then enters the combustor 2218. Fuel is injected into the combustor 2218 via a fuel injector and is mixed with the oxidizer and is ignited via an igniter such as a flame holder (not shown). Products from the reactions occurring in the combustor 2218 and the serial RDCs 2212, which include hot pressurized gases, pass into the exhaust nozzle 2214, enhancing thrust. Combustion and detonation products expand and are released to the ambient environment through the exhaust nozzle 2214.

The ramjet/scramjet engine may have three modes of operation: ramjet mode, dual mode ramjet (DMRJ), and scramjet mode (e.g., supersonic combustion ramjet). In ramjet mode, the speed of the stream of oxidizer entering the combustor 2218 is under Mach 1. The minimum speed of the stream (e.g., including combustion reactants, products, etc.) in the combustor 2218 and the exhaust nozzle 2214 is below Mach 1 in ramjet mode. In DMRJ mode, the speed of the stream of oxidizer entering the combustor 2218 is above Mach 1. The minimum speed of the stream (e.g., including combustion reactants, products, etc.) in the combustor 2218 and the exhaust nozzle 2214 is below Mach 1 in DMRJ mode. In scramjet mode, the speed of the stream of oxidizer entering the combustor 2218 is above Mach 1. The minimum speed of the stream (e.g., including combustion reactants, products, etc.) in the combustor 2218 and the exhaust nozzle 2214 is also above Mach 1 in DMRJ mode.

Figure 23:
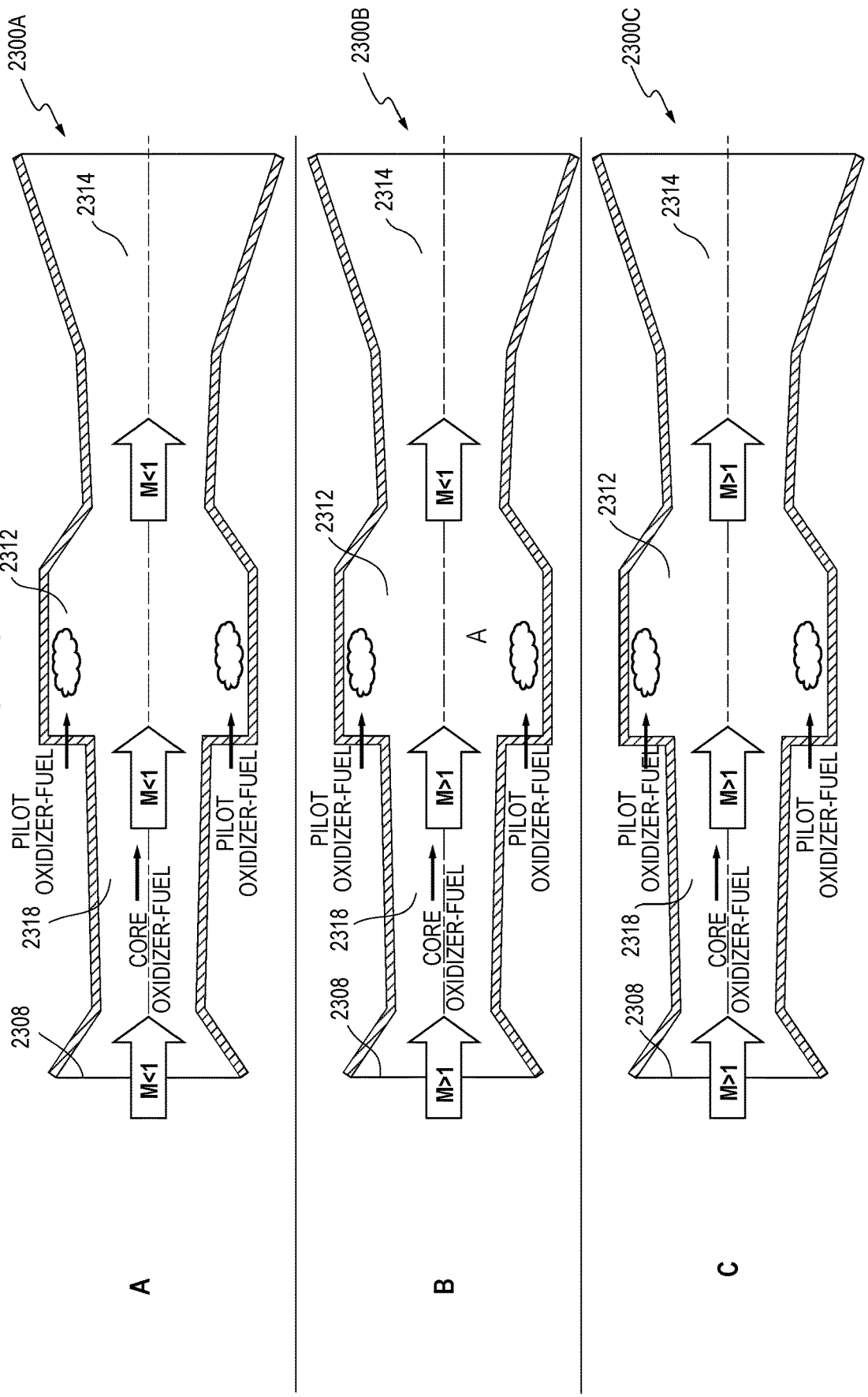
FIG. 23 comprises a schematic diagram of a ramjet/scramjet engine with serial RDCs in accordance with various embodiments of these teachings.

FIG. 23 a ramjet/scramjet engine including serial RDCs is illustrated in three different operating modes: ramjet mode 2300A, dual mode ramjet (DMRJ) mode 2300B, and scramjet mode 2300C. In the ramjet/scramjet engine of FIG. 23, serial RDCs 2312 are disposed downstream of the isolator 2318. Combustion products exit the isolator 2318 and are released to the serial RDCs 2312. The serial RDCs 2312 include at least two RDCs arranged in series. The architecture of the serial RDCs 2312 may be any of the architectures illustrated in FIGS. 1-20. The serial RDCs 2312 ignite a mixture of residual oxidizer from the combustion products and fuel in a rotating detonation reaction. The rotating detonation reaction supports combustion reactions that consume unreacted fuel and oxidizer from the isolator 2318.

In ramjet mode 2300A, oxidizer enters the ramjet/scramjet engine at the air intake 2308 at speeds below Mach 1. Combustion and detonation also occur below Mach 1 in the serial RDCs 2312. The expansion of combustion and detonation products also occurs below Mach 1 in the exhaust nozzle 2314.

In DMRJ mode 2300B, oxidizer enters the ramjet/scramjet engine at the air intake 2308 at speeds above Mach 1. Combustion and detonation also occur above Mach 1 in the serial RDCs 2312. The expansion of combustion and detonation products occurs below Mach 1 in the exhaust nozzle 2314.

In scramjet mode 2300C, combustion is supersonic. Oxidizer enters the ramjet/scramjet engine at the air intake 2308 at supersonic speeds above Mach 1. Combustion and detonation also occur above Mach 1 in the serial RDCs 2312. Further, expansion of combustion and detonation products occurs above Mach 1 in the exhaust nozzle 2314.

Figure 24:
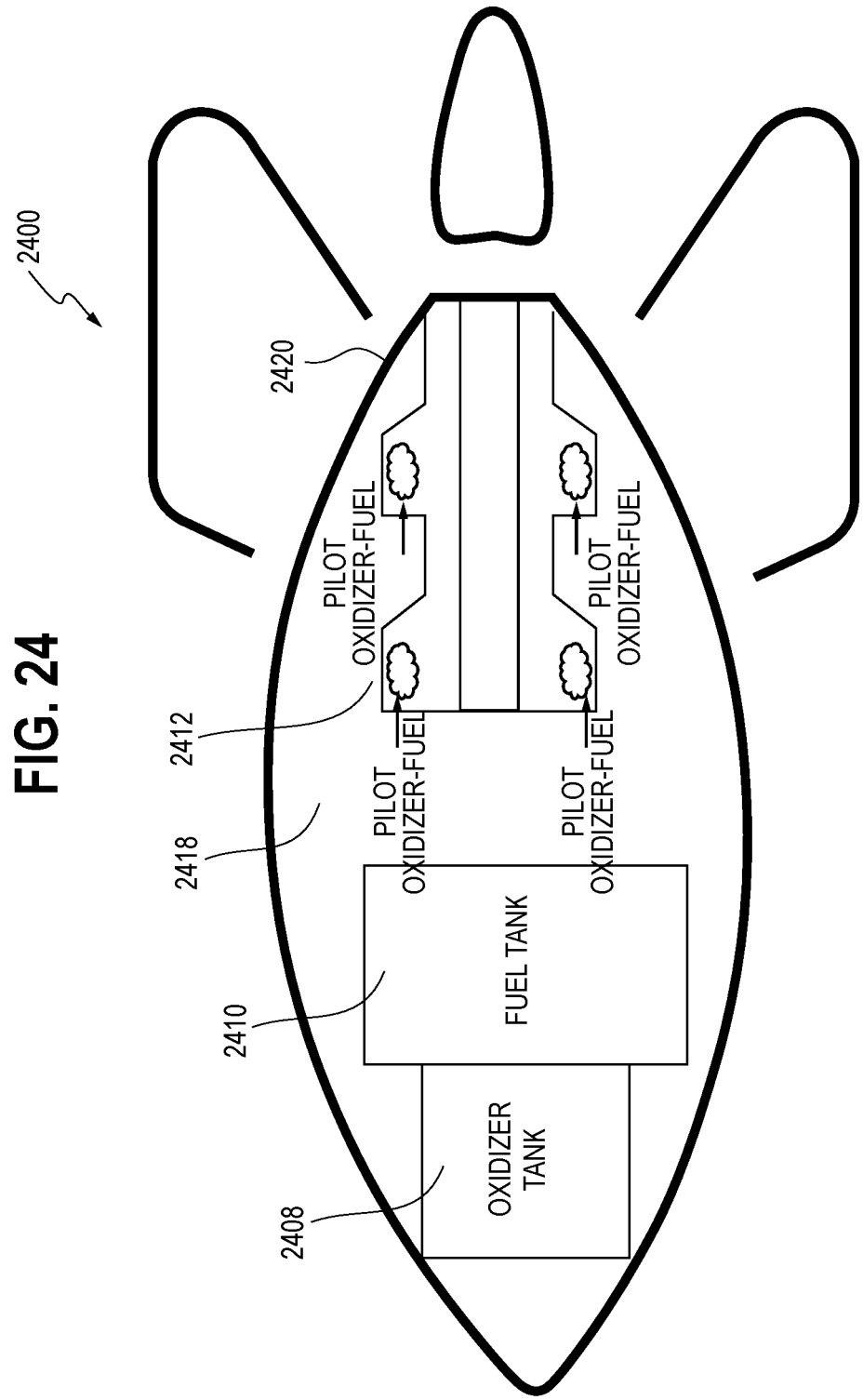
FIG. 24 comprises a schematic diagram of a rocket engine with serial RDCs in accordance with various embodiments of these teachings.

Turning to FIG. 24, a rocket engine 2400 that is compatible with many of these teachings is presented. The rocket engine 2400 may incorporate any of the combustor systems with serial RDCs described herein. The rocket engine 2400 includes an oxidizer tank 2408 and a fuel tank 2410. The oxidizer tank 2408 and the fuel tank 2410 supply oxidizer and fuel to a combustion chamber 2418. Serial RDCs 2412 are positioned downstream of the combustion chamber 2418. The serial RDCs 2412 consume unreacted oxidizer, fuel, or combinations thereof from the combustion chamber 2418 and further enhance engine thrust. Combustion and detonation products are released from the rocket engine from the exhaust nozzle 2420 to generate thrust.

FIG. 25 is a flowchart of a method of supporting a combustion reaction using at least two RDCs arranged in series. The method may employ one or more of the rotating detonation architectures of FIGS. 1-20. Also, it is contemplated that the method may be used to enhance thrust in various types of engines such as gas turbine engines, scramjet engines, ramjet engines, or rocket engines.

At block 2510, the method includes supplying a core oxidizer-fuel mixture to a combustor system having a first RDC and at least one additional RDC arranged in series. The core-oxidizer fuel mixture may be a mixture of fuel and any type of gaseous oxidizer, liquid oxidizer, solid oxidizer, or combinations thereof. In some embodiments, the core oxidizer-fuel mixture may include unreacted reactants from a combustion reaction such as a combustion reaction occurring in a gas turbine engine combustor, a ramjet/scramjet combustion chamber, or a rocket combustion chamber.

At block 2520, the method includes supplying a first pilot oxidizer-fuel mixture to the first RDC. The first RDC includes a first detonation chamber with a first channel to stabilize a rotating detonation wave. The first pilot oxidizer-fuel mixture may be supplied using any suitable pilot fuel supply system.

At block 2530, the method includes supplying a second pilot oxidizer-fuel mixture to the at least one additional RDC. The at least one additional RDC includes a second detonation chamber with a second channel to stabilize a rotating detonation wave. The second pilot oxidizer-fuel mixture may be supplied using any suitable pilot fuel supply system.

At block 2540, the method includes igniting the first pilot oxidizer-fuel mixture in the first RDC and igniting the second pilot oxidizer-fuel mixture in the at least one additional RDC to generate rotating detonation waves that consume at least a portion of the core oxidizer-fuel mixture to support a combustion reaction within the volume. It is to be understood that ignition of the first RDC and the at least one additional RDC may occur in any order. When serial RDCs are included in a combustor system, ignition does not have to occur sequentially from upstream to downstream (e.g., igniting the first RDC then the at least one additional RDC, etc.). For example, in some circumstances, the RDC that is positioned second sequentially may be ignited first, followed by the RDC that is positioned first sequentially. The ability to ignite the serial RDCs in any order contributes to the operational flexibility of a system including serial RDCs. For example, if there is a likelihood that the detonation wave could travel upstream, the RDC that is positioned second (or even third or fourth) sequentially may be ignited before the RDC that is positioned first sequentially. In some circumstances, less than all of the serial RDCs or even only one of the serial RDCs may be used in operation. Further, one RDC may be used to ignite another RDC. For example, the first RDC may be used to ignite the at least one additional RDC.

In some embodiments, the method further includes stabilizing the rotating detonation waves via a first channel in the first rotating detonation combustor and a second channel in the second rotating detonation combustor.

Further aspects of the disclosure are provided by the subject matter of the following clauses:

A combustor system comprising: a volume that receives a core oxidizer-fuel mixture, the volume comprising: a first detonation chamber that is defined at least in part by a peripheral wall and bounded at least in part by a first channel that extends circumferentially about a midline of the combustor system, wherein the first detonation chamber receives a first pilot oxidizer-fuel mixture; and at least one additional detonation chamber disposed downstream of the first detonation chamber and bounded at least in part by a second channel that extending circumferentially about the midline of the combustor system, wherein the at least one additional detonation chamber receives a second pilot oxidizer-fuel mixture; wherein the first pilot oxidizer-fuel mixture reacts in the first detonation chamber and the second pilot oxidizer-fuel mixture reacts in the at least one additional detonation chamber to generate rotating detonation combustion waves that are guided by the first channel and the second channel to support a reaction that consumes the core oxidizer-fuel mixture.

The combustor system of any preceding clause, wherein first channel is a first outer channel formed in the peripheral wall, and wherein the second channel is a second outer channel formed in the peripheral wall.

The combustor system of any preceding clause, wherein the peripheral wall further includes: a first outer pilot fuel supply system that creates the first pilot oxidizer-fuel mixture in the first outer channel; and a second outer pilot fuel supply system that creates the second pilot oxidizer-fuel mixture in the second outer channel.

The combustor system of any preceding clause, further including a centerbody bounded by an external surface, wherein the external surface of a the centerbody includes a first inner channel and a second inner channel formed therein.

The combustor system of any preceding clause, wherein the centerbody further includes: a first inner pilot fuel supply system that creates the first pilot oxidizer-fuel mixture; and a second inner pilot fuel supply system that creates the second pilot oxidizer-fuel mixture.

The combustor system of any preceding clause, wherein the first inner channel is opposite the first outer channel, and wherein the second inner channel is opposite the second outer channel.

The combustor system of any preceding clause, wherein the first inner channel and the second inner channel are staggered from the first outer channel and the second outer channel.

The combustor system of any preceding clause, further including a centerbody bounded by an external surface, wherein the first channel is a first inner channel formed in the external surface of the centerbody, and wherein the second channel is a second inner channel formed in the external surface of the centerbody.

The combustor system of any preceding clause, wherein the centerbody further includes: a first inner pilot fuel supply system that creates the first pilot oxidizer-fuel mixture; and a second inner pilot fuel supply system that creates the second pilot oxidizer-fuel mixture.

The combustor system of any preceding clause, wherein at least a portion of the combustor system lacks a centerbody.

The combustor system of any preceding clause, wherein at least a portion of the combustor system includes a centerbody.

The combustor system of any preceding clause, wherein the centerbody has a tapered shape that increases in size from upstream to downstream.

The combustor system of any preceding clause, wherein the centerbody has a tapered shape that decreases in size from upstream to downstream.

The combustor system of any preceding clause, wherein the peripheral wall has a taper that decreases in size from upstream to downstream.

The combustor system of any preceding clause, wherein the first detonation chamber has a first cross-sectional area and the at least one additional detonation chamber has a second cross-sectional area, the second cross-sectional area being smaller than the first cross-sectional area.

The combustor system of any preceding clause, wherein the first detonation chamber has a first cross-sectional area and the at least one additional detonation chamber has a second cross-sectional area, the second cross-sectional area being larger than the first cross-sectional area.

A method comprising: supplying a core oxidizer-fuel mixture to a combustor system including a first rotating detonation combustor and at least one additional rotating detonation combustor arranged in series; supplying a first pilot oxidizer-fuel mixture to the first rotating detonation combustor; supplying a second pilot oxidizer-fuel mixture to the at least one additional rotating detonation combustor; and igniting the first pilot oxidizer-fuel mixture in the first rotating detonation combustor and igniting the second pilot oxidizer-fuel mixture in the at least one additional rotating detonation combustor to generate rotating detonation waves that consume at least a portion of the core oxidizer-fuel mixture.

The method of any preceding clause, further comprising stabilizing the rotating detonation waves via a first channel in the first rotating detonation combustor and a second channel in the at least one additional rotating detonation combustor.

An engine comprising a combustion system including: a first rotating detonation combustor including a first detonation chamber, a first channel surrounding at least a portion of the first detonation chamber, and a first pilot fuel supply system configured to deliver pilot fuel to the first channel; and at least one additional rotating detonation combustor disposed in series with the first rotating detonation combustor, the at least one additional rotating detonation combustor including a second detonation chamber, a second channel surrounding at least a portion of the second detonation chamber, and a second pilot fuel supply system configured to deliver pilot fuel to the second channel.

The engine of any preceding clause, wherein the engine is a ramjet engine, a scramjet engine, a gas turbine engine, or a rocket engine.

A combustor system comprising: a first wall defining at least in part a core that receives a core oxidizer-fuel mixture, the core including a first detonation chamber and at least one additional detonation chamber, the first wall including a first outer channel that extends circumferentially about the first detonation chamber and at least one additional outer channel that extends circumferentially about the at least one additional detonation chamber; and at least one outer pilot oxidizer-fuel supply system that supplies a pilot oxidizer-fuel mixture to the first outer channel and the at least one additional outer channel; wherein the pilot oxidizer-fuel mixture is configured to ignite to generate rotating detonation waves that are guided by the first outer channel and the at least one additional outer channel to support a reaction that consumes the core oxidizer-fuel mixture.

The combustor system of any preceding clause, wherein the first wall includes a first backward-facing step and a first forward-facing step that are recessed in the first wall, the first backward-facing step and the first forward-facing step joined together by a first recessed surface, and wherein the first backward-facing step, the first forward-facing step, and the first recessed surface define the first outer channel.

The combustor system of any preceding clause, wherein the first wall includes a second backward-facing step and a second forward-facing step that are recessed in the first wall, the second backward-facing step and the second forward-facing step joined together by a second recessed surface, and wherein the second backward-facing step, the second forward-facing step, and the second recessed surface define the at least one additional outer channel.

The combustor system of any preceding clause, further including a centerbody bounded by an external surface, wherein the external surface of a the centerbody includes a first inner channel and at least one additional inner channel formed therein.

The combustor system of any preceding clause, wherein the centerbody further includes: at least one inner pilot fuel supply system that supplies at least one inner pilot oxidizer-fuel mixture to the first inner channel and the at least one additional inner channel.

The combustor system of any preceding clause, wherein the first inner channel and the first outer channel are disposed at the same position along a length of the combustor system, and wherein the at least one additional inner channel and the at least one additional outer channel are disposed at the same position along the length of the combustor system.

The combustor system of any preceding clause, wherein the first inner channel is staggered from the first outer channel along a length of the combustor system, and wherein the at least one additional inner channel is staggered from the at least one additional outer channel along the length of the combustor system.

The combustor system of any preceding clause, wherein the external surface of the centerbody includes a first backward-facing step and a first recessed surface that are recessed in the external surface, and wherein the first backward-facing step and the first recessed surface define the first inner channel.

The combustor system of any preceding clause, wherein the external surface of the centerbody includes a second backward-facing step and a second recessed surface that are recessed in the external surface, and wherein the second backward-facing step and the second recessed surface define the at least one additional inner channel.

The combustor system of any preceding clause, wherein at least a portion of the core includes a movable centerbody.

The combustor system of any preceding clause, wherein at least one of the first detonation chamber or the at least one additional detonation chamber is void of a centerbody.

The combustor system of any preceding clause, wherein at least one of the first detonation chamber or the at least one additional detonation chamber includes a centerbody.

The combustor system of any preceding clause, wherein the centerbody has a tapered shape that increases in size from upstream to downstream.

The combustor system of any preceding clause, wherein the combustor system is configured for utilization in at least one of a ramjet engine, a scramjet engine, a gas turbine engine, or a rocket engine.

The combustor system of any preceding clause, wherein at least a portion of the first wall has a thickness with a taper that decreases in size from upstream to downstream.

The combustor system of any preceding clause 1, wherein the first detonation chamber has a first cross-sectional area and the at least one additional detonation chamber has a second cross-sectional area, the second cross-sectional area being different than the first cross-sectional area.

A method comprising: supplying a core oxidizer-fuel mixture to a combustor system including a first rotating detonation combustor and at least one additional rotating detonation combustor arranged in series; supplying a first pilot oxidizer-fuel mixture to the first rotating detonation combustor; supplying a second pilot oxidizer-fuel mixture to the at least one additional rotating detonation combustor; and igniting at least one of the first pilot oxidizer-fuel mixture in the first rotating detonation combustor or the second pilot oxidizer-fuel mixture in the at least one additional rotating detonation combustor to generate rotating detonation waves that consume at least a portion of the core oxidizer-fuel mixture.

The method of any preceding clause, further comprising stabilizing the rotating detonation waves via a first channel in the first rotating detonation combustor and a second channel in the at least one additional rotating detonation combustor.

A combustor system comprising: a first wall defining at least in part a core that receives a core oxidizer-fuel mixture, the core including a first detonation chamber and at least one additional detonation chamber; a centerbody disposed in the core, the centerbody having an external surface including a first inner channel that extends circumferentially about the first detonation chamber and at least one additional inner channel that extends circumferentially about the at least one additional detonation chamber; at least one inner pilot oxidizer-fuel supply system that supplies a pilot oxidizer-fuel mixture to the first inner channel and the at least one additional inner channel; and wherein the pilot oxidizer-fuel mixture ignites to generate rotating detonation waves that are guided by the first inner channel and the at least one additional inner channel to support a reaction that consumes the core oxidizer-fuel mixture.

The combustor system of any preceding clause, wherein the external surface of the centerbody includes a first backward-facing step and a first recessed surface that are recessed in the external surface, and wherein the first backward-facing step and the first recessed surface define the first inner channel; and wherein the external surface of the centerbody includes a second backward-facing step and a second recessed surface that are recessed in the external surface, and wherein the second backward-facing step and the second recessed surface define the at least one additional inner channel.

What is claimed is:

1. A combustor system comprising:
   a first wall defining at least in part a core that receives a core oxidizer-fuel mixture, the core including a first detonation chamber and at least one additional detonation chamber, the first wall including a first outer channel that extends circumferentially about the first detonation chamber and at least one additional outer channel that extends circumferentially about the at least one additional detonation chamber, wherein the first wall is common outer wall that directly borders the first detonation chamber and the at least one additional detonation chamber; and
   at least one outer pilot oxidizer-fuel supply system that supplies a pilot oxidizer-fuel mixture to the first outer channel and the at least one additional outer channel; wherein the pilot oxidizer-fuel mixture is configured to ignite to generate rotating detonation waves that are guided by the first outer channel and the at least one additional outer channel to support a reaction that consumes the core oxidizer-fuel mixture.

2. The combustor system of claim 1, wherein the first wall includes a first backward-facing step and a first forward-facing step that are recessed in the first wall, the first backward-facing step and the first forward-facing step joined together by a first recessed surface, and wherein the first backward-facing step, the first forward-facing step, and the first recessed surface define the first outer channel.

3. The combustor system of claim 2, wherein the first wall includes a second backward-facing step and a second forward-facing step that are recessed in the first wall, the second backward-facing step and the second forward-facing step joined together by a second recessed surface, and wherein the second backward-facing step, the second forward-facing step, and the second recessed surface define the at least one additional outer channel.

4. The combustor system of claim 1, further including a centerbody bounded by an external surface, wherein the external surface of the centerbody includes a first inner channel and at least one additional inner channel formed therein.

5. The combustor system of claim 4, wherein the centerbody further includes:
   at least one inner pilot fuel supply system that supplies at least one inner pilot oxidizer-fuel mixture to the first inner channel and the at least one additional inner channel.

6. The combustor system of claim 4, wherein the first inner channel and the first outer channel are disposed at the same position along a length of the combustor system, and wherein the at least one additional inner channel and the at least one additional outer channel are disposed at the same position along the length of the combustor system.

7. The combustor system of claim 4, wherein the first inner channel is staggered from the first outer channel along a length of the combustor system, and wherein the at least one additional inner channel is staggered from the at least one additional outer channel along the length of the combustor system.

8. The combustor system of claim 4, wherein the external surface of the centerbody includes a first backward-facing step and a first recessed surface that are recessed in the external surface, and wherein the first backward-facing step and the first recessed surface define the first inner channel.

9. The combustor system of claim 8, wherein the external surface of the centerbody includes a second backward-facing step and a second recessed surface that are recessed in the external surface, and wherein the second backward-facing step and the second recessed surface define the at least one additional inner channel.

10. The combustor system of claim 1, wherein at least a portion of the core includes a movable centerbody.

11. The combustor system of claim 1, wherein at least one of the first detonation chamber or the at least one additional detonation chamber is void of a centerbody.

12. The combustor system of claim 1, wherein at least one of the first detonation chamber or the at least one additional detonation chamber includes a centerbody.

13. The combustor system of claim 11, wherein the centerbody has a tapered shape that increases in size from upstream to downstream.

14. The combustor system of claim 1, wherein the combustor system is configured for utilization in at least one of a ramjet engine, a scramjet engine, a gas turbine engine, or a rocket engine.

15. The combustor system of claim 1, wherein at least a portion of the first wall has a thickness with a taper that decreases in size from upstream to downstream.

16. The combustor system of claim 1, wherein the first detonation chamber has a first cross-sectional area and the at least one additional detonation chamber has a second cross-sectional area, the second cross-sectional area being different than the first cross-sectional area.

17. A method comprising:
   supplying a core oxidizer-fuel mixture to a combustor system including a first rotating detonation combustor and at least one additional rotating detonation combustor arranged in series, the first rotating detonation combustor and the second rotating detonation combustor bordered directly by common outer wall;
   supplying a first pilot oxidizer-fuel mixture to the first rotating detonation combustor;
   supplying a second pilot oxidizer-fuel mixture to the at least one additional rotating detonation combustor; and
   igniting at least one of the first pilot oxidizer-fuel mixture in the first rotating detonation combustor or the second pilot oxidizer-fuel mixture in the at least one additional rotating detonation combustor to generate rotating detonation waves that consume at least a portion of the core oxidizer-fuel mixture.

18. The method of claim 17, further comprising stabilizing the rotating detonation waves via a first channel in the first rotating detonation combustor and a second channel in the at least one additional rotating detonation combustor.

19. A combustor system comprising:
- a first wall defining at least in part a core that receives a core oxidizer-fuel mixture, the core including a first detonation chamber and at least one additional detonation chamber, wherein the first wall is common outer wall that directly borders the first detonation chamber and the at least one additional detonation chamber;
- a centerbody disposed in the core, the centerbody having an external surface including a first inner channel that extends circumferentially about the first detonation chamber and at least one additional inner channel that extends circumferentially about the at least one additional detonation chamber; and
- at least one inner pilot oxidizer-fuel supply system that supplies a pilot oxidizer-fuel mixture to the first inner channel and the at least one additional inner channel;
- wherein the pilot oxidizer-fuel mixture ignites to generate rotating detonation waves that are guided by the first inner channel and the at least one additional inner channel to support a reaction that consumes the core oxidizer-fuel mixture.

20. The combustor system of claim 19, wherein the external surface of the centerbody includes a first backward-facing step and a first recessed surface that are recessed in the external surface, and wherein the first backward-facing step and the first recessed surface define the first inner channel; and wherein the external surface of the centerbody includes a second backward-facing step and a second recessed surface that are recessed in the external surface, and wherein the second backward-facing step and the second recessed surface define the at least one additional inner channel.

* * * * *